US006671289B1

(12) United States Patent
Tamura et al.

(10) Patent No.: US 6,671,289 B1
(45) Date of Patent: Dec. 30, 2003

(54) SHORT CELL MULTIPLEXED ATM TRANSMISSION SYSTEM AND TRANSMISSION METHOD

(75) Inventors: Motoshi Tamura, Tokyo (JP); Takatoshi Okagawa, Funabashi (JP); Hiroshi Nakamura, Tokyo (JP); Akira Kaiyama, Yokohama (JP); Masafumi Onuki, Tokyo (JP); Akihisa Nakajima, Higasimurayama (JP)

(73) Assignee: NTT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 08/966,862

(22) Filed: Nov. 7, 1997

Related U.S. Application Data

(63) Continuation of application No. PCT/JP96/02954, filed on Oct. 11, 1996.

(30) Foreign Application Priority Data

Mar. 8, 1996 (JP) .............................. 8-052169

(51) Int. Cl.[7] .................................. H04J 3/24
(52) U.S. Cl. ..................... 370/474; 370/535; 370/395.1
(58) Field of Search ................................ 370/389, 392, 370/393, 395, 466, 468, 473, 474, 532, 537, 539, 397, 470, 471, 522, 472, 528, 477, 538, 399, 391, 535, 465, 395.1, 395.4, 395.42, 395.43, 395.51, 395.53, 395.6, 395.61

(56) References Cited

U.S. PATENT DOCUMENTS 4,860,283 A * 8/1989 Takano et al. .............. 370/470
5,287,358 A * 2/1994 Nakayama .................. 370/392
5,509,007 A * 4/1996 Takashima et al. ......... 370/391

(List continued on next page.)

FOREIGN PATENT DOCUMENTS

| CN | 2190459 | 12/1995 |
| EP | 0662778 | 7/1995 |
| JP | 63-197148 | 8/1988 |

(List continued on next page.)

OTHER PUBLICATIONS

AT&T, "AAL for Short Packets—AALx", ITU—Telecommunication Standardization Sector, Jul. 10–21, 1995 (3 pp).
AT&T, "AAL for Short Packets—Multiplexed AALx", ITU—Telecommunication Standardization Sector, Jul. 10–21, 1995 (3 pp).
Bezeq, "Proposition: New AAL6 for Composite CBR ATM cells". ITU—Telecommunication Standardization Sector, Jul. 1995 (3 pp).
Ericsson, "Support of low bitrates in B–ISDN", ITU—Telecommunication Standardization Sector, Jul. 1995 (1 p).
Eneroth et al., "Minicell protocol (AALm) for low bit rate applications", ATM Forum Technical Committee, ATMF/96–0166, Feb. 1996 (5 pp).

(List continued on next page.)

*Primary Examiner*—Dang Ton
(74) *Attorney, Agent, or Firm*—Brown Raysman Millstein Felder & Steiner LLP

(57) ABSTRACT

A short cell multiplexing is provided for chiefly transmitting data shorter than the payload of a standard ATM cell (basically the data of less than 48 bytes, but the data more than 48 bytes can be allowed). A standard ATM cell assembler 1 converts various forms of input information into short cells, places the short cells in standard ATM cells efficiently considering their information length, and output them to a B/ISDN network 7. The standard ATM cell disassembler 2 disassembles the standard ATM cells, which are assembled by the standard ATM cell assembler 1 and is input through the B-ISDN network 7, into short cells, converts the short cells into those with the original input information forms, and outputs them to channels. The configuration makes it possible for the short cell ATM cell multiplexing to improve channel efficiency with small delay, and matching to the standard ATM system.

46 Claims, 50 Drawing Sheets

U.S. PATENT DOCUMENTS

| | | | | |
|---|---|---|---|---|
| 5,550,819 A | * | 8/1996 | Duault | 370/392 |
| 5,583,859 A | * | 12/1996 | Feldmeier | 370/471 |
| 5,606,552 A | * | 2/1997 | Baldwin et al. | 370/474 |
| 5,615,210 A | * | 3/1997 | Kaiyama et al. | 370/389 |
| 5,781,595 A | * | 7/1998 | Fuji | 375/357 |
| 5,793,766 A | * | 8/1998 | Dieudonne et al. | 370/395 |
| 5,805,588 A | * | 9/1998 | Petersen | 370/356 |
| 5,884,064 A | * | 3/1999 | Rosenberg | 395/500.48 |
| 5,940,385 A | | 8/1999 | Mita et al. | |
| 5,978,375 A | * | 11/1999 | Petersen et al. | 370/395 |
| 5,978,680 A | * | 11/1999 | Siira | 455/442 |

FOREIGN PATENT DOCUMENTS

| | | |
|---|---|---|
| JP | 4-157843 | 5/1992 |
| JP | 5-103016 | 4/1993 |
| JP | 5-211523 | 8/1993 |
| JP | 7-202895 | 8/1995 |
| JP | 7-245628 | 9/1995 |
| JP | 7-336354 | 12/1995 |
| JP | 7-162437 | 6/1996 |

OTHER PUBLICATIONS

Nakajima et al., "Advanced Intelligent Mobile Communications Network", ISS '95, Apr. 1995, vol. 2, A7.1.

"(Docomo, ATM–F)": Tsuboya, "ATM for Low Bitrate Voice", ATM Forum / 95–1286, Oct. 2–6, 1995.

Office Action in the corresponding Canadian patent application No. 2,220,252, Canadian Intellectual Property Office, dated Feb. 26, 2003.

* cited by examiner

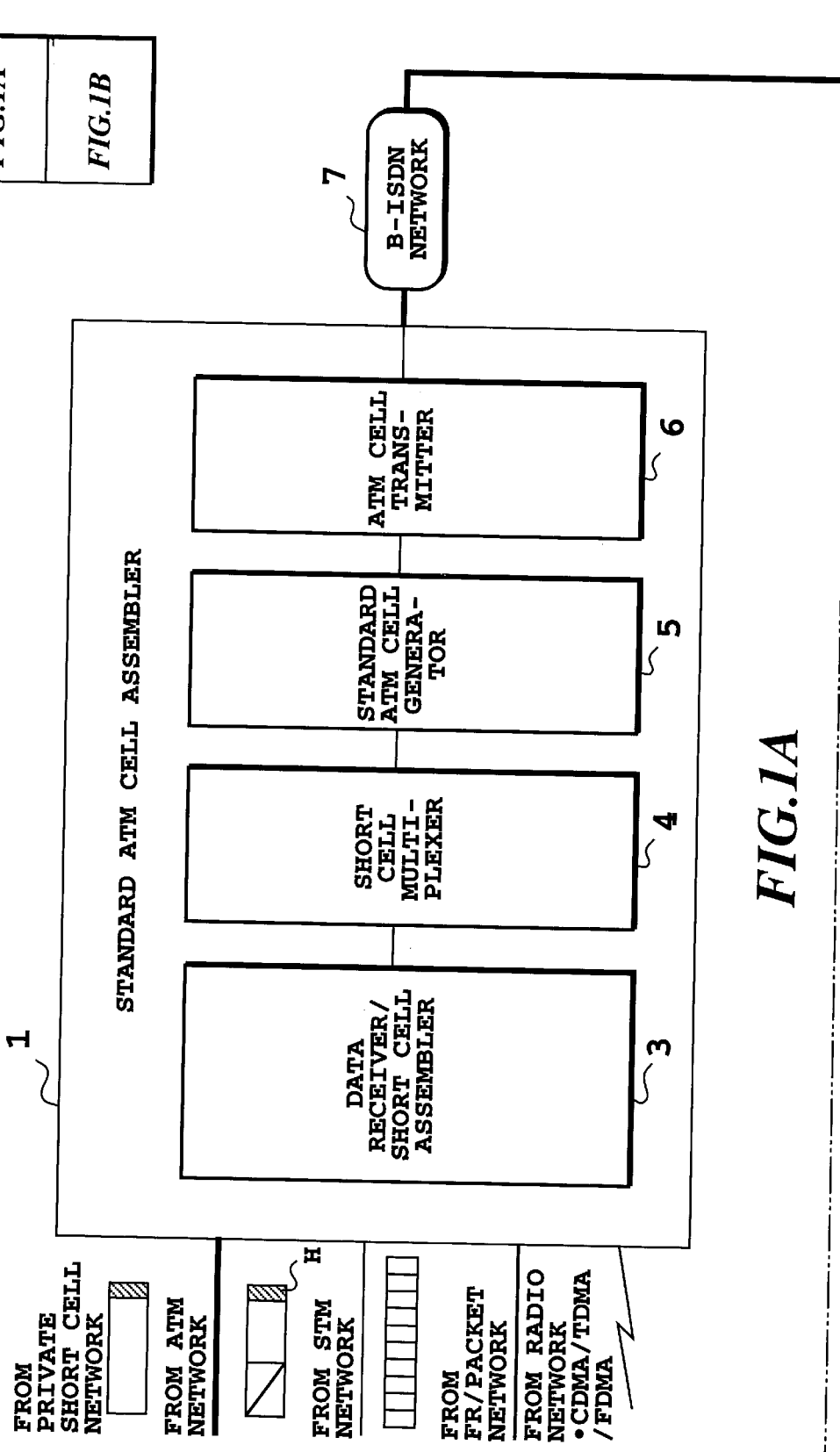

PI(PATTERN IDENTIFIER):MULTIPLEXED PATTERN
IDENTIFIER
C:ERROR DETECTING/ERROR CORRECTING BITS
(PARITY BITS; etc.)

N: MULTIPLEXED CELL NUMBER INFORMATION
L: SHORT CELL LENGTH INFORMATION
MSN: MULTIPLEXING SEQUENCE NUMBER
C: ERROR DETECTING/ERROR CORRECTING BITS
 (PARITY BITS, CRC, etc.)

EXAMPLE OF MULTIPLEXING SAME LENGTH
36 BYTES CELLS
(IN THE CASE OF 1-BYTE AAL AND 2-BYTE
MULTIPLEXING INFORMATION)

N: MULTIPLEXED CELL NUMBER INFORMATION
LI1~LIn: SHORT CELL LENGTH INFORMATION
CT(COMPOSITE TYPE): COMPOSITE TYPE INFORMATION
C: ERROR DETECTING/ERROR CORRECTING BITS
(PARITY BITS, CRC, etc.)

CT BITS

| INITIAL CELL | FINAL CELL |
|---|---|
| 0 | 0 |
| 0 | 1 |
| 1 | 0 |
| 1 | 1 |

0: COMPLETE
1: INCOMPLETE

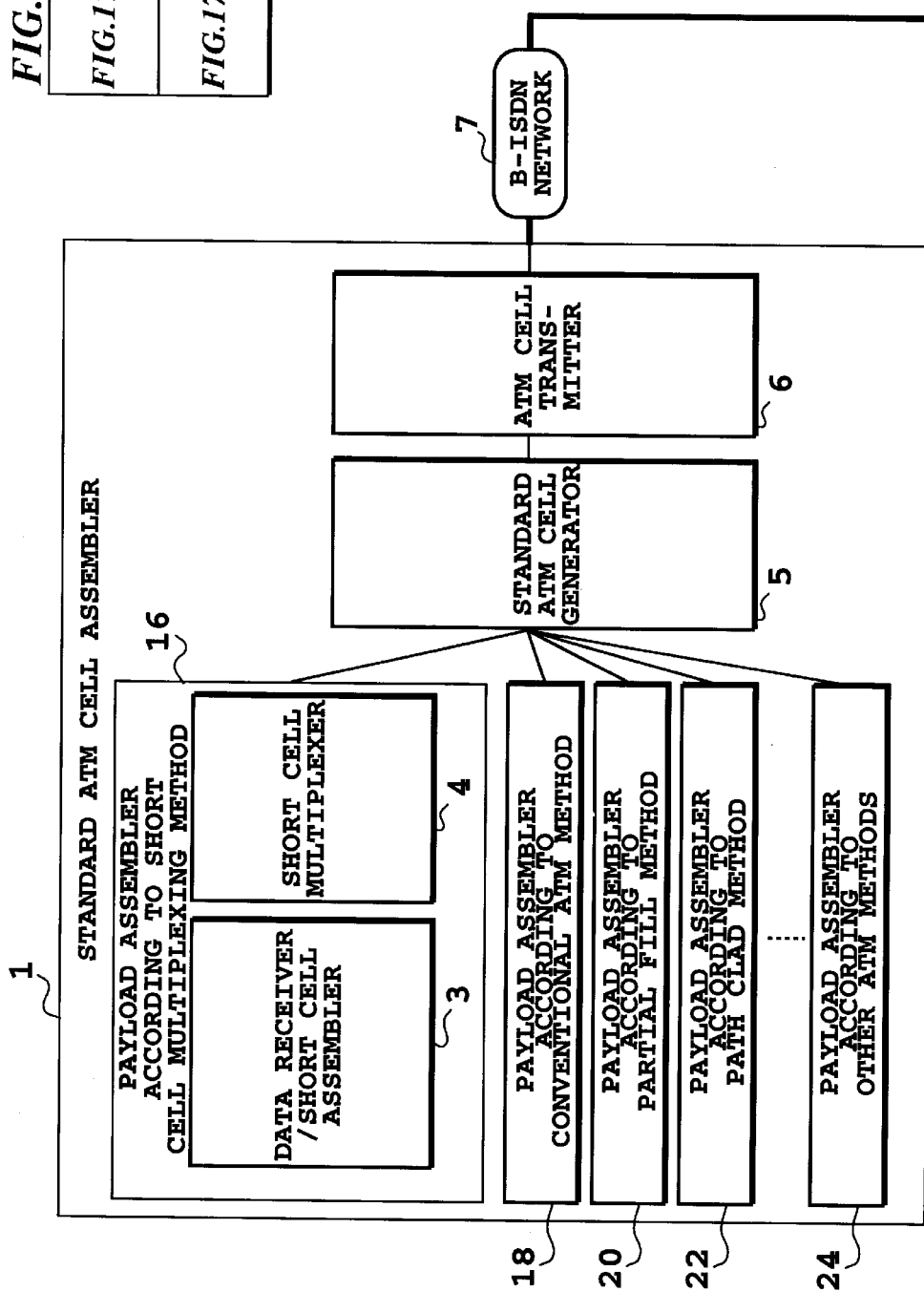

*1: SN CORRESPONDS TO SN INCLUDED IN AAL-TYPE 1.
*2: OID IS A COMBINATION OF ST SHOWN IN EMBODIMENT 2.

FIG.20

| FIG.20A |
|---------|
| FIG.20B |

FIG.20A

| LAYERS | | | DATA FORMAT | REMARKS |
|---|---|---|---|---|
| AAL-CU SERVICE SPECIFIC | APPLICATION | | AAL USER_1  AAL USER_2<br>[AAL-SDU_1]  [AAL-SDU_2] | DIVERSE DATA OF VARIABLE LENGTH. |
| | CS | SSCS | SSCS<br>[ \| AAL-SDU_1]  [ \| AAL-SDU_2]<br>SSCS-PDU HEADER(SC-AAL) | PERFORM SEPARATE PROCESSINGS ACCORDING TO ATTRIBUTES OF INDIVIDUAL DATA. (=SC-AAL) |
| | | CPCS | CPCS FOR ALL AAL-CU USER<br>[▨\|AAL-SDU_1]  [▨\|AAL-SDU_2]<br>CPCS-PDU HEADER SCI:<br>SHORT CELL CONNECTION IDENTIFIER) | PROVIDE SHORT CELL CONNECTION IDENTIFIERS FOR MULTIPLEXING (=SC-H) |

FIG.21

| FIG.21A |
|---------|
| FIG.21B |

FIG.21A

| LAYERS | | | DATA FORMAT | REMARKS |
|---|---|---|---|---|
| APPLICATION | | | AAL USER_1   AAL USER_2<br>[AAL-SDU_1]  [AAL-SDU_2] | DIVERSE DATA OF VARIABLE LENGTH. |
| AAL-CU SERVICE SPECIFIC | SSCS | SSCS | SSCS<br>[AAL-SDU_1]    [AAL-SDU_2]<br>SSCS-PDU HEADER | PERFORM SEPARATE PROCESSINGS ACCORDING TO ATTRIBUTES OF INDIVIDUAL DATA. |
| | CS | CPCS | CPCS FOR ALL AAL-CU USER<br>▨[AAL-SDU_1]   ▨[AAL-SDU_2]<br>CPCS-PDU HEADER SCI:<br>SHORT CELL CONNECTION IDENTIFIER, LL) | PROVIDE SHORT CELL CONNECTION IDENTIFIERS FOR MULTIPLEXING (=SC-H). PROVIDE LENGTH INFORMATION (LI) OF RESPECTIVE SHORT CELLS. |

FIG.22

| FIG.22A |
|---------|
| FIG.22B |

FIG.22A

| LAYERS | | DATA FORMAT | REMARKS |
|---|---|---|---|
| APPLICATION | | AAL USER_1  AAL-SDU_1    AAL USER_2  AAL-SDU_2 | DIVERSE DATA OF VARIABLE LENGTH. |
| AAL-CU SERVICE SPECIFIC | SSCS | SSCS  [ AAL-SDU_1 ]    [ AAL-SDU_2 ]  SSCS-PDU HEADER | PERFORM SEPARATE PROCESSINGS ACCORDING TO ATTRIBUTES OF INDIVIDUAL DATA (SC-AAL). |
| | CPCS | CPCS FOR ALL AAL-CU USER  [▨ AAL-SDU_1 ]    [▨ AAL-SDU_2 ]  CPCS-PDU HEADER SCI: SHORT CELL CONNECTION IDENTIFIER | PROVIDE SHORT CELL CONNECTION IDENTIFIERS FOR MULTIPLEXING (=SC-H). |

| STANDARD ATM CELL ASSEMBLER | | STANDARD ATM CELL DISASSEMBLER | | FIG.20 |
|---|---|---|---|---|
| DATA RECEIVER/ SHORT CELL ASSEMBLER | DATA RECEIVER | SHORT CELL PROCESSOR/ DATA TRANSMITTER | DATA TRANSMITTING PORTION | APPLICATION |
| | SC-PL ASSEMBLER | | SC-PL PROCESSOR | SSCS |
| | SC-AAL PROVIDER | | SC-AAL PROCESSOR | CPCS |
| | SC-H PROVIDER | | SC-H PROCESSOR | SAR |
| SHORT CELL MULTIPLEXER A | MULTIPLEXING COMBINATION DETERMINER A | SHORT CELL DISASSEMBLER | SHORT CELL DISASSEMBLING PORTION | |
| | SHORT CELL INFORMATION PROVIDER A | | | |
| | SHORT CELL MULTIPLEXING PORTION A | | | |
| STANDARD ATM CELL GENERATOR | STANDARD AAL PROVIDER | STANDARD ATM CELL PROCESSOR | STANDARD AAL PROCESSOR | ATM-LAYER (SUBORDINATE TO AAL) |
| | ATM-H PROVIDER | | ATM-H PROCESSOR | |

*FIG.23*

| STANDARD ATM CELL ASSEMBLER | | | STANDARD ATM CELL DISASSEMBLER | | FIG.21 |
|---|---|---|---|---|---|
| DATA RECEIVER / SHORT CELL ASSEMBLER | DATA RECEIVER | SC-PL ASSEMBLER | SHORT CELL PROCESSOR/ DATA TRANSMITTER | DATA TRANSMITTING PORTION | APPLICATION |
| | | SC-AAL PROVIDER | | SC-PL PROCESSOR | SSCS |
| | | SC-H PROVIDER (NOTE 1) | | SC-AAL PROCESSOR | CPCS |
| SHORT CELL MULTIPLEXER A | SHORT CELL INFORMATION PROVIDER A (NOTE 1) | | SHORT CELL DISASSEMBLER | SC-H PROCESSOR | SAR |
| | MULTIPLEXING COMBINATION DETERMINER A | | | | |
| | SHORT CELL MULTIPLEXING PORTION A | | | | |
| STANDARD ATM CELL GENERATOR | STANDARD AAL PROVIDER | | STANDARD ATM CELL PROCESSOR | STANDARD AAL PROCESSOR | |
| | ATM-H PROVIDER | | | ATM-H PROCESSOR | ATM-LAYER (SUBORDINATE TO AAL) |

NOTE 1: SC-H PROVIDER AND SHORT CELL INFORMATION PROVIDER A CAN COOPERATE OR BE INTEGRATED.

| | STANDARD ATM CELL ASSEMBLER | STANDARD ATM CELL DISASSEMBLER | | FIG.22 |
|---|---|---|---|---|
| DATA RECEIVER / SHORT CELL ASSEMBLER | DATA RECEIVER: SC-PL ASSEMBLER / SC-AAL PROVIDER / SC-H PROVIDER | SHORT CELL PROCESSOR / DATA TRANSMITTER | DATA TRANSMITTING PORTION: SC-PL PROCESSOR / SC-AAL PROCESSOR / SC-H PROCESSOR | APPLICATION / SSCS / CPCS |
| SHORT CELL MULTIPLEXER B | MULTIPLEXING COMBINATION DETERMINER B | SHORT CELL DISASSEMBLER | SHORT CELL DISASSEMBLING PORTION B | SAR |
| | SHORT CELL MULTIPLEXING PORTION B | | MULTIPLEXING INFORMATION ANALYZER B (NOTE 2) | |
| | MULTIPLEXING INFORMATION GENERATOR B (NOTE 1) | | | |
| | STANDARD AAL PROVIDER (NOTE 1) | STANDARD ATM CELL PROCESSOR | STANDARD AAL PROVIDER (NOTE 2) | |
| STANDARD ATM CELL GENERATOR | ATM-H PROVIDER | | ATM-H PROCESSOR | ATM-LAYER (SUBORDINATE TO AAL) |

NOTE 1: MULTIPLEXING INFORMATION GENERATOR B AND STANDARD AAL PROVIDER CAN COOPERATE OR BE INTEGRATED.

NOTE 2: MULTIPLEXING INFORMATION ANALYZER B AND STANDARD AAL PROCESSOR CAN COOPERATE OR BE INTEGRATED.

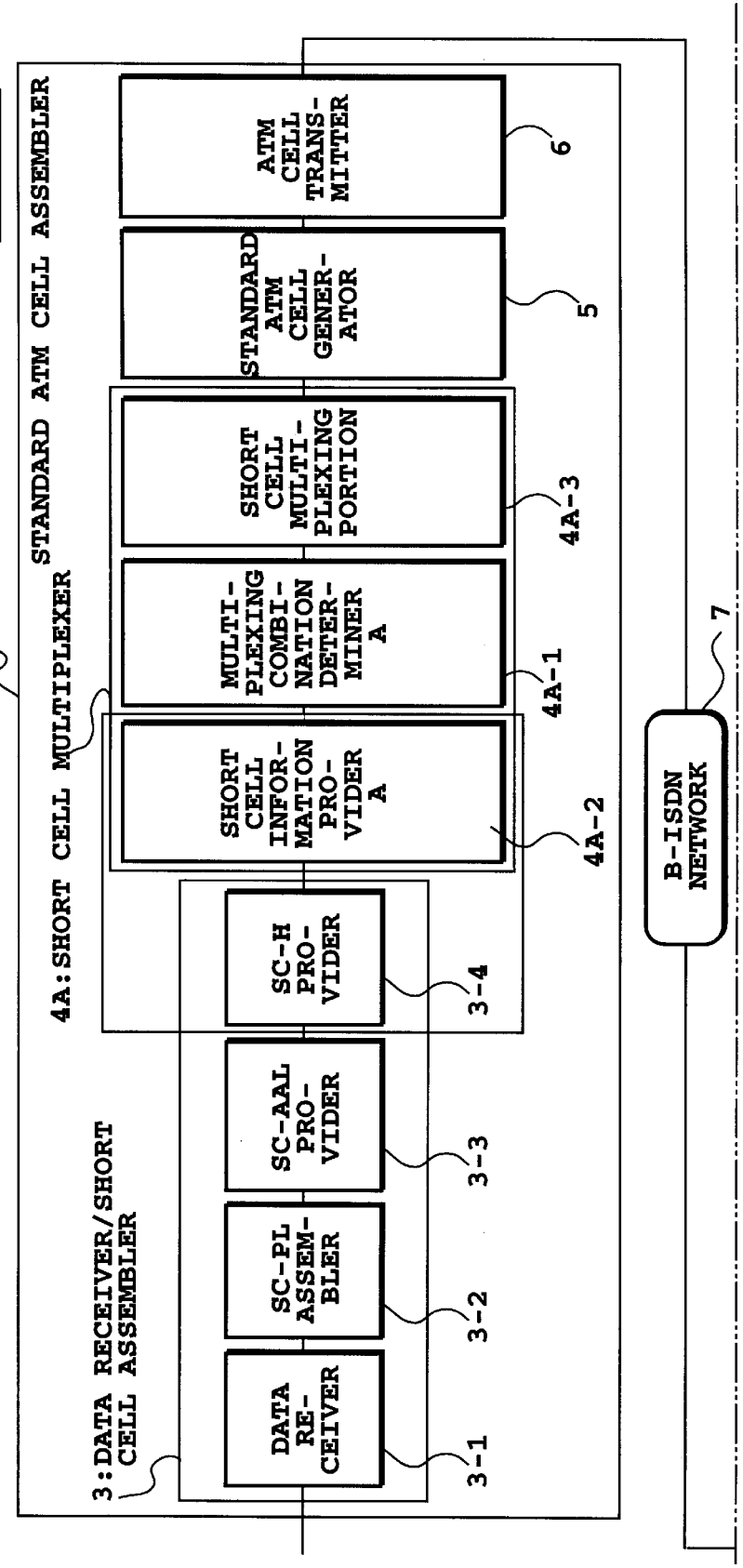

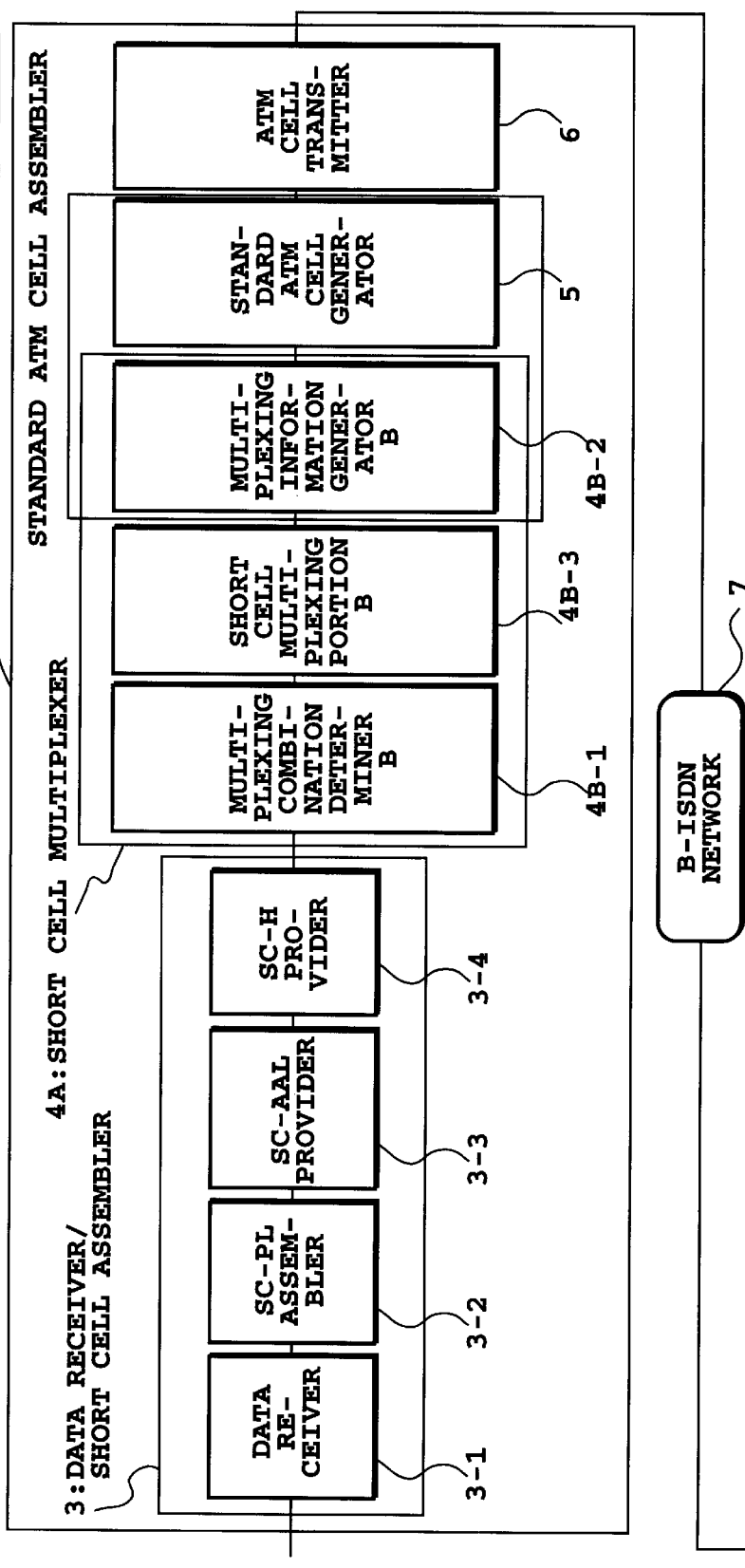

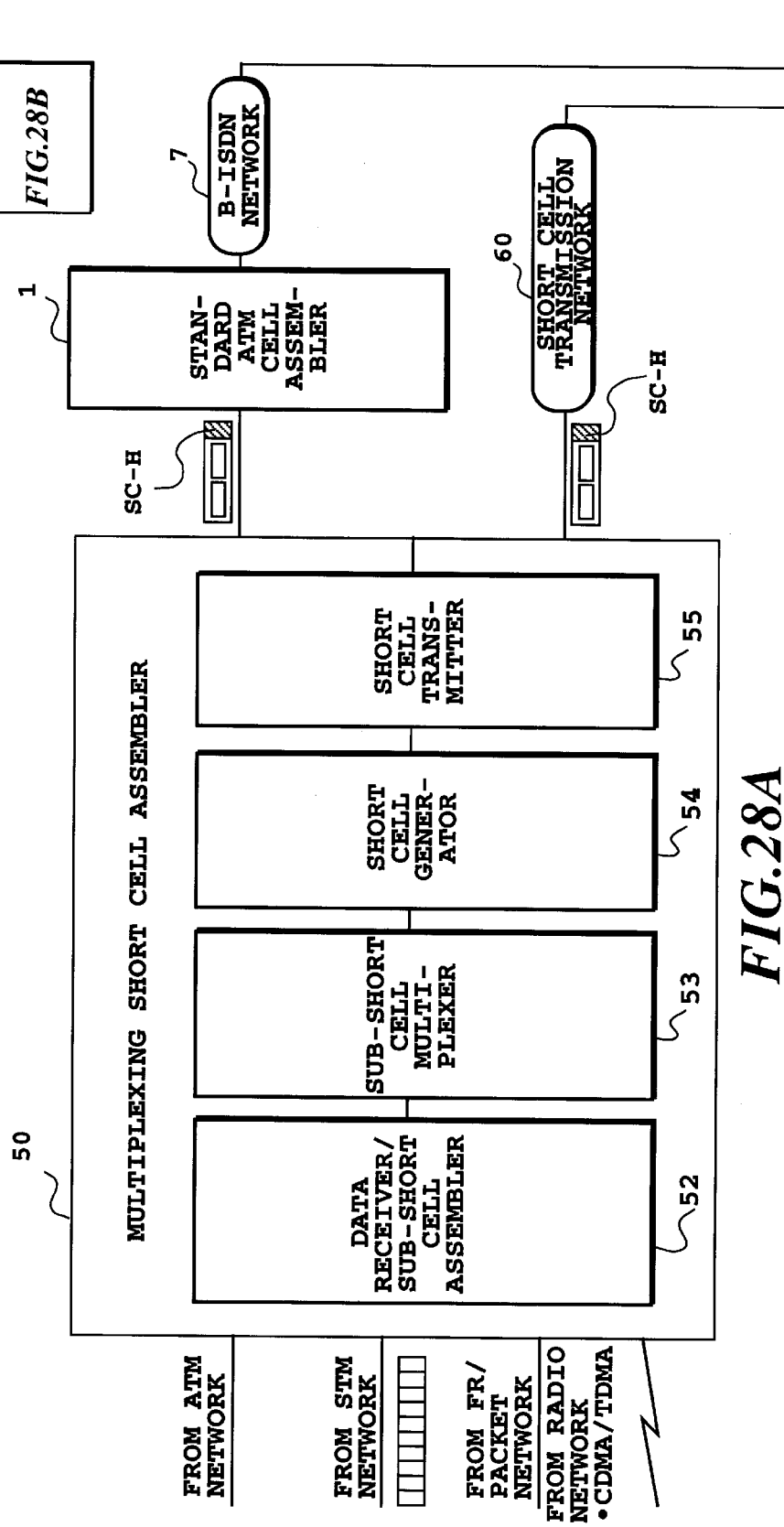

S-SC: SUB-SHORT CELL
S-SC-H: SUB-SHORT CELL HEADER

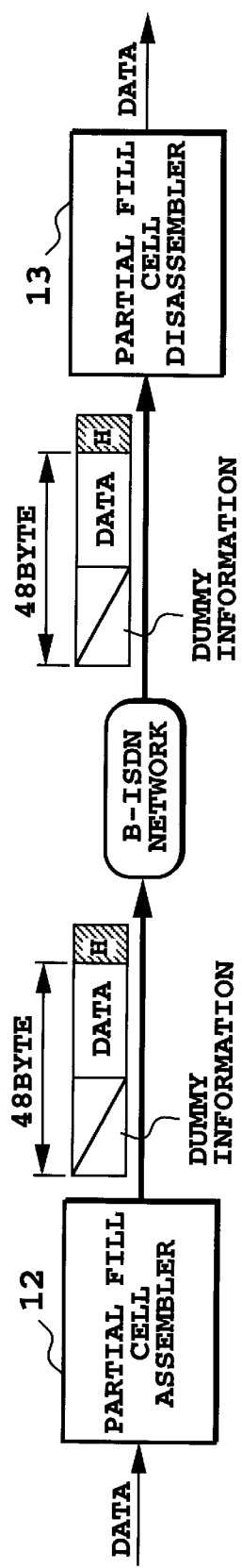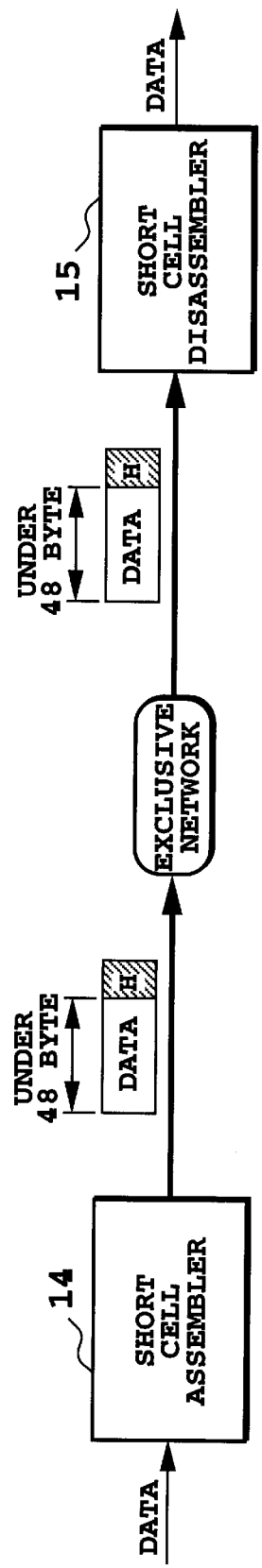

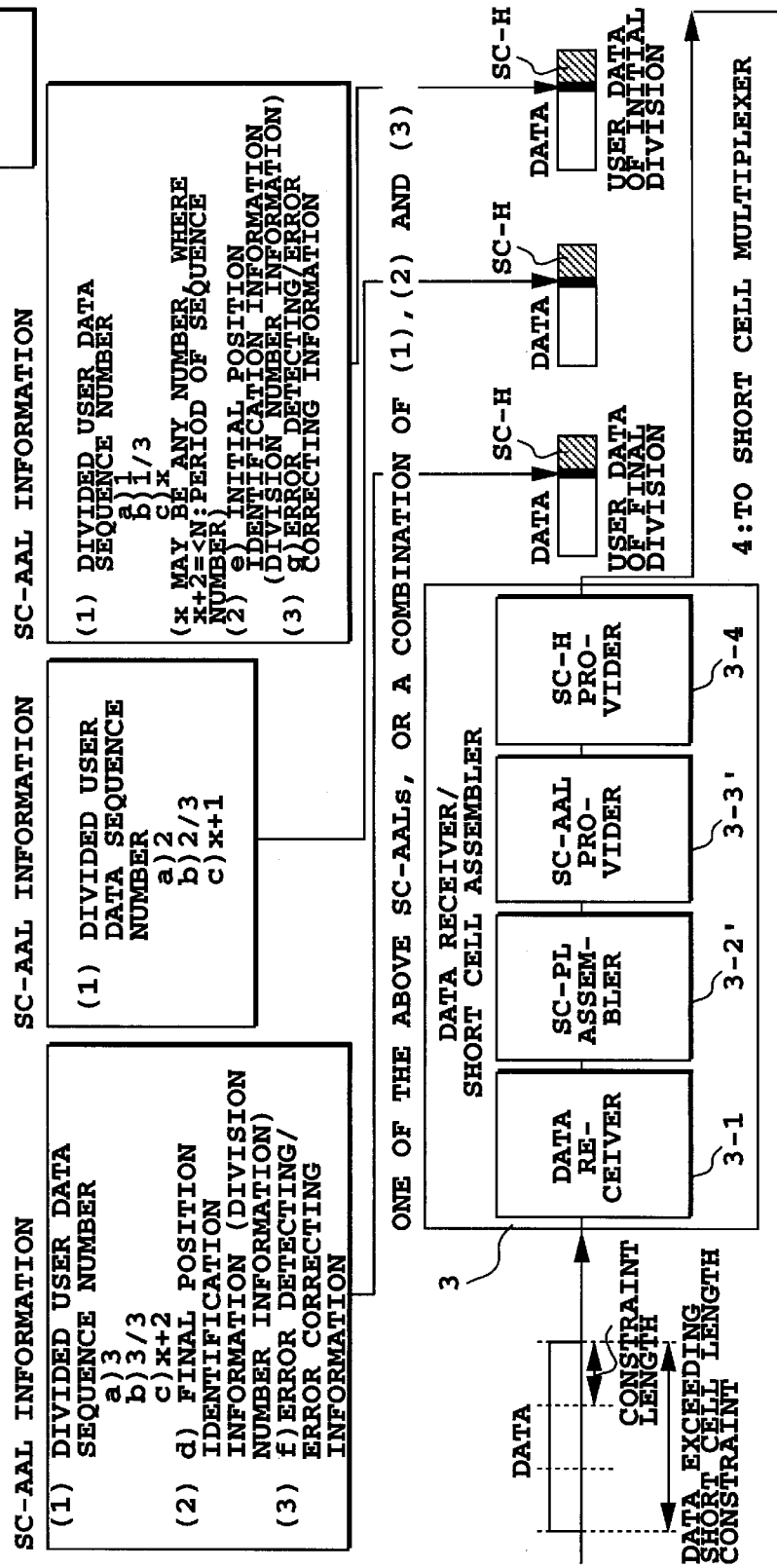

| STANDARD ATM CELL ASSEMBLER | | | | STANDARD ATM CELL DISASSEMBLER | | | |
|---|---|---|---|---|---|---|---|
| DATA RECEIVER / SHORT CELL ASSEMBLER | DATA RECEIVER | | | SHORT CELL PROCESSOR / DATA TRANSMITTER | DATA TRANSMITTING PORTION | | APPLICATION |
| | SC-PL ASSEMBLER | | | | SC-PL PROCESSOR | | |
| | SC-AAL PROVIDER | | | | SC-AAL PROCESSOR | | SSCS |
| | SC-H PROVIDER | | | | SC-H PROCESSOR | | CPCS |

FIG.34

SHORT CELL MULTIPLEXED ATM TRANSMISSION SYSTEM AND TRANSMISSION METHOD

This application is based on Patent Application No. 08-052,169 filed Mar. 8, 1996 in Japan, the content of which is incorporated hereinto by reference. In addition, this application is a continuation application of International Application No. PCT/JP96/02954 filed Oct. 11, 1996.

TECHNICAL FIELD

The present invention relates to ATM transmission, and particularly to a short cell multiplexing for transmitting, over an ATM network, data shorter than the payload of a standard ATM cell (basically less than 48 bytes, but more than 48 bytes can be allowed) which is transmitted through a network such as an ATM network, private short cell network, STM (Synchronous Transport Module) network, radio, packet network, or FR (Frame Relay) network.

BACKGROUND ART

Forming ATM cells from low bit rate, highly real time information like voice will cause a large delay time if the information is stored fully in the payload of the standard ATM cell, resulting in the degradation in the information. To prevent this, a partial fill method is proposed which loads the information partially (into part of the ATM cell) to be transmitted.

On the other hand, in a local environment like premises, a short cell using a payload shorter than the 48-byte payload of the standard ATM cell is proposed, which is expected to match better to the low bit rate data.

FIGS. 30A and 30B illustrate the partial fill method and short cell method.

In the partial fill method as shown in FIG. 30A, a partial fill cell assembler 12 forms a standard ATM cell by adding dummy data to input data, and outputs it to a B-ISDN network. A partial fill cell disassembler 13 extracts the data from the partial fill cell received from the B-ISDN network, and outputs it.

In the short cell method as shown in FIG. 30B, a short cell assembler 14 forms from input data a short cell matching to an intended data length, and outputs it to an exclusive network having a unique cell slot structure. A short cell disassembler 15 extracts the data from the short cell received from the exclusive network, and outputs it.

DISCLOSURE OF THE INVENTION

The partial fill method described as the conventional techniques has a problem in that it impairs efficiency of utilizing the payload of the standard ATM cell and hence the transmission efficiency accompanying that because it uses only part of the payload of the standard ATM cell.

The short cell method, on the other hand, requires the exclusive network with a unique cell slot structure, which causes a problem of bad matching with the standard ATM switching network (B-ISDN network).

In view of these, a short cell multiplex transmission method is proposed which multiplexes information from multiple users to a single ATM cell (ISS' 95 Nakajima). This method multiplexes short packets received from different users within a predetermined time period into the payload of an ATM cell. This has advantages of limiting the delay below a certain fixed amount, thereby improving the efficiency.

In connection with the transmission method, a Shinagawa patent is disclosed. Besides, a Mita patent application has been filed which increases the degree of freedom in combining the users to be multiplexed.

In handling variable length user data, the following two methods can be considered: A first method fills the variable length user data into a predetermined fixed length short cell and fills dummy information into the remainder of the cell; and a second method forms variable length short cells in accordance with the user data, thereby multiplexing/demultiplexing them into or from the ATM cell. Although the second method is superior to the first method in efficiency, it requires a technique to decide the length of the variable short cells which vary for each ATM cell to extract them. The second method has another problem in that its payload efficiency is somewhat impaired as compared with the method which transmits the payload after filling it completely, because the second method, if higher transmission efficiency is required, transmits the ATM payload after loading it with the dummy information when its occupation ratio reaches to a certain level and no new short cell can be expected to be multiplexed into the ATM cell. Thus, a cell overlapping technique is effective which allows a variable length short cell to undergo multiplexing/demultiplexing across more than one ATM cell (Docomo, ATM-F).

In connection with one of the technique of multiplexing/demultiplexing variable short cells into or from one or more ATM cells, ATT filed a letter to ITU. According to the ATT letter, each short cell is provided with length information and user identifier (LLN: logical link number) to implement the extraction of variable length short cells. The first half of a short cell extending over two ATM cells is provided with the length information indicating the entire length of the short cell, and the second half multiplexed at the initial position of the next ATM cell is provided with the length information indicating only the length of the latter part of the short cell. A receiving end, when the length information of the short cell exceeds the end of the payload of the ATM cell, decides that it continues to the next ATM cell, and combines the first half and second half of the short cell overlapping the two ATM cell when the length of the remainder of the short cell equals the length indicated by the length information of the latter half multiplexed into the initial position of the next received ATM cell.

This method, however, has the following two problems if the synchronization for the extraction processing of the short cell is lost owing to the loss of the ATM cell during its transmission. First, if the length information of the second half of the short cell multiplexed into the initial position of the ATM cell received after the cell loss disagrees with the length of the remainder expected from the previously received first half of the overlapping short cell, it is impossible to decide whether or not the short cell multiplexed at the initial position of the next received ATM cell is a complete short cell or the continued short cell from the lost ATM cell, even though the cell loss can be detected (problem 1). Second, in spite of the cell loss, if the expected length of the remainder happens to agree with the length information of the latter half of the short cell multiplexed into the initial position of the ATM cell received after the cell loss, not only the cell loss is undetected, but also erroneous short cells are combined (problem 2).

The present invention features the following three aspects in connection with the variable short cell multiplexed transmission system and method.

(1) A multiplex transmission method providing each short cell with information for multiplexing and demultiplexing (embodiment 1).

(2) A multiplex transmission method providing each ATM cell collectively with information for multiplexing and demultiplexing (embodiment 2).

(3) A multiplex transmission method providing no information for multiplexing and demultiplexing (embodiment 3).

Although the item (1) has a similar characteristic to that of the ATT letter in that multiplexing and demultiplexing is carried out by providing each short cell with the length information, it solves the problem 1 of the ATT letter by deciding the cell overlapping not by the length information but by proving short cell status information. Furthermore, it can add control information on the ATM transmission to the multiplexed data of the short cells to achieve more reliable detection of the cell loss for each ATM cell as an option to solve the problem 2.

The foregoing items (2) and (3) relate to novel short cell multiplex transmission methods which have not yet been disclosed.

According to the first aspect of the present invention, a short cell multiplexing ATM transmission system comprises:

a standard ATM cell assembler (1) for forming short cells from various types of input information, and for multiplexing the short cells to be placed in a payload of one or more standard ATM cells to be output to an ATM switching network;

an ATM switching network (7) for transmitting the standard ATM cells; and a standard ATM cell disassembler (2) for receiving a short cell multiplexed ATM cell, and for disassembling the short cell multiplexed ATM cell into short cells which are converted into an output data format of a channel and output to the channel.

According to the second aspect of the present invention, a standard ATM cell assembler comprises:

a data receiver/short cell assembler (3) for receiving various types of input information such as private short cells, ATM cells, STM frames, information packets of a frame relay or a packet network, TDMA/FDMA radio frames, and CDMA radio packets, and for forming short cells for each type of the information;

a short cell multiplexer (4) for multiplexing short cells onto a payload of one or more standard ATM cells;

a standard ATM cell generator (5) for receiving multiplexed data as a standard ATM payload, and for forming a standard ATM cell by adding an AAL and a header; and an ATM cell transmitter (6) for outputting the standard ATM cell to an ATM switching network.

In the standard ATM cell assembler (1), the standard ATM cell generator (5) may form the standard ATM cell by inputting data other than the multiplexed data fed from the short cell multiplexer (4).

In the standard ATM cell assembler (1), the data receiver/ short cell assembler (3) may comprise:

a data receiving portion (3-1) for receiving various types of data such as private short cells, ATM cells, STM frames, information packets of a frame relay or a packet network, TDMA/FDMA radio frames, and CDMA radio packets;

an SC-PL assembler (3-2) for forming a payload of a short cell (SC-PL) by extracting input data frame by frame or packet by packet;

an SC-AAL provider (3-3) for providing an AAL of the short cell based on attributes of the data as needed; and an SC-H provider (3-4) for providing a header of the short cell by converting address information of the data.

In the standard ATM cell assembler (1), the short cell multiplexer (4) may comprise:

a multiplexing combination determiner A (4A-1) for deciding a combination and order of multiplexing parties of a plurality of input short cells with a free length in accordance with purposes (such as multiplexing data for each data attribute, for each identical cell length, for each identical route);

a short cell information provider A (4A-2) for providing each short cell with short cell information including length information of the short cell; and a short cell multiplexing portion A (4A-3) for linking the short cells provided with the short cell information in accordance with a decision of the multiplexing combination determiner A (4A-1).

In the standard ATM cell assembler (1), the short cell multiplexer (4) may comprise:

a multiplexing combination determiner B (4B-1) for deciding a combination and order from among predetermined multiplexing parties of a plurality of input short cells with a free length in accordance with purposes (such as multiplexing data for each data attribute, for each identical cell length, for each identical route);

a multiplexing information generator B (4B-2) for generating multiplexing information including information on lengths and a number of short cells to be multiplexed; and a short cell multiplexing portion B (4B-3) for linking the short cells and the multiplexing information in accordance with a decision of the multiplexing combination determiner B (4B-1).

In the standard ATM cell assembler (1), the short cell multiplexer (4) may comprise:

a multiplexing combination determiner C (4C-1) for deciding a combination and order from among predetermined multiplexing parties of a plurality of input short cells with a free length in accordance with purposes (such as multiplexing data for each data attribute, for each identical cell length, for each identical route); and a short cell multiplexing portion C (4C-2) for linking the short cells in accordance with a decision of the multiplexing combination determiner C (4C-1).

In the standard ATM cell assembler (1), the multiplexing information may include multiplex pattern identifiers (PI) representing a multiplexed data structure to make correspondence between the multiplex pattern identifiers and the multiplexed data structures, and wherein the short cell multiplexer (4) provides multiplexing information corresponding to the multiplexed data structure.

In the standard ATM cell assembler (1), the multiplexing information may include:

multiplexed cell number information (N) indicating a number of identical length short cells multiplexed onto a payload of a standard ATM cell; and short cell length information (L) indicating a length of multiplexed short cells, and wherein the short cell multiplexer (4) provides multiplexing information corresponding to a multiplexed data structure.

In the standard ATM cell assembler (1), the multiplexing information may include:

multiplexed cell number information (N) indicating a number of short cells multiplexed onto a payload of a standard ATM cell, and short cell length information (LI1-LIN) indicating a length of each of the multiplexed short cells, and wherein the short cell multiplexer (4) provides multiplexing information corresponding to a multiplexed data structure.

According to the third aspect of the present invention, a standard ATM cell disassembler comprises:

an ATM cell receiver (8) for receiving standard ATM cells sent from a B-ISDN network (7);

a standard ATM cell processor (9) for obtaining payloads by carrying out disassembly/processing of the received standard ATM cells;

a short cell disassembler (10) for disassembling obtained payloads into short cells; and a short cell processor/data transmitter (11) for carrying out a predetermined processing of each of the short cells to convert them into various types of output information such as private short cells, ATM cells, STM cells, information packets of a frame relay or a packet network, TDMA/FDMA radio frames, and CDMA radio packets, and for outputting the converted data to respective channels.

In the standard ATM cell disassembler (2), the standard ATM cell processor (9) may output data other than to the short cell disassembler (10) to have the ATM standard cells processed.

In the standard ATM cell disassembler (2), the short cell disassembler (10) may extract short cell information sequentially beginning from an initial position of multiplexed data, and disassembles the multiplexed data into short cells by analyzing the short cell information.

In the standard ATM cell disassembler (2), the short cell disassembler (10) may comprise:

a multiplexing information analyzer B (10B-1) for extracting and analyzing multiplexing information; and a short cell disassembler B (10B-2) for disassembling multiplexed data into short cells in accordance with analyzed results given by the multiplexing information analyzer B (10B-1).

In the standard ATM cell disassembler (2), the short cell disassembler (10) may disassemble multiplexed data into short cells in accordance with a predetermined structure.

In the standard ATM cell disassembler (2), the short cell processor/data transmitter (11) may comprise:

an SC-H processor (11-1) for processing a of a received short cell SC-H;

an SC-AAL processor (11-2) for carrying out an AAL processing if the short cell includes an AAL;

an SC-PL processor (11-3) for processing a payload of the short cell; and a data transmitter (11-4) for converting the short cell to each format of output data to be output to a channel.

In the standard ATM cell disassembler (2), the multiplexing information of the standard ATM cell may include multiplex pattern identifiers (PI) representing a multiplexed data structure to make correspondence between the multiplex pattern identifiers and the multiplexed data structures, and wherein the short cell disassembler (10) disassembles into the multiplexed data structure corresponding to the multiplexing information.

In the standard ATM cell disassembler (2), the multiplexing information of the standard ATM cell may include:

multiplexed cell number information (N) indicating a number of identical length short cells multiplexed onto a payload of the standard ATM cell; and short cell length information (L) indicating a length of the multiplexed short cells, and wherein the short cell disassembler (10) disassembles into a multiplexed data structure corresponding to the multiplexing information.

In the standard ATM cell disassembler (2), the multiplexing information may include:

multiplexed cell number information (N) indicating a number of short cells multiplexed onto a payload of a standard ATM cell, and short cell length information (LI1-LIN) indicating a length of each of the multiplexed short cells, and wherein the short cell disassembler (10) disassembles into a multiplexed data structure corresponding to the multiplexing information.

Here, the standard ATM cell assembler/disassembler may comprise the standard ATM cell assembler (1) and the standard ATM cell disassembler (2).

In the standard ATM cell assembler/disassembler, the short cell hierarchically may multiplex sub-short cells.

According to the fourth aspect of the present invention, a short cell multiplexing ATM transmission method comprises the steps of:

assembling one or more standard ATM cells to be output to an ATM switching network, each the standard ATM cell including a payload including one or more multiplexed short cells formed from various types of input information;

transmitting the standard ATM cells; and receiving short cell multiplexed ATM cells, disassembles them into short cells, and output them to a channel after converting into an output data format.

In the short cell multiplexing ATM transmission method, the short cell may hierarchically multiplex sub-short cells.

According to the fifth aspect of the present invention, a short cell multiplexing ATM transmission method comprises the steps of:

forming short cells from various types of input information, multiplexing the short cells to be placed in a payload of one or more standard ATM cells, receiving multiplexed data as a standard ATM payload, assembling a standard ATM cell by adding an AAL and a header to be sent to an ATM switching network;

receiving a short cell multiplexed ATM cell, disassembling the received short cell multiplexed ATM cell to obtain its payload, disassembles the obtained payload into short cells which are converted into an output data format to be output to a channel.

According to the sixth aspect of the present invention, a short cell multiplexing ATM transmission method comprising the steps of:

forming short cells from various types of input information, providing each short cell with information which must be individually provided for the short cells as a short cell multiplexing individual AAL, forming multiplexed data by multiplexing the short cells, providing the multiplexed data with a short cell multiplexing common AAL shared by ATM cells assembled, providing the standard ATM cells with an ATM header and sends the standard ATM cells to an ATM switching network;

receiving the short cell multiplexed ATM cells, and routing them to processors in accordance with the ATM headers;

extracting short cells through processing of the multiplexed data in accordance with a combination of the short cell multiplexing common AAL and the short cell multiplexing individual AAL; and individually processing the short cells in accordance with the short cell multiplexing individual AAL, and converting the short cells into output data to be output.

In the short cell multiplexing ATM transmission method, the combination of the short cell multiplexing common AAL and the short cell multiplexing individual AAL may comprise, in the short cell multiplexing individual AAL, length information and overlapping information.

In the short cell multiplexing ATM transmission method, the combination of the short cell multiplexing common AAL and the short cell multiplexing individual AAL may comprise, in the short cell multiplexing common AAL, length information and overlapping information.

In the short cell multiplexing ATM transmission method, the combination of the short cell multiplexing common AAL and the short cell multiplexing individual AAL may comprise overlapping information in the short cell multiplexing common AAL, and length information in the short cell multiplexing individual AAL.

According to the seventh aspect of the present invention, a standard ATM cell assembler which receives various types of input information such as private short cells, ATM, STM frames, information packets of a frame relay or a packet network, TDMA/FDMA radio frames, and CDMA radio packets, and assembles standard ATM cells, the standard ATM cell assembler comprises:

means for providing an AAL common to the assembled standard ATM cell as a short cell multiplexing common AAL; and means for providing information which must be individually provided for the short cells as a short cell multiplexing individual AAL.

In the standard ATM cell assembler, the short cell multiplexing individual AAL may be provided with length information for short cell multiplexing.

In the standard ATM cell assembler, the length information may provide a length of a short cell to be multiplexed before dividing the short cell.

In the standard ATM cell assembler, the length information may provide a length of a short cell divided into units each corresponding to the standard ATM cell.

In the standard ATM cell assembler, the short cell multiplexing common AAL may be provided with length information for short cell multiplexing.

In the standard ATM cell assembler, the short cell multiplexing common AAL may be provided with overlapping information indicating that the short cell is multiplexed onto standard ATM cells in an overlapped manner.

In the standard ATM cell assembler, the short cell multiplexing individual AAL may be provided with overlapping information indicating that the short cell is multiplexed onto standard ATM cells in an overlapped manner.

In the standard ATM cell assembler, the short cell multiplexing individual AAL may be provided with information for individually processing the short cells.

In the standard ATM cell assembler, the information for individually processing the short cells may be provided with information identifying switched points of speech burst/mute.

In the standard ATM cell assembler, the information for individually processing the short cells may be provided with information indicating individuality of contents of data included in the short cells, or with information indicating quality.

According to the eighth aspect of the present invention, a standard ATM cell assembler comprises providing a short cell multiplexing individual AAL which is provided with length information after division.

According to the ninth aspect of the present invention, a standard ATM cell disassembler which receives standard ATM cells assembled from various types of input data such as private short cells, ATM, STM frames, information packets of a frame relay or a packet network, TDMA/FDMA radio frames, and CDMA radio packets, and disassembles the standard ATM cells into short cells, the standard ATM cell disassembler comprises:

means for disassembling into short cells using a short cell multiplexing common AAL which is provided in common to the standard ATM cells and a short cell multiplexing individual AAL which is provided individually for the short cells; and means for carrying out processing of disassembled individual short cells.

In the standard ATM cell disassembler, the short cell multiplexing individual AAL may be provided with length information for short cell multiplexing.

In the standard ATM cell disassembler, the length information may be provided with a length of the multiplexed short cells before division.

In the standard ATM cell disassembler, the length information may be provided with lengths after divided into units each corresponding to the standard ATM cell.

According to the tenth aspect of the present invention, a standard ATM cell disassembler comprises providing a short cell multiplexing individual AAL which is provided with length information after division.

In the standard ATM cell disassembler, the short cell multiplexing common AAL may be provided with length information for short cell multiplexing.

In the standard ATM cell disassembler, the short cell multiplexing common AAL may be provided with overlapping information indicating that the short cell is multiplexed onto standard ATM cells in an overlapped manner.

In the standard ATM cell disassembler, the short cell multiplexing individual AAL may be provided with overlapping information indicating that the short cell is multiplexed onto standard ATM cells in an overlapped manner.

In the standard ATM cell disassembler, the short cell multiplexing individual AAL may be provided with information for individually processing the short cells.

In the standard ATM cell disassembler, the information for individually processing the short cells may be provided with information identifying switched points of speech burst/mute.

In the standard ATM cell disassembler, the information for individually processing the short cells may be provided with information indicating individuality of contents of data included in the short cells, or with information indicating quality.

Here, the short cell multiplexing ATM transmission system, in which a standard ATM cell assembler may be linked with a standard ATM cell disassembler via a standard ATM cell switching network.

In the short cell multiplexing ATM transmission system, the short cell may hierarchically multiplex sub-short cells.

In the SC-AAL provider (3-3, 3-3') of a data receiver/short cell assembler (3) in the standard ATM cell assembler (1), the SC-AAL provider may provide a last one or a first one of divided user data with a final identifier or an initial identifier as the SC-AAL.

In the SC-AAL provider of a data receiver/short cell assembler (3), the final identifier may comprise an identifying bit indicating that the divided user data is the last one.

In the SC-AAL provider of a data receiver/short cell assembler (3), the initial identifier may comprise an identifying bit indicating that the divided user data is the first one.

BRIEF DESCRIPTION OF THE DRAWINGS

FIG. 1 is a diagram showing a relationship between FIGS. 1A and 1B;

FIG. 1A is a block diagram showing a configuration of a fundamental system employing a short cell multiplexed ATM transmission method in accordance with the present invention;

FIG. 17 is a diagram showing the relationship between FIGS. 17A and 17B;

FIG. 17A is a block diagram showing a combined transmission of the short cell multiplexed transmission and other transmissions;

FIG. 20 is a diagram showing the relationship between FIGS. 20A and 20B;

FIG. 20A is a diagram illustrating a short cell multiplexing processing;

FIG. 21 is a diagram showing the relationship between FIGS. 21A and 21B;

FIG. 21A is a diagram illustrating a short cell multiplexing processing;

FIG. 22 is a diagram showing the relationship between FIGS. 22A and 22B;

FIG. 22A is a diagram illustrating a short cell multiplexing processing;

FIG. 23 is a diagram illustrating a system configuration for implementing the short cell multiplexing processing;

FIG. 24 is a diagram illustrating a system configuration for implementing the short cell multiplexing processing;

FIG. 25 is a diagram illustrating a system configuration for implementing the short cell multiplexing processing;

FIG. 26 is a diagram showing the relationship between FIGS. 26A and 26B;

FIG. 26A is a block diagram illustrating a system configuration for implementing the short cell multiplexing processing;

FIG. 27 is a diagram showing the relationship between FIGS. 27A and 27B;

FIG. 27A is a block diagram illustrating a system configuration for implementing the short cell multiplexing processing;

FIG. 28 is a diagram showing the relationship between FIGS. 28A and 28B;

FIG. 28A is a block diagram illustrating a system configuration for implementing a sub-short cell multiplexing;

FIG. 30A is a block diagram illustrating a conventional partial fill method and short cell method;

FIG. 30B is a block diagram illustrating a conventional partial fill method and short cell method;

FIG. 32 is a diagram showing the relationship between FIGS. 32A and 32B;

FIG. 32A is a block diagram illustrating a data receiver/short cell assembler and a short cell processor/data transmitter when dividing user data;

FIG. 34 is a diagram illustrating the correspondence between sublayers and a processor when carrying out the processing associated with FIG. 33;

BEST MODE FOR CARRYING OUT THE INVENTION

The embodiments in accordance with the invention will now be described with reference to the accompanying drawings.

Figure 1B:
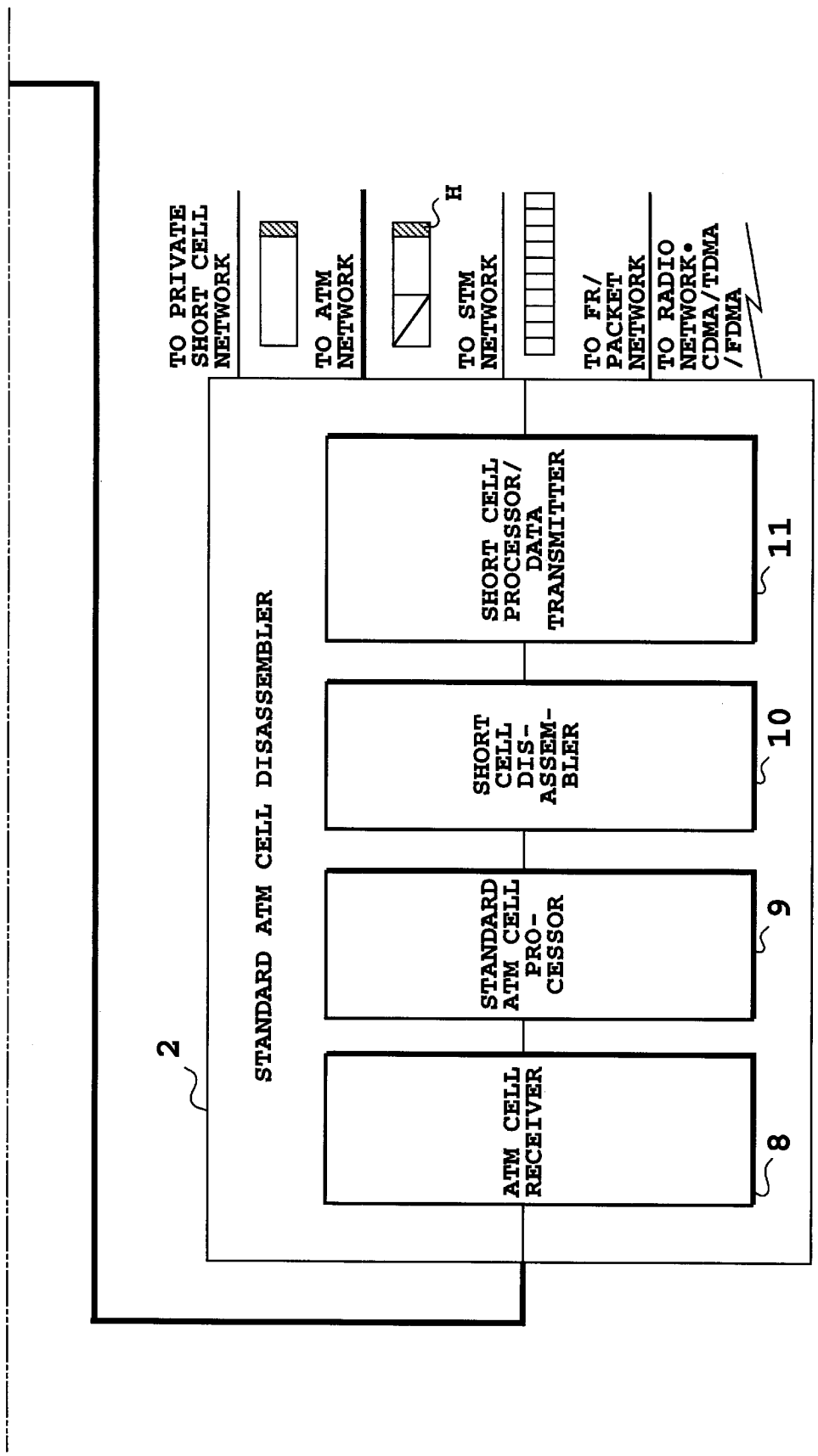
FIG. 1B is a block diagram showing the configuration of the fundamental system employing the short cell multiplexed ATM transmission method in accordance with the present invention.

FIGS. 1A and 1B shows an embodiment in accordance with the present invention. In FIGS. 1A and 1B, the reference numeral 1 designates a standard ATM cell assembler, 7 designates a B-ISDN network on which a standard ATM switching network is constructed, and 2 designates a standard ATM cell disassembler. The standard ATM cell assembler 1 is composed of a data receiver/short cell assembler 3, a short cell multiplexer 4, a standard ATM cell generator 5 and an ATM cell transmitter 6. The standard ATM cell disassembler 2 is composed of an ATM cell receiver 8, a standard ATM cell processor 9, a short cell disassembler 10, and a short cell processor/data transmitter 11. These blocks will be described in more detail later.

The standard ATM cell assembler 1 converts into short cells various input information such as a private short cell, ATM cell, STM frame, information packet of a frame relay or packet network, TDMA/FDMA radio frame, CDMA radio packet, loads the standard ATM cell with the short cells effectively considering their information length, and outputs it to the B-ISDN network 7. In this case, the source data can be longer than the payload of the standard cell (equal to or greater than 48 bytes).

The B-ISDN network 7 transmits and switches the standard ATM cell, thereby routing it in accordance with the address set in its ATM header (ATM-H).

The standard ATM cell disassembler 2 disassembles into short cells the standard ATM cell which is assembled by the standard ATM cell assembler 1 and fed through the B-ISDN network 7, converts the short cells into a private short cell, ATM cell, STM frame, information packet of a frame relay or packet network, TDMA/FDMA radio frame or CDMA radio packet, and outputs them to corresponding channels.

The output of the standard ATM cell disassembler 2 may undergo processing (data processing) followed by switching, and be further input to the standard ATM cell assembler 1.

A plurality of standard ATM cell assemblers 1 can be interconnected with a plurality of standard ATM cell disassemblers 2 through the B-ISDN network.

The standard ATM cell assembler 1 and standard ATM cell disassembler 2 can be combined into a standard ATM cell assembler/disassembler.

The standard ATM cell assembler 1 will now be described in more detail. The standard ATM cell assembler 1 is composed of the data receiver/short cell assembler 3, short cell multiplexer 4, standard ATM cell generator 5 and ATM cell transmitter 6.

The data receiver/short cell assembler 3 receives various input information such as a private short cell, ATM cell, STM frame, information packet of a frame relay or packet network, TDMA/FDMA radio frame, CDMA radio packet, and converts it into short cells.

The short cell multiplexer 4 multiplexes the short cells formed by the data receiver/short cell assembler 3 to generate multiplexed data (that is, the payload excluding the AAL of the standard ATM).

The standard ATM cell generator 5 provides the multiplexed data fed from the short cell multiplexer 4 with the AAL (ATM Adaptation Layer) of the standard ATM, and with the standard ATM header, thereby forming the standard ATM cell from the multiplexed data. The standard ATM cell is sent to the ATM cell transmitter 6.

It is possible to provide a plurality of ATM cell transmitters 6, in which case, an ATM switch is placed between the standard ATM cell generator 5 and the ATM cell transmitters 6 to select one of the ATM cell transmitters 6 using the standard ATM header.

Alternatively, it is possible to provide a plurality of sets each consisting of the data receiver/short cell assembler 3, short cell multiplexer 4 and standard ATM cell generator 5, and to connect them to the single ATM cell transmitter 6. In this case also, an ATM switch must be placed between the plurality of the standard ATM cell generators 5 and the ATM cell transmitter 6.

The standard ATM cell generator 5 communicates with the standard ATM cell processor 9 during path setting, and sets an address translation table (which will be described later) used for routing the standard ATM cell, by way of the address translation in each ATM switch included in B-ISDN network 7, in the case where the B-ISDN network 7 includes the ATM switches. The processing for setting the address translation table through the communication at the time of path setting can be obviated if the address translation table has been set in advance.

The ATM cell transmitter 6 has an interface function with the B-ISDN network, and transmits the standard ATM cell formed by the standard ATM cell generator 5 to the B-ISDN network 7.

Next, the standard ATM cell disassembler 2 will be described in detail. The standard ATM cell disassembler 2 is composed of the ATM cell receiver 8, standard ATM cell processor 9, short cell disassembler 10 and short cell processor/data transmitter 11.

The ATM cell receiver 8, having an interface function with the B-ISDN network, receives the standard ATM cell from the B-ISDN network 7 and sends the received standard ATM cell to the standard ATM cell processor 9.

It is possible to provide a plurality of sets each consisting of the standard ATM cell processor 9, short cell disassembler 10 and short cell processor/data transmitter, in which case, an ATM switch is placed between the ATM cell receiver 8 and the standard ATM cell processors 9 to select one of the standard ATM cell processors 9 using the standard ATM header.

Alternatively, it is possible to provide a plurality of ATM cell receivers 8. In this case also, an ATM switch must be placed between the plurality of the ATM cell receivers 8 and the standard ATM cell processor 9.

The standard ATM cell processor 9 processes the ATM header of the standard ATM cell fed from the standard ATM cell receiver 8, and then carries out the AAL (ATM Adaptation Layer) processing. The multiplexed data in the form of the payload is delivered to the short cell disassembler 10.

The short cell disassembler 10 disassembles the multiplexed data fed from the standard ATM cell processor 9 into the short cells, combines them and supplies them to the short cell processor/data transmitter 11.

The short cell processor/data transmitter 11 converts the short cells fed from the short cell disassembler 10 in accordance with the format of the output channel, and outputs them to various channels such as a private short cell, ATM cell, STM frame, information packet of a frame relay or packet network, TDMA/FDMA radio frame, CDMA radio packet.

The data receiver/short cell assembler 3 and short cell processor/data transmitter 11 will now be described in detail with reference to FIGS. 2 and 3.

Figure 2:
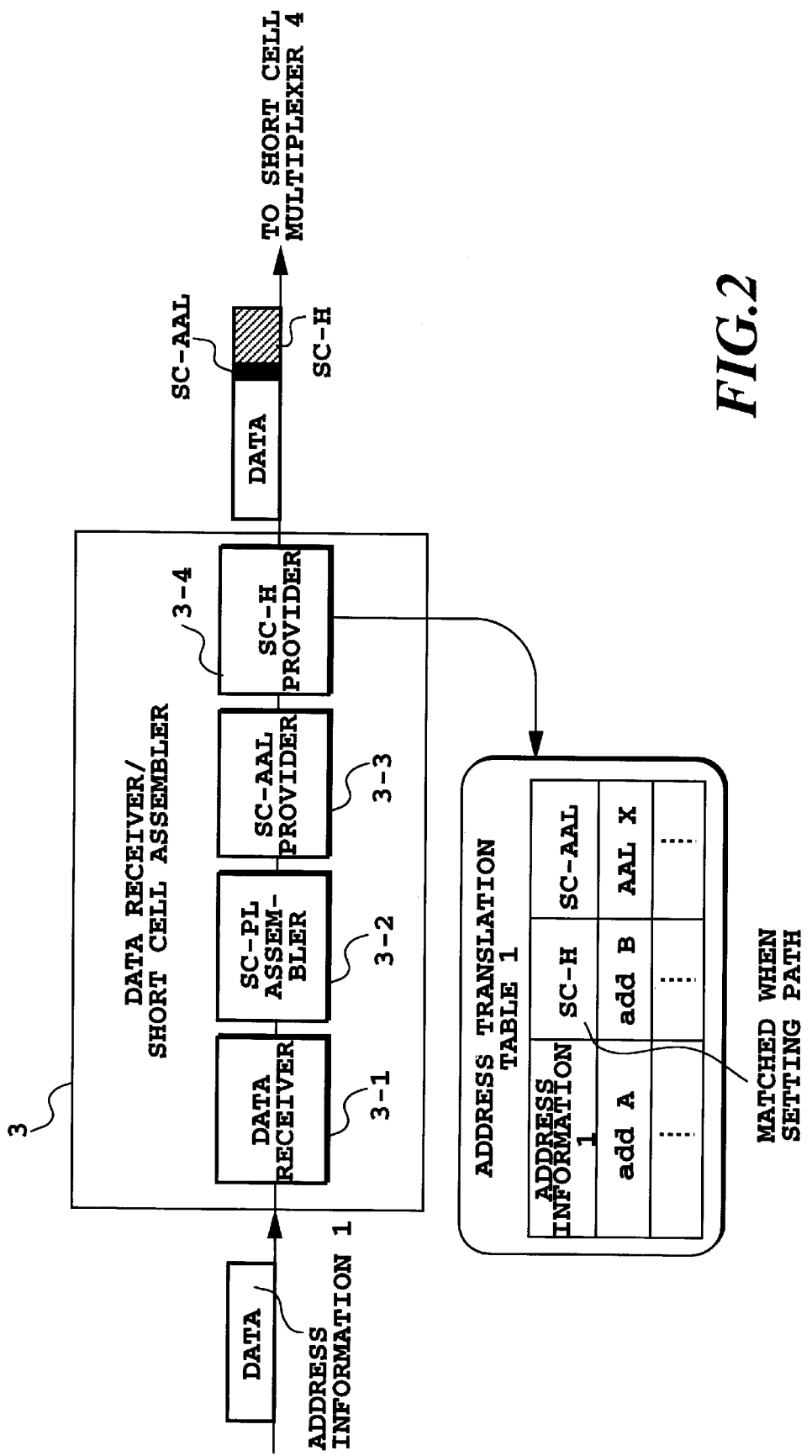
FIG. 2 is a block diagram showing a detailed configuration and operational example of a data receiver/short cell assembler.

In FIG. 2 and the following drawings, the SC-AAL is drawn as if it were placed only at the head of data. This, however, is a mere example, and it can be placed at the final position, initial position, or both final and initial positions of the data just as the AAL standardized by the ITU-T.

Figure 31A:
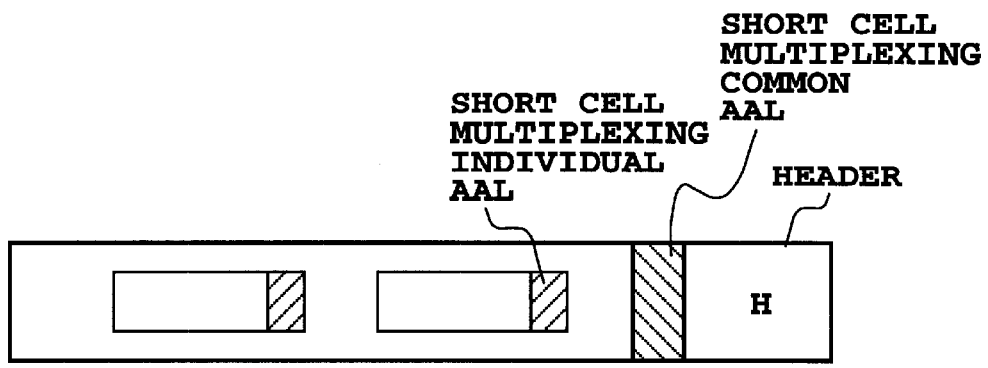
FIG. 31A is a diagram illustrating a method for adding to a payload a short cell multiplexing common AAL, a short cell multiplexing individual AAL, and an AAL of an SC-AAL.
Figure 31B:
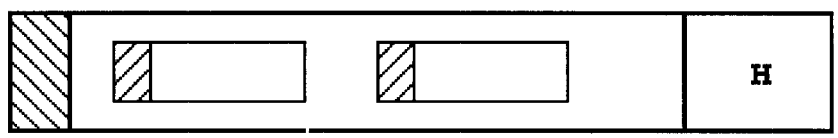
FIG. 31B is a diagram illustrating a method for adding to the payload the short cell multiplexing common AAL, the short cell multiplexing individual AAL, and the AAL of the SC-AAL.
Figure 31C:
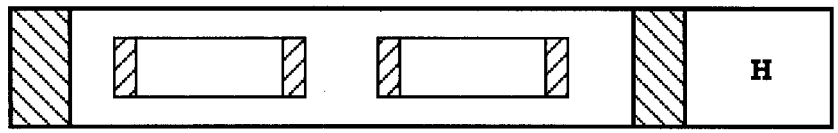
FIG. 31C is a diagram illustrating a method for adding to the payload the short cell multiplexing common AAL, the short cell multiplexing individual AAL, and the AAL of the SC-AAL.
Figure 31D:
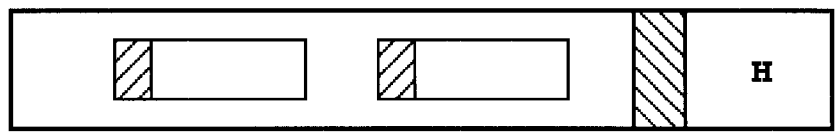
FIG. 31D is a diagram illustrating a method for adding to the payload the short cell multiplexing common AAL, the short cell multiplexing individual AAL, and the AAL of the SC-AAL.
Figure 31E:
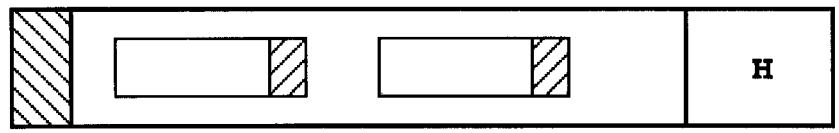
FIG. 31E is a diagram illustrating a method for adding to the payload the short cell multiplexing common AAL, the short cell multiplexing individual AAL, and the AAL of the SC-AAL.
Figure 32B:
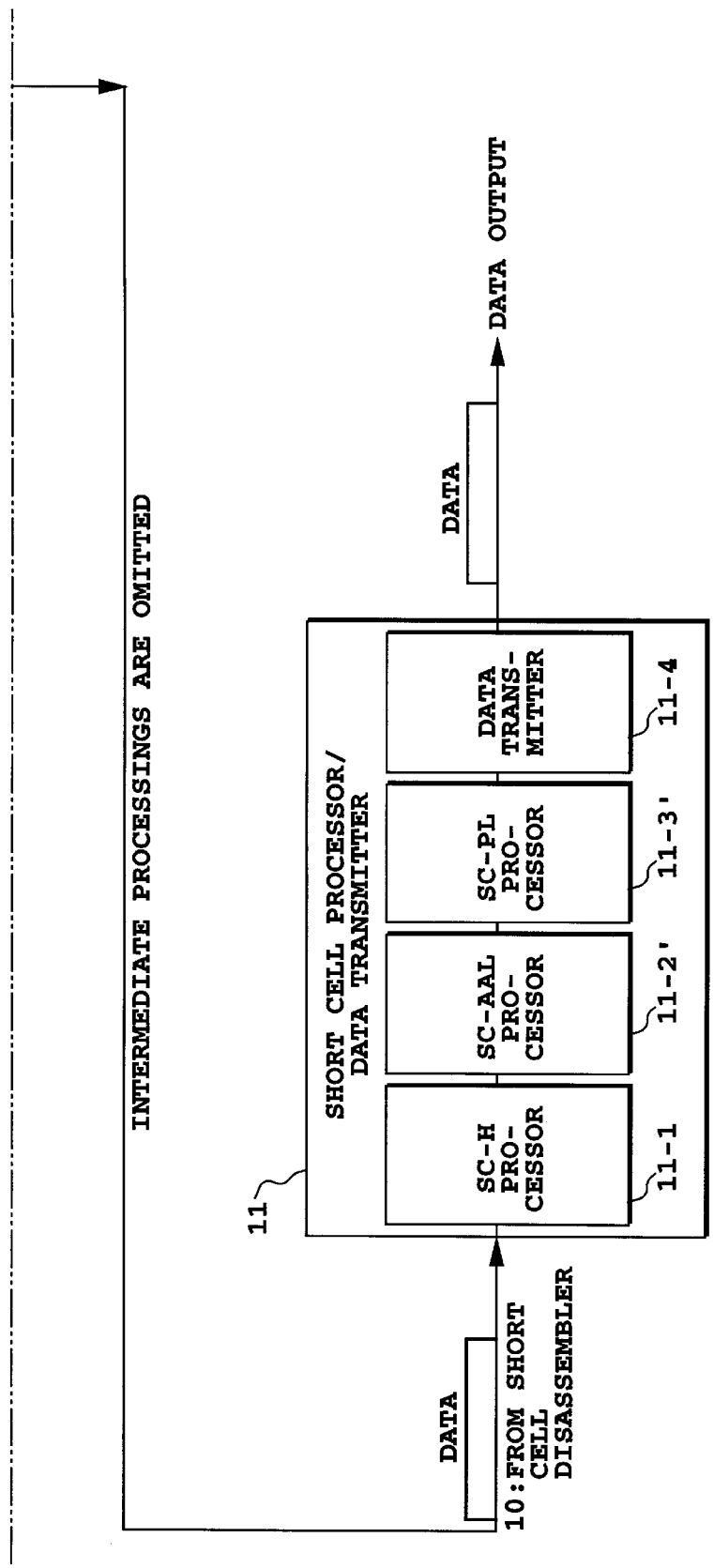
FIG. 32B is a block diagram illustrating the data receiver/short cell assembler and the short cell processor/data transmitter when dividing user data.
Figure 33:
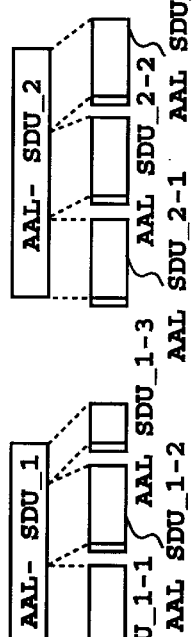
FIG. 33 is a diagram illustrating protocol stack of the AAL for the short cell multiplexing.

It may be possible to add to a payload a short cell multiplexing common AAL, a short cell multiplexing individual AAL, and an AAL of a SC-AAL as a header (FIG. 31A), a trailer (FIG. 31B), or both header and trailer (FIG. 31C).

The data receiver/short cell assembler 3 receives various input information such as a private short cell, ATM cell, STM frame, information packet of a frame relay or packet network, TDMA/FDMA radio frame, CDMA radio packet, and converts them into short cells.

In FIG. 2, the data receiver/short cell assembler 3 is composed of a data receiver 3-1, an SC-PL (Short Cell-Payload) generator 3-2, an SC-AAL (Short Cell-AAL) provider 3-3, and an SC-H (Short Cell-Header) provider 3-4.

The data receiver 3-1 carries out different processings depending on whether it terminates a particular transmission method of the input data to begin a new ATM transmission, or continues to transmit the received data of the data receiver 3-1 transparently using the same transmission method of the transmitted data of the data transmitter 11-4.

First, the processing involved in terminating the transmission method of the input data and begins the new ATM transmission will be described. The data receiver 3-1 includes a hardware interface matching the transmission method of the input data, and divides the input data into individual frames or packets.

In the course of this, it carries out diverse control for terminating the transmission method of the input data. (For example, if the input is the ATM method, it carries out the ALL processing, and if the input is the frame relay or packet method, it carries out the delivery control or frame check processing).

After that, the data receiver 3-1 obtains from the divided input data the user data and address information for transmitting the data. The following are examples of acquiring the user data and the address information from the input data.

EXAMPLE 1

When the input is a private short cell or the ATM cell, it is possible to adopt the payload as the user data, and the ATM header as the address information.

EXAMPLE 2

When the input is an STM frame or TDMA/FDMA radio frame information, the entire frame information is adopted as the user data, and the address information is newly generated from a line/CH number and a time slot position.

EXAMPLE 3

When the input is an information packet of a frame relay or packet network, it is possible to adopt the whole user data section in the information packet as the user data, and the address or header of the packet as the address information.

EXAMPLE 4

When the input is a CDMA radio information packet, it is possible to adopt the entire user data section in the information packet as the user data, and the CDMA code number in the packet as the address information.

Thus, a physical line number, time slot position information or the like is adopted as the address information if the input has no logical address as the STM.

Secondly, when transmitting the received data of the data receiver 3-1 transparently to the data transmitter 11-4, the data receiver 3-1 has a hardware interface matching the transmission method of the input data, and divides the input data to individual frames or packets.

The divided input data are entirely adopted as the user data, and the address information is obtained from the input data as described above.

The address information obtained by the data receiver 3-1 is used by the SC-H provider 3-4 as address information 1.

The SC-PL assembler 3-2 adopts the user data extracted from the input data by the data receiver 3-1 as the SC-PL.

The SC-AAL provider 3-3 determines the AAL type from a data attribute obtained over an out-channel during setting of the short cell connection, and adds required AAL information to the SC-PL. It may further add new information needed for SC-PL processing (such as control information needed for mute compression control of the voice data, or control information for diversity handover of the mobile communication data) as the SC-AAL. If no AAL control is required for the user data, this processing can be omitted. When determining the short cell header, the SC-H provider 3-4 and an SC-H processor 11-1 in the standard ATM cell disassembler 2 are notified of the AAL type set here, and corresponds it to the process in an SC-AAL processor 11-2.

The SC-H provider 3-4 communicates with the SC-H processor 11-1 in the standard ATM cell disassembler 2 during the short cell path setting, and sets the address translation table for routing.

The address translation table 1 which is set and referred to by the SC-H provider 3-4 stores the correspondence between the address information 1 of the input data and the short cell header, and stores the short cell AAL type decided by the SC-AAL provider 3-3.

The address translation table 2 which is set and referred to by the SC-H processor 11-1 stores the correspondence between the short cell header and the address information 2 of the output data, and stores the short cell AAL type decided by the SC-AAL provider 3-3.

The setting of the address translation tables 1 and 2 through the communication during the path setting can be omitted if the relationships of the address information 1, SC-H, address information 2 and short cell AAL types have been set in advance in the address translation tables 1 and 2 using office data or the like.

The short cell header can have the same structure as that of the standard ATM cell header, or a different structure from it.

Having the same structure as the standard ATM header offers advantages that the short cell header can be used without change as the standard ATM header for conveying the multiplexed data as will be described later in connection with an embodiment 3, or that better matching can be obtained when the data transmitter 11-4 in the short cell processor/data transmitter 11 outputs data according to the ATM.

The short cell completed by the SC-H provider 3-4 is sent to the short cell multiplexer 4.

The short cell processor/data transmitter 11 will now be described in more detail with reference to FIG. 3.

The short cell completed by the SC-H provider 3-4 is recovered to the data in accordance with the original transmission method, or converted to the data complying with another transmission method by the short cell processor/data transmitter 11 in the standard ATM cell disassembler 2.

The short cell processor/data transmitter 11 converts the received short cell into various transmission forms such as a private short cell, ATM cell, STM frame, information packet of a frame relay or packet network, TDMA/FDMA radio frame or CDMA radio packet, and outputs it.

Figure 3:
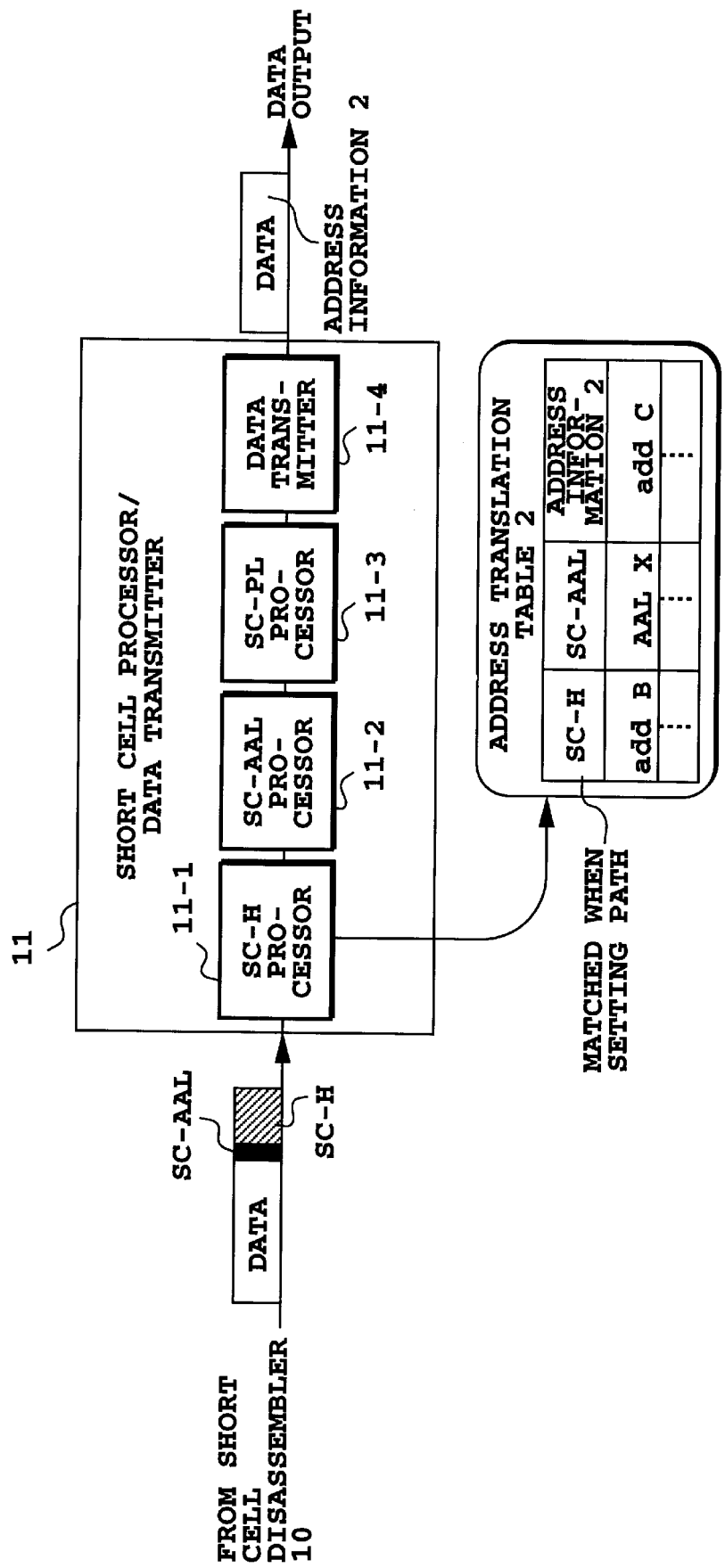
FIG. 3 is a block diagram showing a detailed configuration and operational example of a short cell processor/data transmitter.

In FIG. 3, the short cell processor/data transmitter 11 is composed of the SC-H (Short Cell-Header) processor 11-1, the SC-AAL (Short Cell-AAL) processor 11-2, an SC-PL (Short Cell-Payload) processor 11-3 and the data transmitter 11-4.

The SC-H processor 11-1 sets the above-mentioned address translation table 2 through the communication with the SC-H provider 3-4 during the path setting.

The SC-H processor 11-1 analyzes the short cell header of the short cell fed from the short cell disassembler 10, and obtains the address information of the output data and the AAL type of the short cell using the address translation table 2.

The SC-AAL processor 11-2 carries out, when the AAL is set in the short cell, the AAL processing in accordance with the AAL type of the short cell obtained by the SC-H processor 11-1. This processing is omitted if the AAL is not set in the short cell.

The SC-PL processor 11-3 extracts the payload out of the short cell as the user data of the output data.

The data transmitter 11-4 has a hardware interface matching the transmission modes of the output data, and transfers the output data frame by frame or packet by packet to each channel in accordance with the transmission mode.

The output data is generated in different manner depending on whether the data receiver 3-1 terminates the current transmission mode of the input data to begin a new ATM transmission, or continues to transmit its received data transparently according to the transmission mode of the data transmitter.

First, when employing the method of terminating the transmission mode of the input data to begin the new ATM transmission, the data transmitter 11-4 forms the output data from the address information 2 obtained by the SC-H processor 11-1, the data attribute obtained by the SC-AAL processor 11-2 and the user data obtained by the SC-PL processor 11-3.

EXAMPLE 1

When the output is a private short cell or the ATM cell, it is possible to adopt the user data as the payload, the address information 2 as the ATM header, and the AAL in the short cell as the AAL of the ATM cell without change.

EXAMPLE 2

When the output is an STM frame or TDMA/FDMA radio frame information, the user data is adopted as the frame information, and the line/channel number and a time slot position are decided from the address information 2.

EXAMPLE 3

When the output is an information packet of a frame relay or packet network, it is possible to adopt the user data as the user data in the information packet, and to generate the address or header of the packet from the address information 2.

EXAMPLE 4

When the output is a CDMA radio information packet, it is possible to adopt the user data as the user data in the information packet, and to decide the CDMA code number of the packet from the address information 2.

In this case also, the physical line number, time slot position information or the like is used if no logical address is provided as in the STM.

Secondly, when the transmission method is employed, in which the received data by the data receiver 3-1 is transmitted transparently to the data transmitter 11-4 in accordance with the transmission mode of the data transmitter 11-4, the user data obtained by the SC-PL processor 11-3 is adopted as the output data including the address information. However, if the output is the STM frame or TDMA/FDMA radio frame, the user data is adopted as the frame information, and the line/channel number and time slot position information are decided from the address information 2.

The short cell multiplexer and short cell disassembler will now be described with reference to FIGS. 4–16.

EMBODIMENT 1

An embodiment 1 (a short cell multiplexer A and short cell disassembler A) will now be described referring to FIGS. 4–6.

The embodiment 1 adds the length information to each short cell.

Figure 4:
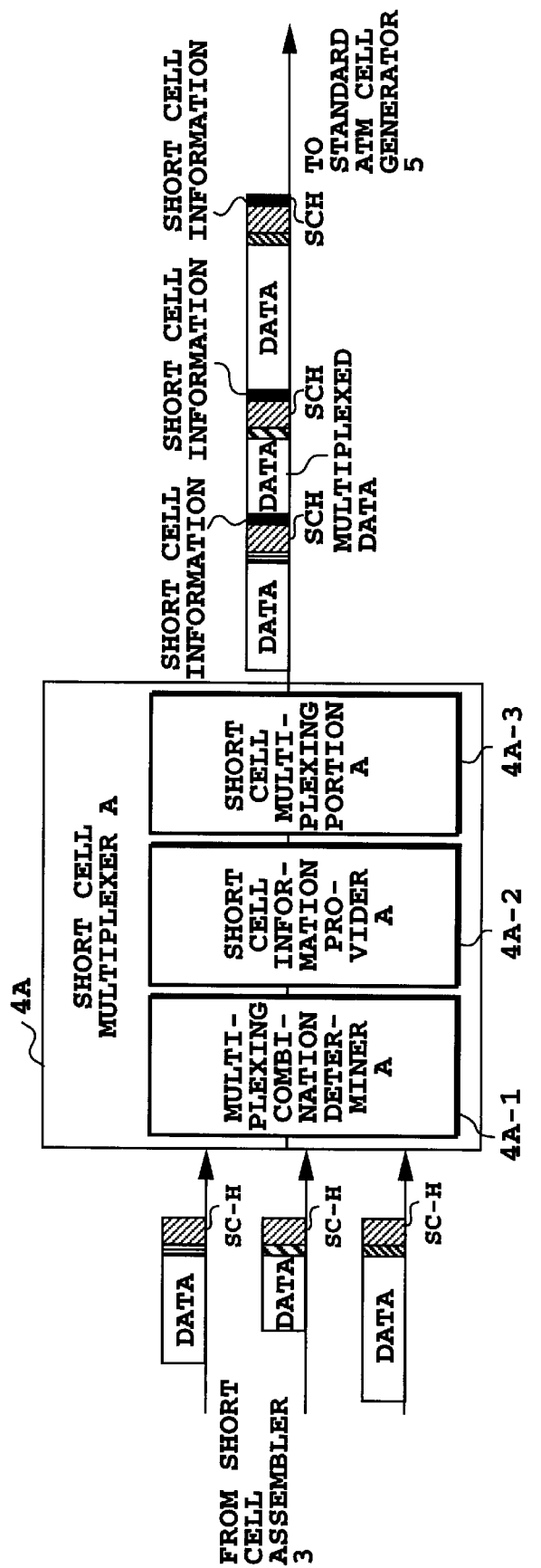
FIG. 4 is a block diagram showing a detailed configuration and operational example of a short cell multiplexer.

In FIG. 4, the short cell multiplexer A (4A) is composed of a multiplexing combination determiner A (4A-1), a short cell information provider A (4A-2) and a short cell multiplexing portion A (4A-3).

First, the short cell multiplexer A (4A) has the multiplexing combination determiner A (4A-1) decide the combination and order in multiplexing a plurality of input short cells into the payload of the standard ATM cell.

In making this decision, the multiplexing combination determiner A (4A-1) obtains beforehand the byte length of the short cell information given by the short cell information provider A (4A-2), and the byte length of the AAL of the standard ATM given by the standard ATM cell generator 5 so that it can obtain the data byte length actually available for multiplexing the short cells, that is, the byte length obtained by subtracting from the 48 bytes of the standard ATM payload the byte length of its control information.

The decision can be made as follows to minimize the waiting time in the system: First, the multiplexing is carried out by combining the data in the received order. Second, the multiplexing is carried out by having the received short cells wait in a buffer within allowed waiting times corresponding to their attributes (SC-AAL types), and by selecting suitable ones from the short cells stored in the buffer, which match in their attribute, length and address (SC-H).

EXAMPLE 1

With regard to the cell attribute, multiplexing the cells of the same attribute will facilitate the delay control or the like by the standard ATM management.

EXAMPLE 2

With regard to the cell length, a combination can be selected which will minimize the remainder (of the partial fill) in the payload of the standard ATM cell, or which will prevent a single short cell from overlapping across multiple standard ATM cells, as much as possible.

EXAMPLE 3

With regard to the cell address, multiplexing the short cells conveyed through the same route makes it possible to transmit them to a farther common destination without changing the multiplexed standard cell.

Figure 5:
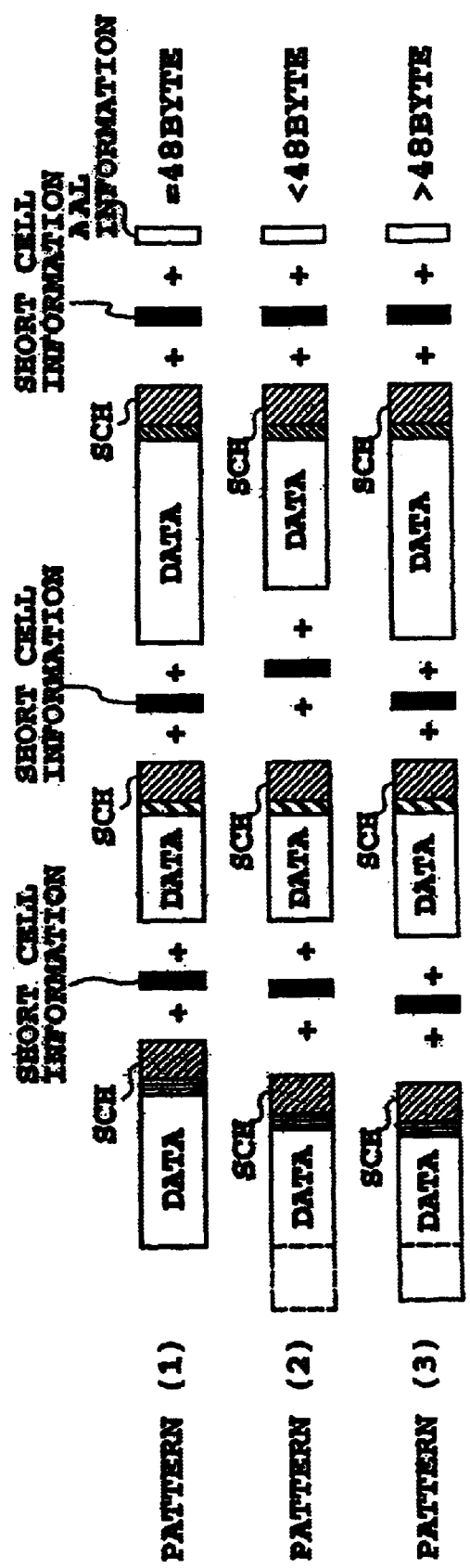
FIG. 5 is a diagram illustrating patterns depending on a multiplexed data length.

The combinations of multiplexing thus determined are divided into the following three multiplexed data length patterns in accordance with the multiplexed data length as shown in FIG. 5.

Here, the multiplexed data length is defined as the sum total of the sum of the lengths of the short cells to be multiplexed, the sum of the short cell information given to the individual short cells by the short cell information provider A (4A-2) and the AAL information length given by the standard ATM cell generator 5.

(Pattern 1) The multiplexed data length equals 48 bytes.
(Pattern 2) The multiplexed data length is less than 48 bytes.
(Pattern 3) The multiplexed data length exceeds 48 bytes.

In the case of the pattern 3, since the data cannot be accommodated in a single standard ATM cell, the overflowed data of the short cell at the final position (that is, data beyond 48 bytes) must be transferred by the next standard ATM cell. Thus, the overflowed data is separated as a new short cell (having no SC-H and SC-AAL), and placed in the next standard ATM cell as the first short cell to be multiplexed.

The short cell information provider A (4A-2) generates the short cell information from each short cell fed from the multiplexing combination determiner A (4A-1), and puts it at the initial position of the short cell.

The short cell information includes short cell length information (LI), short cell status information (ST: Short cell Type), error detecting/error correcting bits (parity bits, CRC, etc.) against transmission error when transmitting these information.

The short cell status information is for indicating whether the short cell is complete (ST="00"), lacking only the latter part (ST="01"), lacking only the former part (ST="10") or lacking both the former and latter parts (ST="11").

The short cell multiplexing portion A (4A-3) carries out different processings in accordance with the multiplexed data length patterns described above.

In the case of the multiplexed data length pattern 1 in which the multiplexed data length is 48 bytes, the short cell multiplexing portion A (4A-3) links the short cells to which the short cell information is added in accordance with the combination and multiplexing order of the short cells decided by the multiplexing combination determiner A (4A-1).

In the case of the pattern 2 in which the multiplexed data length is less than 48 bytes, the short cell multiplexing portion A (4A-3) links the short cells in a manner similar to those of the multiplexed data length pattern 1, and then adds null information (NULL) to the final position of the multiplexed data so that the total data length becomes 48 bytes considering the AAL information length provided by the standard ATM cell generator 5.

In the case of the pattern 3 in which the multiplexed data length exceeds 48 bytes, the multiplexed data length is adjusted to 48 bytes because the data exceeding 48 bytes is delivered to the next standard ATM cell as the first short cell to be multiplexed. Accordingly, the short cell multiplexing portion A (4A-3) links the short cells in a manner similar to those of the multiplexed data length pattern 1.

The multiplexed data (with a length of 48 bytes—the AAL information length of the standard ATM) assembled by the short cell multiplexing portion A (4A-3) is sent to the standard ATM cell generator 5.

The multiplexed data thus assembled is disassembled into the original data by the short cell disassembler A. This will be described referring to FIG. 6.

The short cell disassembler A (10A) is composed of the short cell disassembling portion A (10A-1). It disassembles the multiplexed data which is assembled by the short cell multiplexing portion A (4A-3) and fed from the standard ATM cell processor 9, and combines the disassembled data.

The short cell disassembling portion A (10A-1), extracting the short cell information from the initial position of the multiplexed data assembled by the short cell multiplexing portion A (4A-3), and analyzing the information, can extract the short cell following the short cell information. This process is repeated until the last short cell of the multiplexed data is extracted.

The short cell disassembling portion A (10A-1) obtains the short cell length information (LI), short cell status information (ST) and error detecting/error correcting bits (C) by analyzing the short cell information.

First, the short cell disassembling portion A (10A-1) makes a decision from the error detecting/error correcting bits (C) whether or not any transmission error occurs in the short cell information, and corrects the error if it is correctable. If the error cannot be corrected because only the error detecting function is provided, or the error is not correctable, the multiplexed data after the error is relinquished because it is difficult to extract the short cell on the basis of the erroneous information. (Alternatively, it may be possible to continue the processing without relinquishing, allowing the possibility of erroneous extraction).

Second, the short cell disassembling portion A (10A-1) can extract the short cell following the short cell information using the short cell length information (LI). For example, when the short cell length information indicates 8bytes, the 8-byte data following the short cell information is extracted as the short cell.

Figure 35:
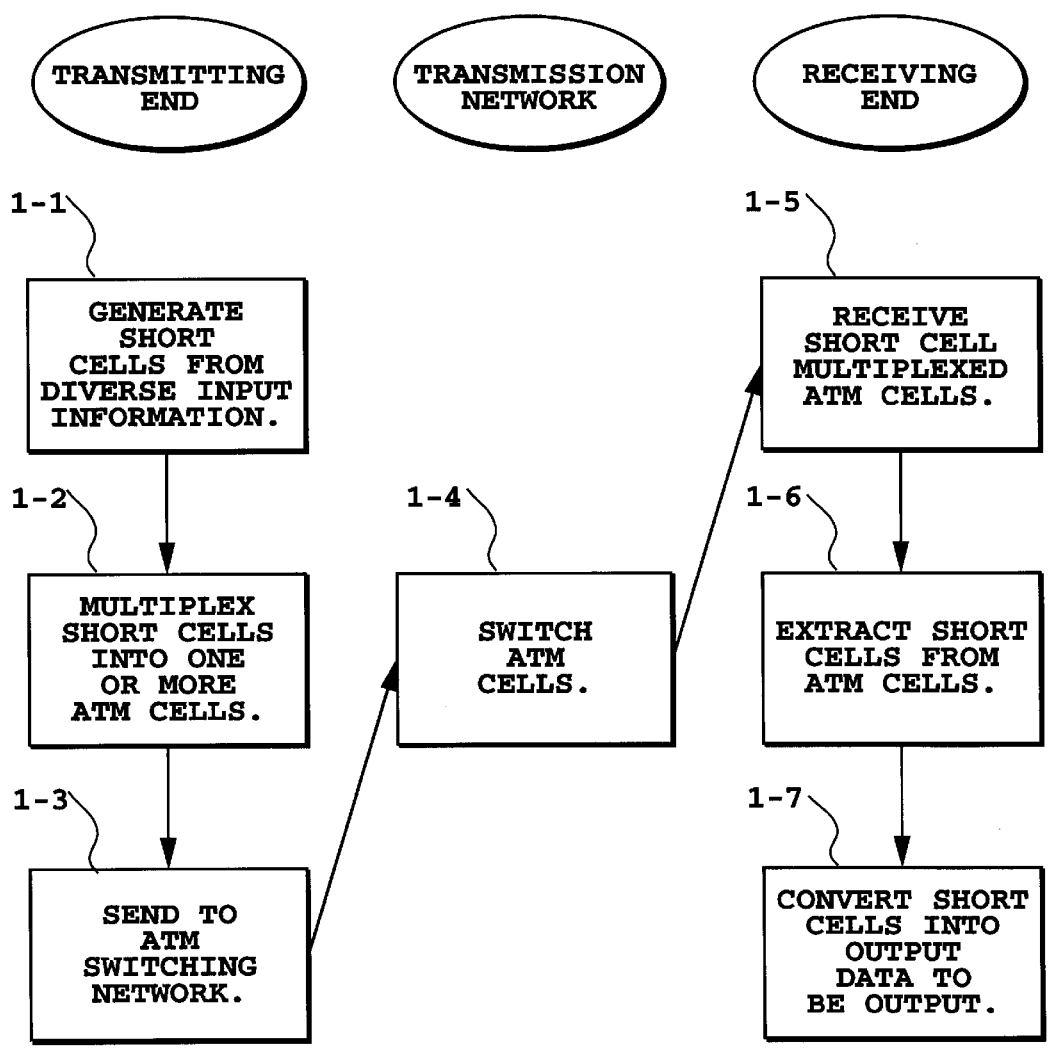
FIG. 35 is a flowchart illustrating the outline of a short cell multiplexed ATM transmission method.
Figure 36:
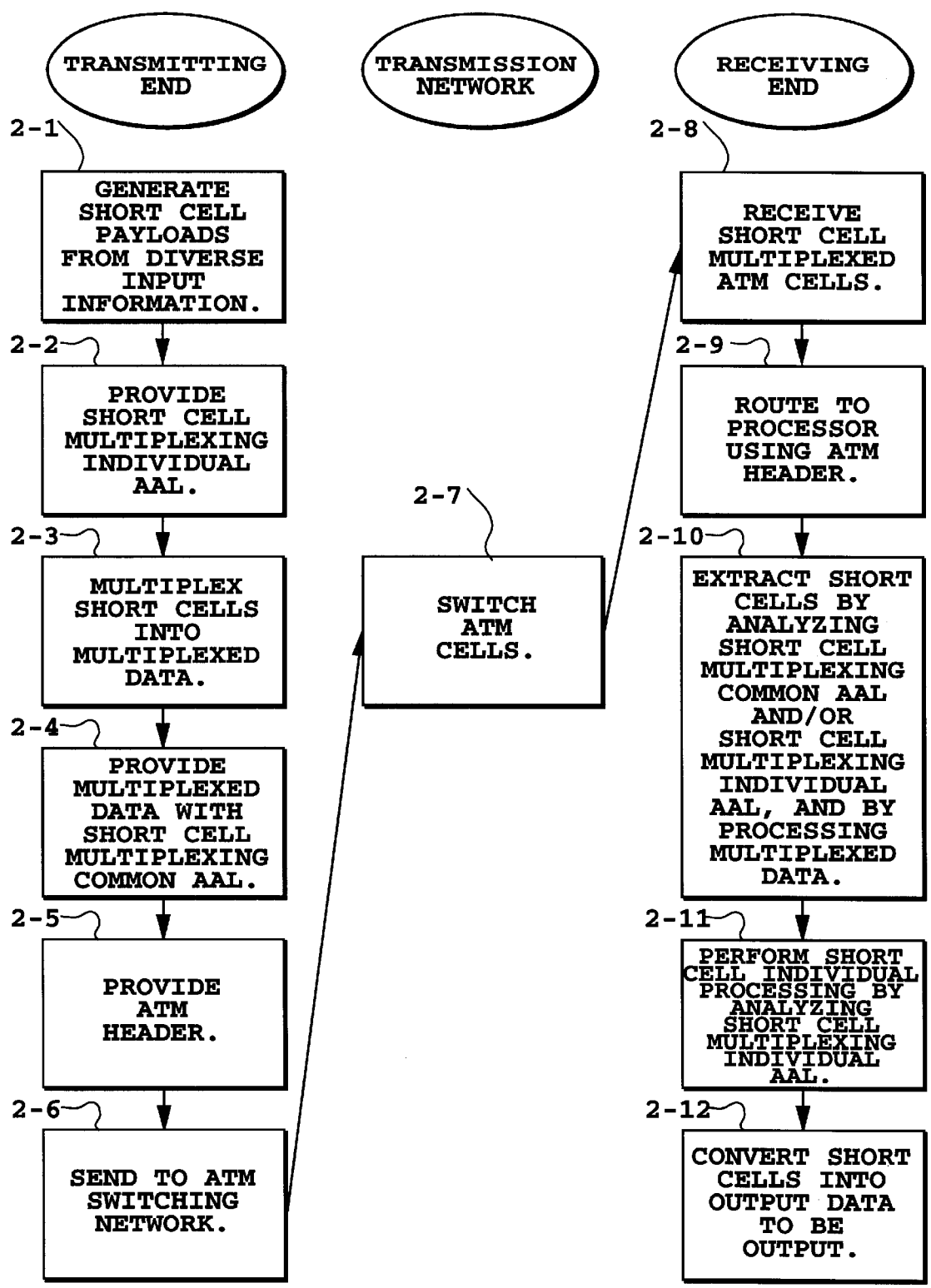
FIG. 36 is a flowchart illustrating the details of the short cell multiplexed ATM transmission method.
Figure 37:
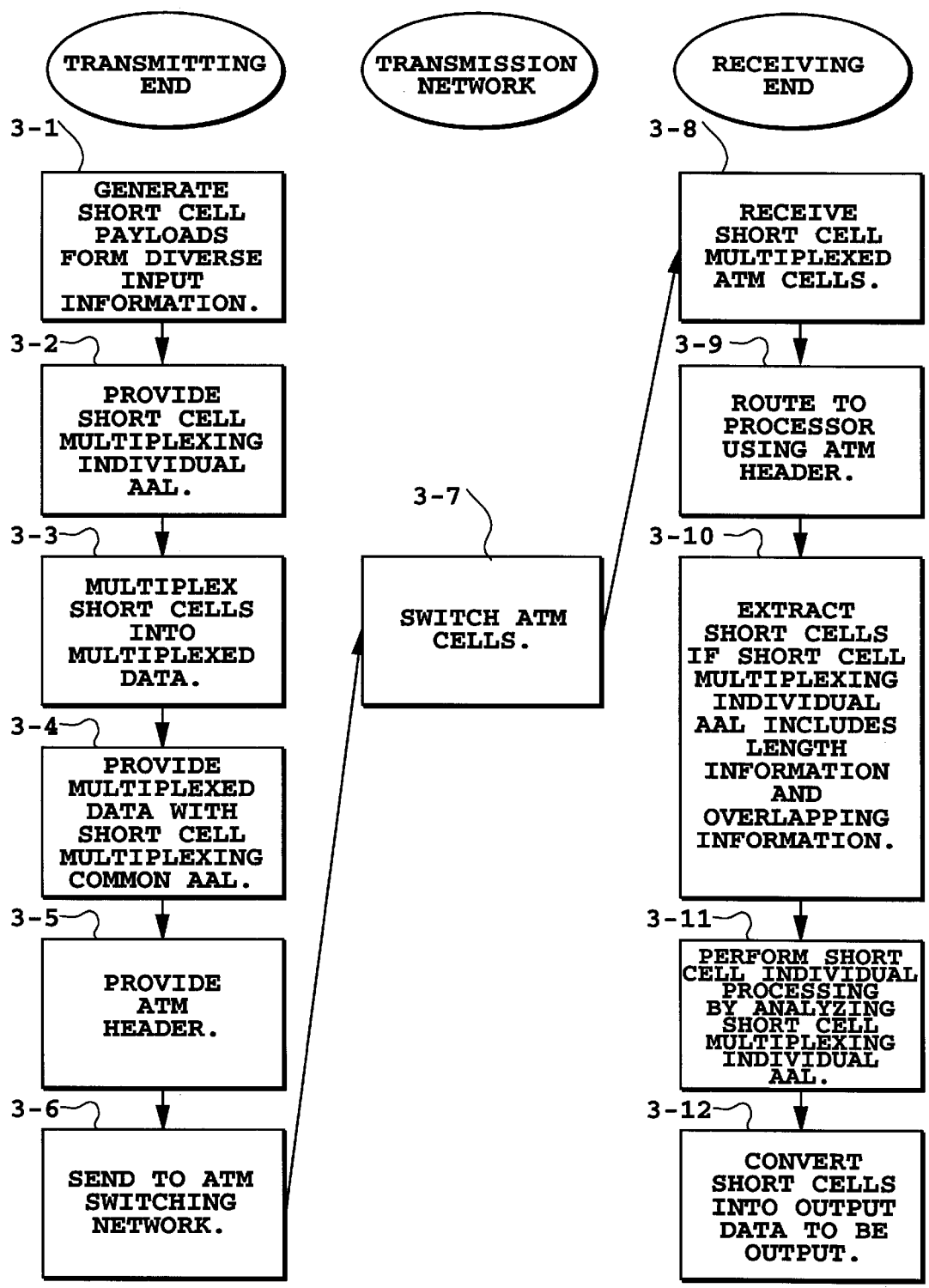
FIG. 37 is a flowchart illustrating a particular combination of the short cell multiplexing common AAL and the short cell multiplexing individual AAL in the short cell multiplexed ATM transmission method.

Third, the short cell disassembling portion A (10A-1) can obtain from the short cell status information (ST) the overlapping information about whether the short cell extracted in accordance with the short cell length information is a complete cell, lacking only a first half, lacking only the second half, or both the first and second half (that is, a single short cell overlaps across three or more multiplexed data). As illustrated in the flowcharts of FIGS. 35, 36 and 37, the multiplexing individual AAL includes the length information and the overlapping information in the embodiment 1.

The following processings are carried out in accordance with the short cell status information (ST).

If ST="00", the short cell disassembling portion A (10A-1) decides that the short cell is complete, and transfers the extracted short cell to the short cell processor/data transmitter 11.

If ST="01", the short cell disassembling portion A (10A-1) decides that only the second half is lacking, and temporarily stores the extracted short cell to be combined with the second half, thereby waiting for the short cell in the next multiplexed data.

If ST="10", the short cell disassembling portion A (10A-1) decides that only the first half is lacking, and combines the second half with the short cell stored to be combined, thereby transferring the combined short cell to the short cell processor/data transmitter 11.

If ST="11", the short cell disassembling portion A (10A-1) decides that both the former and latter portions are lacking, combines the extracted one with the short cell stored to be combined, restores the combined one, and waits for the short cell in the next multiplexed data.

If the short cell status information of the final short cell of multiplexed data (multiplexed data 1) is ST="01" or ST="11", the short cell status information of the first short cell of the next incoming multiplexed data (multiplexed data 2) must be ST="10" or ST="11". Otherwise, it is possible to decide that although one or more multiplexed data were present between the multiplexed data 1 and 2, some cell lose occurs in the standard ATM cells conveying the multiplexed data.

On the contrary, if the short cell status information of the first short cell of multiplexed data (multiplexed data 4) is ST="10" or ST="11", and the short cell status information of the final short cell of the preceding multiplexed data (multiplexed data 3) is ST="00" or ST="10", and no short cell is stored to be combined, it is also possible to decide that although one or more multiplexed data were present between the multiplexed data 3 and 4, some cell lose occurs in the standard ATM cells conveying the multiplexed data.

To obtain the presence and absence of the cell loss or the accurate number thereof, it is necessary to apply the AAL (AAL type 1, for example) having the order information in the standard ATM cells conveying the multiplexed data.

Using the function of the AAL of the standard ATM cells to have the standard ATM cell processor 9 notify the short cell disassembling portion A (10A-1) of the occurrence of the cell loss makes it possible to prevent erroneous short cell combining (combining of the first half and the second half of different short cells) due to the cell loss which cannot be detected only from the ST.

The short cell components are relinquished which are unrecoverable to a complete short cell owing to the omission of the multiplexed data due to the cell loss or the cancelling of the multiplexed data due to transmission error.

Thus, the first half of the short cell stored to be combined with the second half is relinquished if the expected second half cannot be obtained.

On the other hand, if the first half of the short cell has not been stored which is to be combined with the second half of the short cell extracted from the initial position of the multiplexed data, the second half of the short cell is relinquished. In this case, the second and the following short cells in the multiplexed data are effective.

EMBODIMENT 2

Another short cell multiplexer will now be described referring to FIGS. 7–9.

This embodiment 2 adds the number of the multiplexed short cells and the lengths of individual short cells as a piece of multiplexing information.

Figure 7:
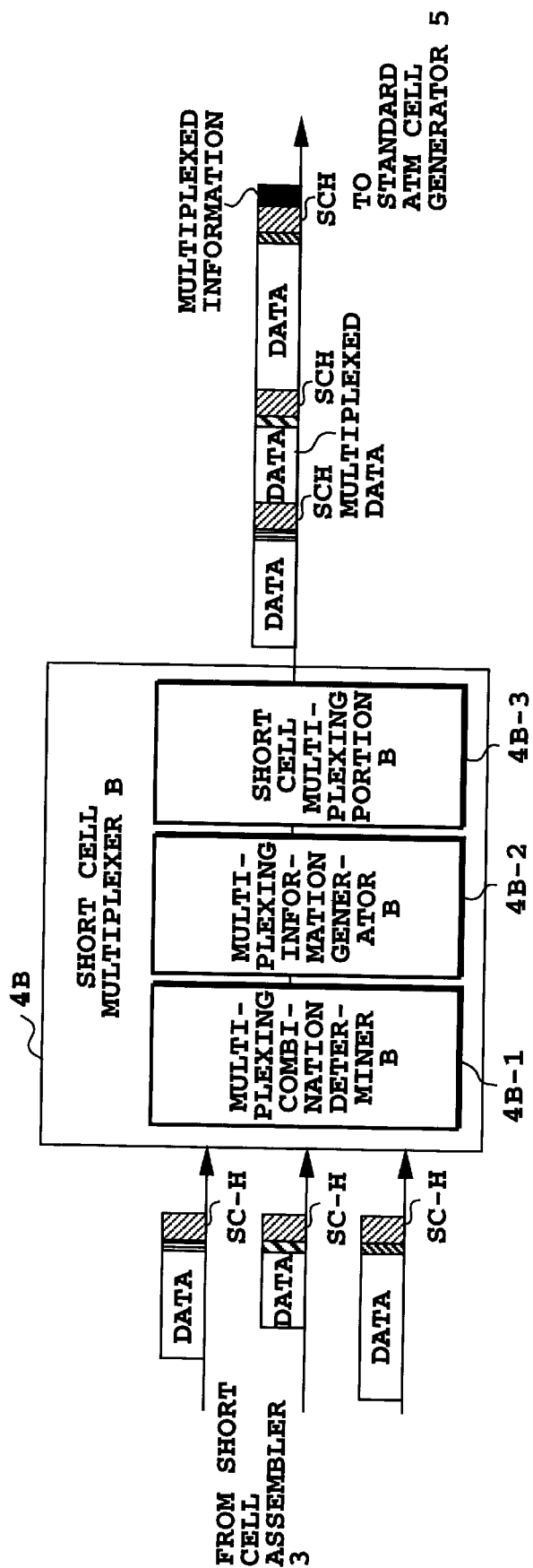
FIG. 7 is a block diagram showing a detailed configuration and operational example of another embodiment of the short cell multiplexer.

In FIG. 7, the short cell multiplexer B (4B) is composed of a multiplexing combination determiner B (B-1), a multiplexing information generator B (4B-2) and a short cell multiplexing portion B (4B-3).

First, the short cell multiplexer B (4B) has the multiplexing combination determiner B (4B-1) decide the combination and order in multiplexing a plurality of input short cells into the payload of the standard ATM cell. This decision processing is the same as that of the multiplexing combination determiner A (4A-1).

In making this decision, the multiplexing combination determiner B (4B-1) obtains beforehand the byte length of the multiplexing information generated by the multiplexing information generator B (4B-2), and the byte length of the AAL of the standard ATM given by the standard ATM cell generator 5 so that it can obtain the data byte length actually available for the short cell multiplexing, that is, the byte length obtained by subtracting the byte length for the control information from the 48 bytes of the standard ATM payload.

Figure 8:
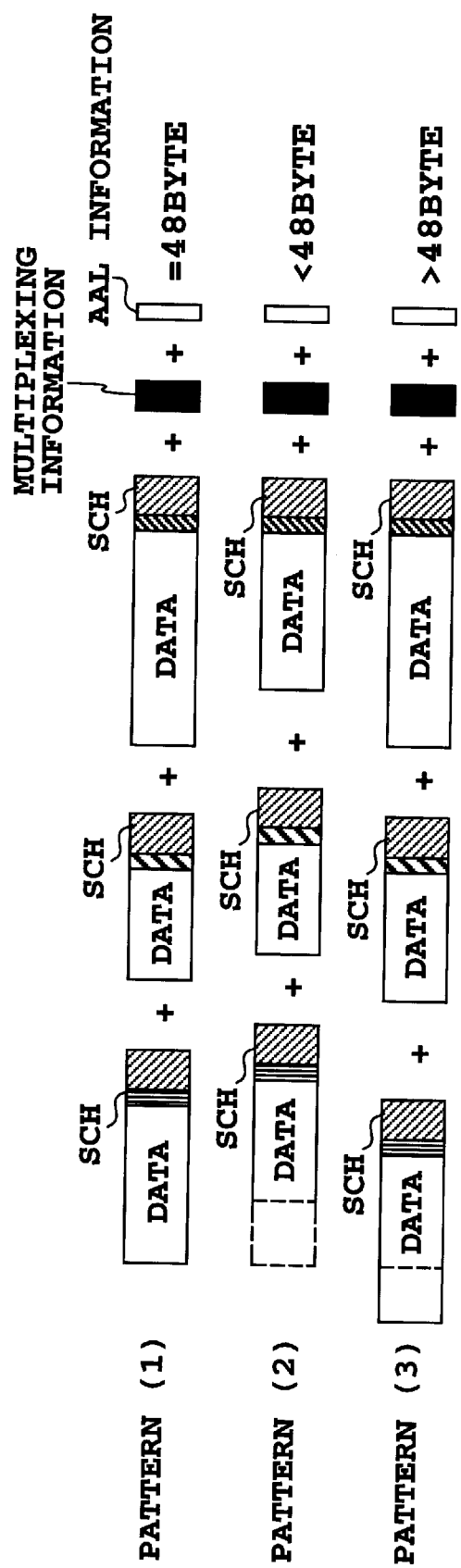
FIG. 8 is a diagram illustrating patterns depending on a multiplexed data length.

The combinations to be multiplexed thus determined are divided into the following three multiplexed data length patterns in accordance with the multiplexed data length as shown in FIG. 8.

Here, the multiplexed data length is defined as the sum total of the sum of the lengths of the short cells to be multiplexed, the length of the multiplexing information formed by the multiplexing information generator B (4B-2) and the AAL information length given by the standard ATM cell generator 5.

(Pattern 1) The multiplexed data length equals 48 bytes.

(Pattern 2) The multiplexed data length is less than 48 bytes.

(Pattern 3) The multiplexed data length exceeds 48 bytes.

In the case of the pattern 3, since the data cannot be accommodated in a single standard ATM cell, the overflowed data of the short cell at the final position (that is, data beyond 48 bytes) must be transferred by the next standard ATM cell. Thus, the overflowed data is separated as a new short cell (having no SC-H and SC-AAL), and placed in the next standard ATM cell as the first short cell to be multiplexed.

The multiplexing information generator B (4B-2) generates the multiplexing information from the short cells fed from the multiplexing combination determiner B (4B-1).

The multiplexing information, which can take various data structures, indicates the way in which the plurality of the short cells are arranged into the multiplexed data.

The short cell multiplexing portion B (4B-3) carries out somewhat different processings in accordance with the multiplexed data length patterns described above.

In the case of the multiplexed data length pattern 1 in which the multiplexed data length is 48 bytes, the short cell multiplexing portion B (4B-3) links the short cells in accordance with the combination and multiplexing order of the short cells decided by the multiplexing combination determiner B (4B-1), and adds the multiplexed data generated by the multiplexing information generator B (4B-2) to the initial position of the multiplexed data.

In the case of the pattern 2 in which the multiplexed data length is less than 48 bytes, the short cell multiplexing portion B (4B-3) links the short cells in a manner similar to that of the multiplexed data length pattern 1, adds the multiplexed data generated by the multiplexing information generator B (4B-2) to the initial position of the multiplexed data, and then adds null information (NULL) to the final position of the multiplexed data so that the total data length becomes 48 bytes considering the AAL information length provided by the standard ATM cell generator 5.

In the case of the pattern 3 in which the multiplexed data length exceeds 48 bytes, the multiplexed data length is adjusted to 48 bytes because the data exceeding 48 bytes is delivered to the next standard ATM cell as the first short cell to be multiplexed. Accordingly, the short cell multiplexing portion B (4B-3) links the short cells in a manner similar to that of the multiplexed data length pattern 1, and adds the multiplexed data generated by the multiplexing information generator B (4B-2) to the initial position of the multiplexed data.

The multiplexed data (with a length of (48 bytes—the AAL information length of the standard ATM)) assembled by the short cell multiplexing portion A (4A-3) is sent to the standard ATM cell generator 5.

The data structure of the multiplexing information will now be described with reference to FIGS. 10–12.

Example 1 of Multiplexing Information Data Structure

Figure 10:
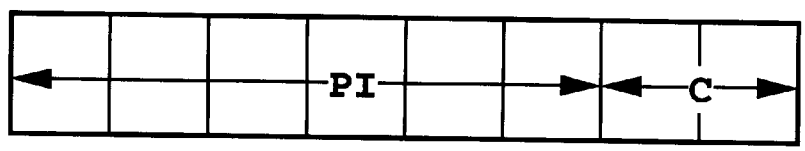
FIG. 10 is a diagram illustrating a data assembling method 1 of multiplexing information.

The structure as illustrated in FIG. 10 includes a multiplexed pattern identifier (PI), and error detecting/error correcting bits (C) (parity bits, CRC etc.) for the transmission error that might occur during the transmission of the PI.

With this data structure, if the number of the multiplexed data structures determined by the multiplexing combination determiner B (4B-1) is limited, the multiplexed pattern identifier PI is associated with the multiplexed data structures in advance.

For example, the following steps a)–c) can be taken.

a) If the multiplexed pattern identifier PI is "000001", the short cells of the same length are multiplexed in such a way that two 23-byte short cells are multiplexed.

b) If the multiplexed pattern identifier PI is "000010", the short cells of different lengths are multiplexed in such a way that one 16-byte short cell and one 30-byte cell are combined.

c) If the multiplexed pattern identifier PI is "000011", the short cells are multiplexed in such a way that at least one of them is placed across the two or more multiplex data such as one 30-byte short cell and the former 16 bytes of another 30-byte short cell are multiplexed, first. Then, if the multiplexed pattern identifier PI is "000100", the remaining 14 bytes of the 30-byte short cell, still another 30-byte short cell and 2-byte null information are multiplexed. Thus, the multiplexed data structure includes an overlapped short cell.

In the case of employing the example 1 of the multiplexing information data structure, the multiplexing information generator B (4B-2) forms the multiplexing information by selecting the multiplexed pattern identifier (PI) corresponding to the multiplexed data structure which is associated with a short cell disassembler B (10B-1) in advance in accordance with the combination and order of the short cells fed from the multiplexing combination determiner B (4B-1). The multiplexing information may have additional error detecting/error correcting bits (C) for the transmission error.

Example 2 of the Multiplexing Information Data Structure

Figure 11A:
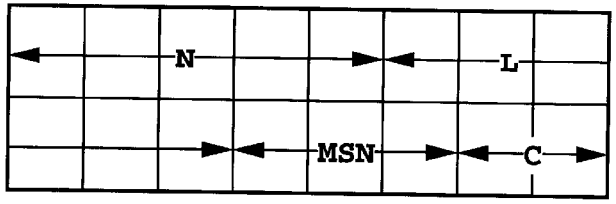
FIG. 11A is a diagram illustrating a data assembling method 2 of the multiplexing information.

The structure as shown in FIG. 11A includes multiplexed cell number information (N), short cell length information (L), multiplexing sequence number (SN) and error detecting/error correcting bits (C) (parity bits, CRC, etc.) for the transmission error which might occur during the transmission of these data.

This data structure is employed when multiplexing the short cells of the same length.

The multiplexed cell number information (N) indicates the number of short cells multiplexed into the multiplexed data. It is an integer number (including zero) such as 0, 1, 2, 3, . . .

For example, the multiplexed cell number zero indicates that the multiplexed data is dummy data including no short cell. The multiplexed cell number one indicates that the multiplexed data includes one short cell.

The short cell length information indicates the number of bytes of each short cell.

The multiplexing sequence number is used, when the short cell at the final position of the multiplexed data overflows, for controlling deliverance of the overflowed data to the next multiplexed data.

For example, if the multiplexed data length (48 bytes—the multiplexing information length—the AAL length of the standard ATM) available for multiplexing the short cells is 45 bytes, and 36 byte short cells are multiplexed, four multiplexed data (45 bytes×4=180 bytes) can convey five short cells (36 bytes×5=180 bytes), which indicates that there are four patterns of the multiplexed data structure. Accordingly, if the four multiplexed data are provided with the numbers 1–4 cyclically as the multiplexing sequence numbers (SN), it is possible to decide the manner in which the short cells are overlapped across the multiplexed data. That is, the boundary of each short cell can be decided from the short cell length information (L) and the multiplexing sequence number (SN). This makes it possible to decide the number of complete short cells in each multiplexed data from the number of the multiplexed short cells. (The partial fill can be implemented by setting the multiplexed cell number to less than that which would causing a cell overlapping across two multiplexed data, in which case, the next multiplexing sequence number is returned to one).

Figure 11B:
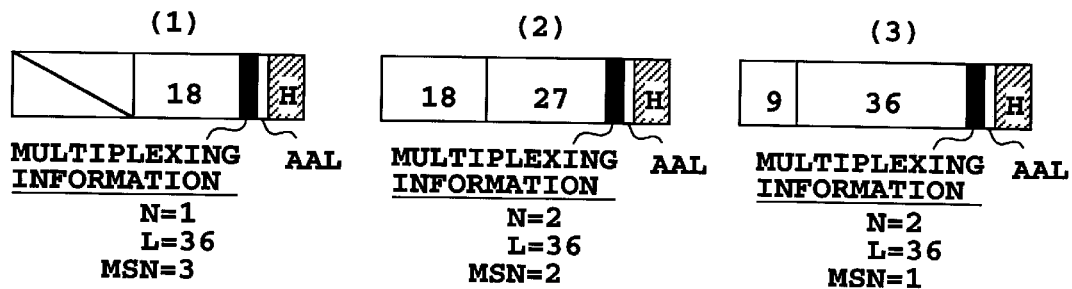
FIG. 11B is a diagram illustrating the data assembling method 2 of the multiplexing information.

FIG. 11B illustrates a case in which three 36 byte—short cells are sent. The first cell has a multiplexing sequence number 1, the second cell has a multiplexing sequence number 2 and the final cell has a multiplexing sequence number 3.

The multiplexing sequence numbers may not cycle depending on the length of the short cells. In such a case, the multiplexed data can be made partial fill at the multiplexing sequence number M which will minimize the dummy data added for the partial fill to that multiplexed data so that the multiplexing sequence numbers 1-M are repeated again from the next multiplexed data.

When the example 2 of the multiplexing information data structure is employed, the multiplexing information generator B (4B-2) forms, as the multiplexing information, the multiplexed cell number information (N) and short cell length information (L) (of the complete short cell without omission) from the combination and order of the short cells fed from the multiplexing combination determiner B (4B-1).

If the relationship, multiplexed cell number×short cell length≦multiplexed data length available for multiplexing the short cells (that is, 48 bytes—multiplexing information length—AAL length of the standard ATM) is satisfied, no cell overlapping will occur.

In contrast, in the case of multiplexed cell number×short cell length>multiplexed data length available for multiplexing the short cells (that is, 48 bytes—multiplexing information length—AAL length of the standard ATM), the cell overlapping will occur, and hence the control must be carried out for delivering the overflowed data of the short cell at the final position to the next multiplexed data. In this case, the multiplexing sequence numbers (SN) are provided as the multiplexing information depending on the number of repetitions of the overlapping of the multiplexed data as described above. If no overlapping of the multiplexed data occurs, the multiplexing sequence number (SN) is basically unnecessary. However, it can be set to zero to distinguish the absence of the overlapping from the presence thereof if they are mixed.

The multiplexing information may be further provided with the error detecting/error correcting bits (C) to detect the transmission error and prevent it.

Example 3 of the Multiplexing information Data Structure

Figures 12A, 12B:
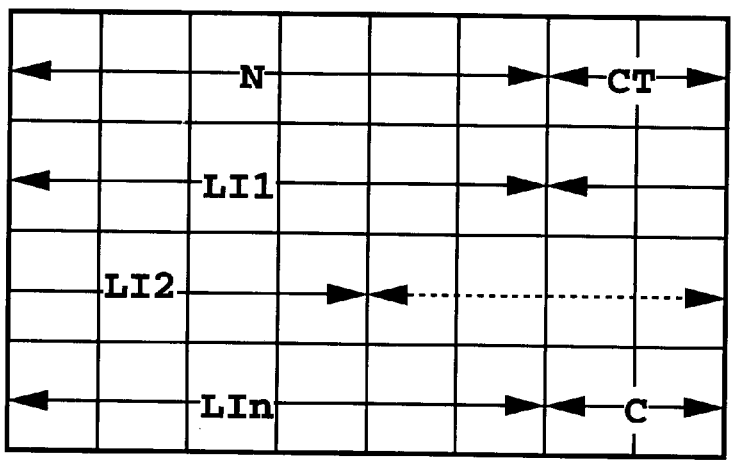
FIG. 12A is a diagram illustrating a data assembling method 3 of the multiplexing information.
FIG. 12B is a diagram illustrating the data assembling method 3 of the multiplexing information.
Figure 13:
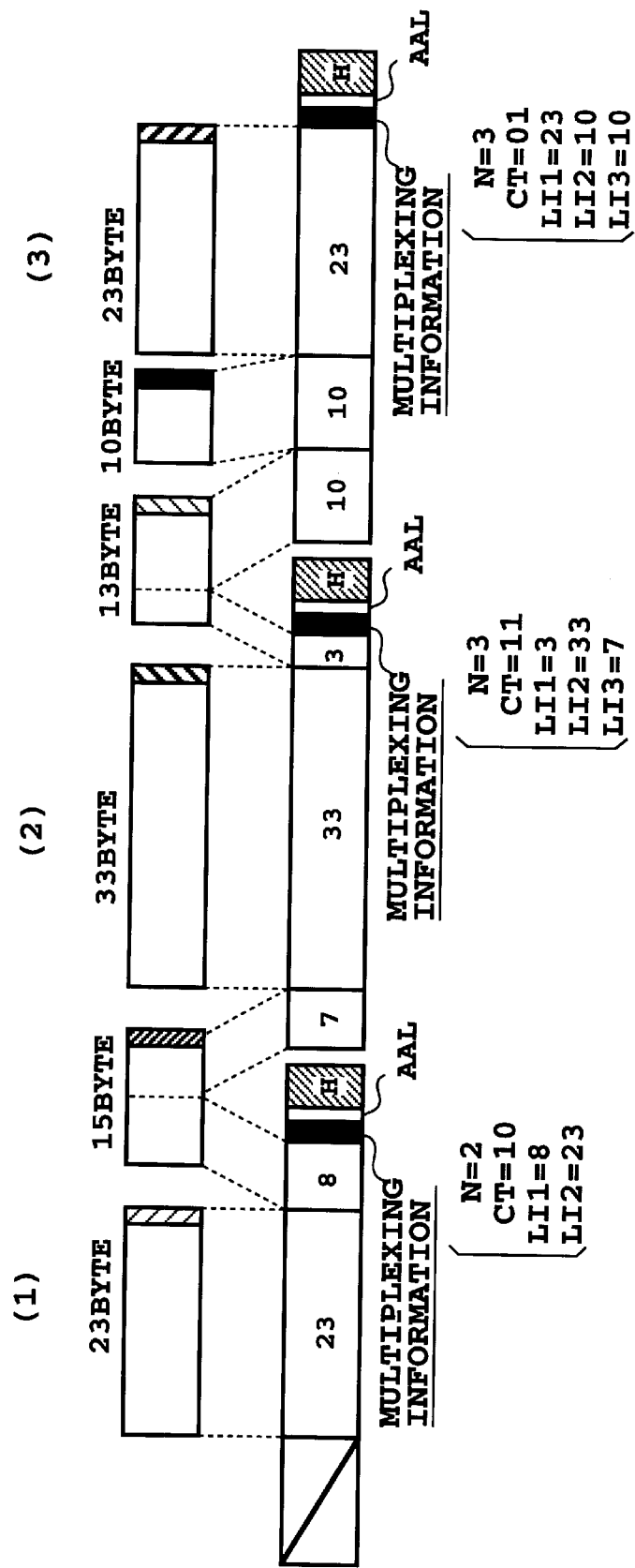
FIG. 13 is a diagram illustrating an example of the data assembling method 3 of the multiplexing information.

The structure as shown in FIGS. 12 and 13 includes multiplexed cell number information (N), composite type information (CT: Cell Type), short cell length information (LI1-LIn) and error detecting/error correcting bits (C) (parity bits, CRC, etc.) for the transmission error when transferring these data.

This data structure is employed when multiplexing the short cells of the same and different lengths.

The multiplexed cell number information (N) indicates the number of short cells multiplexed into the multiplexed data. It takes an integer number (including zero) such as 0, 1, 2, 3, . . . as in the example 2 of the multiplexing information data structure.

The composite type information (CT) is for indicating whether the entire short cells are complete (CT="00"), lacking only the second half of the cell at the final position (N-th one of the multiplexed cells) (CT="01"), lacking only the first half of the cell at the initial position (first one of the multiplexed cells) (CT="10") or lacking both the first half of the first short cell and the second half of the N-th short cell (CT="11").

The short cell length information (LI1-LIn), including the same number of pieces of information as that of the multiplexed cells, indicates the number of bytes of each short cell. For example, if the number of multiplexed cells is five, there are five pieces of short cell length information.

In the example 3 of the multiplexing information data structure, the multiplexing information generator B (4B-2) forms the multiplexed cell number information (N), composite type information (CT) and N pieces of short cell length information (LI1-LIn) in accordance with the combination and order of the short cells fed from the multiplexing combination determiner B (4B-1). The multiplexing information can further include the error detecting/error correcting bits (C) for detecting and preventing its transmission error.

The multiplexing information can take a variable information length corresponding to the multiplexed cell number information (N), and a short cell disassembling portion B (10B-1) can decide the data structure and information length of the multiplexed data.

The short cell disassembler B will now be described referring to FIG. 9.

Figure 9:
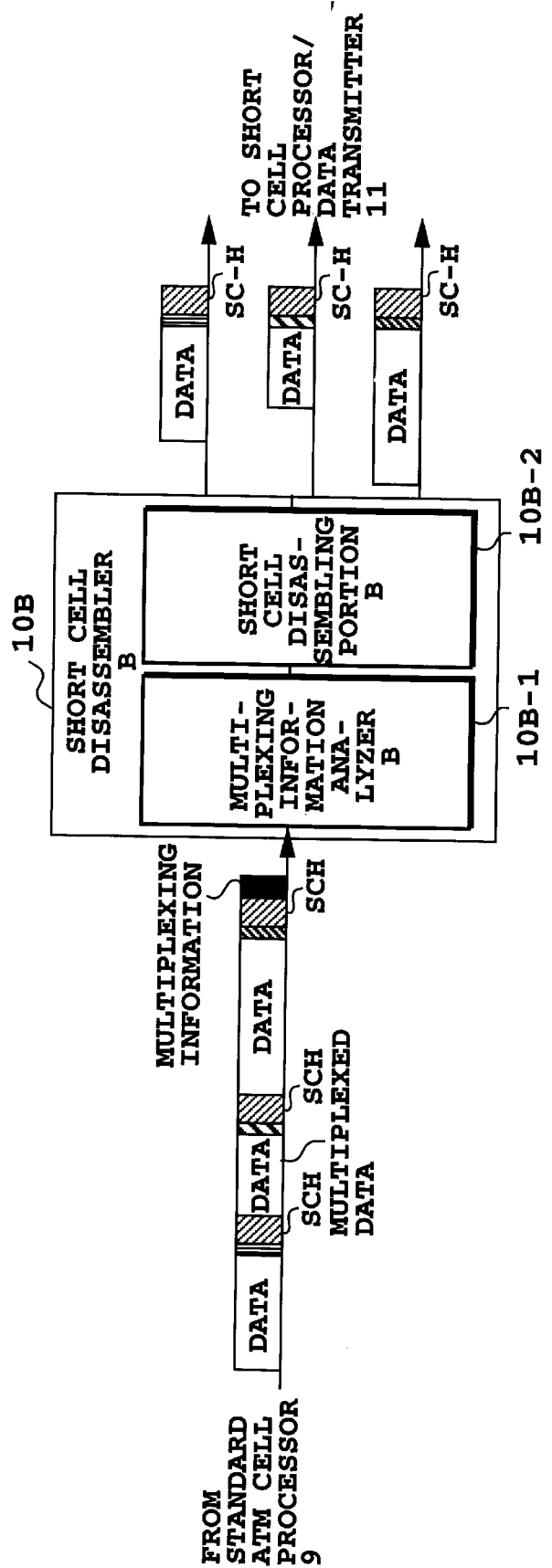
FIG. 9 is a block diagram showing a detailed configuration and operational example of another embodiment of the short cell disassembler.

In FIG. 9, the short cell disassembler B (10B) is composed of the multiplexing information analyzer B (10B-1) and the short cell disassembling portion B (10B-2). The short cell disassembler B disassembles the multiplexed data which is assembled by the short cell multiplexing portion B (4B-3) and fed from the standard ATM cell processor 9, and combines the disassembled data into short cells.

The multiplexing information analyzer B (10B-1) extracts the multiplexing information from the initial position of the multiplexed data assembled by the short cell multiplexing portion B (4B-3), and analyzes the information, thereby extracting the information for extracting the multiplexed short cells.

The short cell disassembling portion B (10B-2) carries out extracting processing of the multiplexed short cells in accordance with the multiplexing information obtained. The processing, however, differs depending on the multiplexing information data structure, and hence it will be described for respective examples of the multiplexing information data structure, separately.

In the example 1 of the multiplexing information data structure, the short cell disassembling portion B (10B-2) obtains the multiplexed pattern identifier (PI) and error detecting/error correcting bits (C) as the multiplexing information.

First, the short cell disassembling portion B (10B-2) makes a decision from the error detecting/error correcting bits (C) whether or not any transmission error occurs in the multiplexing information, and corrects the error if it is correctable. If the error cannot be corrected because only the error detecting function is provided, or the error is not correctable, the multiplexed data is relinquished because it is difficult to extract the short cell on the basis of the erroneous information. (Alternatively, it may be possible to continue the processing without relinquishing, allowing the possibility of error extraction).

Second, the short cell disassembling portion B (10B-2) can extract the short cells because it can decide the multiplexed data structure of the short cells from the multiplexed pattern identifier information (PI).

If the short cell is placed across a plurality of multiplexed data, a complete short cell can be recovered by combining its stored first half and its second half contained in the next multiplexed data.

For example, if the multiplexed pattern identifier is "000011", one 30-byte short cell and the first 16 bytes of a second 30-byte short cell are multiplexed, and if the multiplexed pattern identifier is "000100", the second 14 bytes of the second 30-byte short cell, a third 30-byte short cell and 2-byte null information are multiplexed. With such a multiplexed data structure including short cells across the plurality of multiplexed data, the complete short cell can be recovered by combining its components across the multiplexed data when receiving the multiplexed pattern identifier information "000011" followed by the multiplexed pattern identifier information "000100".

If some contradiction occurs in the multiplexed pattern information (for example, the multiplexed pattern identifier information "000011" is successively received twice in the foregoing example), it can be found that the cell loss occurs in the standard ATM cell conveying the multiplexing information.

The short cell is relinquished if a complete short cell cannot be recovered owing to the omission of the multiplexed data due to the cell loss or owing to the cancellation of the multiplexed data due to the transmission error.

In other words, the first half of the short cell stored to be combined with its second half is relinquished if the expected second half cannot be obtained.

In contrast, if the first half of the short cell has not been stored to be combined with its second half extracted from the initial position of the multiplexed data, the extracted second half of the short cell is cancelled. Thus, the second and the following short cells in the multiplexed data are made valid.

To determine the presence or absence of the cell loss or the accurate number of the lost cells, it is necessary to apply the AAL (AAL type 1, for example) having order information in the standard ATM cells conveying the multiplexed data.

Using the function of the AAL of the standard ATM cells and having the standard ATM cell processor 9 notify the short cell disassembling portion B (10B-2) of the occurrence of the cell loss make it possible to prevent erroneous short cell combining (combining of the first half and the second half of different short cells) due to the cell loss undetectable from the multiplexing information.

The short cells the short cell disassembling portion B (10B-2) produces are delivered to the short cell processor/ data transmitter 11.

In the example 2 of the multiplexing information data structure, the short cell disassembling portion B (10B-2) obtains the multiplexed cell number information (N), short cell length information (L), multiplexing sequence number (SN), and error detecting/error correcting bits (C), as the multiplexing information.

First, the short cell disassembling portion B (10B-2) makes a decision from the error detecting/error correcting bits (C) whether or not any transmission error occurs in the multiplexing information, and corrects the error if it is correctable. If the error cannot be corrected because only the error detecting function is provided, or the error is not correctable, the multiplexed data is relinquished because it is difficult to extract the short cell on the basis of the erroneous information. (Alternatively, it may be possible to continue the processing without relinquishing, allowing the possibility of error extraction).

Second, the short cell disassembling portion B (10B-2), analyzing the multiplexing sequence number (SN), makes a decision that no cell overlapping is present if SN=0, and extracts N-short cells with a length of LI bytes in accordance with the multiplexed cell number information (N) and the short cell length information (L).

If SN=1, the short cell disassembling portion B (10B-2), recognizing that a new cell overlapping begins, extracts the short cells with a length of LI bytes as many as possible, and stores the remaining incomplete short cell to be combined with the second half of that short cell obtained from the next multiplexed data (in which SN=2).

The extraction processings are carried out N times including that of the incomplete short cell. If there further remains some multiplexed data, it is cancelled out as the null information.

If SN>1, the short cell disassembling portion B (10B-2) determines the boundaries between the short cells in the multiplexed data in accordance with the SN, and extracts the short cells. The first short cell extracted is the second half of the short cell whose first half has been stored. Thus, they are combined to a complete short cell.

The short cell disassembling portion B (10B-2) extracts the short cells with the length of LI bytes as many as possible beginning from the second short cell, and stores the remaining incomplete short cell to be combined with its second half which will be obtained from the next multiplexed data.

The extraction processings are carried out N times including that of the incomplete short cell. If there further remains some multiplexed data, it is cancelled out as the null information.

For example, in the case where the multiplexed data length available for multiplexing the short cells is 45 bytes, and when 36-byte short cell are multiplexed across the multiplexed data, the multiplexed data with the multiplexing sequence number 1 (multiplexed data 1) indicates that it includes a first 36-byte short cell (short cell A) and a 9-byte short cell (a first half of a second short cell B). Likewise, the multiplexed data with the multiplexing sequence number 2 (multiplexed data 2) indicates that it includes a 27-byte short cell (the second half of the second short cell B) and an 18-byte short cell (a first half of a third short cell C). Accordingly, the short cell disassembling portion B (10B-2) stores the first half of the second short cell B at the time it receives the multiplexed data 1, and combines it with the second half of the second short cell B at the time it receives the multiplexed data 2 to obtain the complete short cell.

In this example, if the multiplexed cell number N of the multiplexed data 2 is one, only the second half of the short cell B is extracted, and the remaining data is cancelled out as the null information. In this case, the multiplexing sequence number is reset to the next new number SN=1.

If the received multiplexing sequence number skips (such as the multiplexing sequence number 1 is followed by the multiplexing sequence number 3), it can be found that the cell loss occurs in the standard ATM cell conveying the multiplexing information.

The short cell is relinquished if a complete short cell cannot be recovered owing to the omission of the multiplexed data due to the cell loss or owing to the cancellation of the multiplexed data due to the transmission error.

In other words, the first half of the short cell stored to be combined with its second half is relinquished if the expected second half cannot be obtained.

In contrast, if the first half of the short cell has not been stored to be combined with its second half extracted from the initial position of the multiplexed data, the extracted second half of the short cell is cancelled. Thus, the second and the following short cells in the multiplexed data are made valid.

Although the cell loss within one cycle of the sequence can be detected using the multiplexing sequence number, to determine the presence or absence of the cell loss or the accurate number of the lost cells beyond that range, it is necessary to apply the AAL (AAL type 1, for example) having the order information in the standard ATM cells conveying the multiplexed data.

Using the function of the AAL of the standard ATM cells and having the standard ATM cell processor 9 notify the short cell disassembling portion B (10B-2) of the occurrence of the cell loss make it possible to prevent erroneous short cell combining (combining of the first half and the second half of different short cells) due to the cell loss undetectable from the multiplexing information.

The short cells the short cell disassembling portion B (10B-2) produces are delivered to the short cell processor/data transmitter 11.

Figure 38:
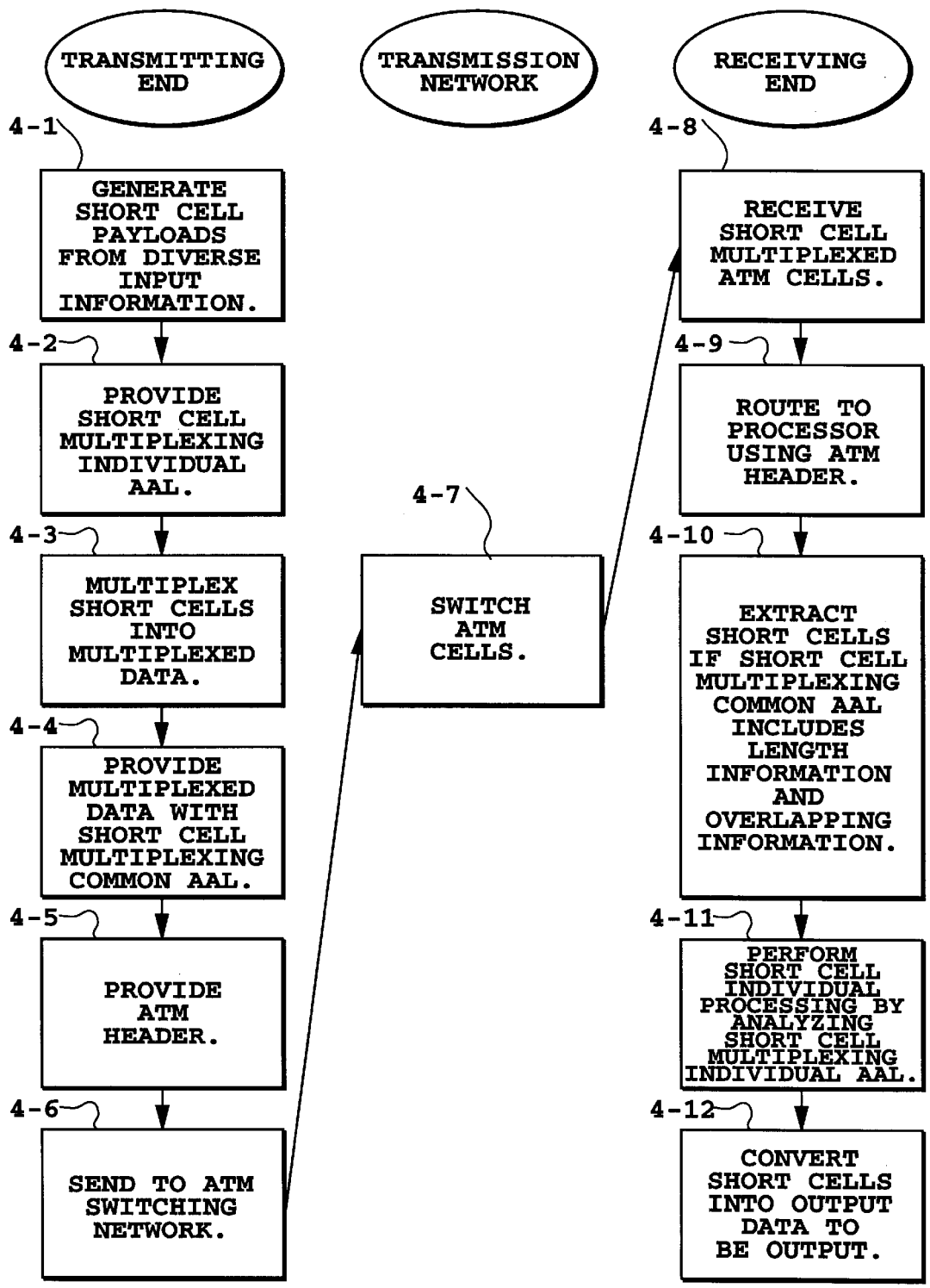
FIG. 38 is a flowchart illustrating a particular combination of the short cell multiplexing common AAL and the short cell multiplexing individual AAL in the short cell multiplexed ATM transmission method.

In the example 3 of the multiplexing information data structure, the short cell disassembling portion B (10B-2) obtains the multiplexed cell number information (N), composite type information (CT: Cell Type), N pieces of short cell length information (LI1-LIn) and error detecting/error correcting bits (C). As will be described in connection with FIGS. 35, 36 and 38, the example 3 of the multiplexing information data structure includes the length information and overlapping information in the common AAL for multiplexing. FIGS. 35, 36 and 38 are flowcharts of the processing mentioned above.

First, the short cell disassembling portion B (10B-2) makes a decision from the error detecting/error correcting bits (C) whether or not any transmission error occurs in the multiplexing information, and corrects the error if it is correctable. If the error cannot be corrected because only the error detecting function is provided, or the error is not correctable, the multiplexed data is relinquished because it is difficult to extract the short cell on the basis of the erroneous information. (Alternatively, it may be possible to continue the processing without relinquishing, allowing the possibility of error extraction).

Second, the short cell disassembling portion B (10B-2) extracts N short cells in accordance with the multiplexed cell number information, the composite type information (CT) and the short cell length information (LI1-LIn). Specifically, after extracting the multiplexing information, it extracts N short cells in accordance with the lengths indicated by the short cell length information (short cell length information (LI1-LIn)) beginning from the initial position of the multiplexed data, and relinquishes the remaining data, it there is any, as the null information.

In this case, the composite type information CT is referred to for carrying out the extracting processing of the first and N-th short cells (where N=1 is possible).

If CT="00", the short cell disassembling portion B (10B-2) decides that the entire short cells are complete, and carried out the normal extracting processing.

If CT="01", the short cell disassembling portion B (10B-2) decides that only the second half of the N-th short cell is lacking, and stores the N-th short cell to be combined with the first short cell in the next multiplexed data.

If CT="10", the short cell disassembling portion B (10B-2) decides that only the first half of the first short cell is lacking, and obtains a complete short cell by combining the first short cell with the stored final short cell in the previous multiplexed data.

If CT="11", the short cell disassembling portion B (10B-2) decides that both the first half of the first short cell and the second half of the N-th short cell are lacking, and combines the stored final short cell in the previous multiplexed data with the received first short cell to restore a complete short cell (if N=1, a complete short cell cannot be obtained and hence it is stored again). In addition, the received N-th short cell is stored to be combined with the first short cell in the next multiplexed data.

It can be found that the cell loss occurs in the standard ATM cell conveying the multiplexing information, if some contradiction occurs in the received composite type information (for example, although the received multiplexing information of multiplexed data is CT="00" or CT="10", that of the next multiplexed data is CT="10" or CT="11"; or reversely, although CT="10" or CT="11" is received as the multiplexing information of multiplexed data, the multiplexing information of the previous multiplexed data is CT="00" or CT="10" and there is no stored short cell to be combined).

The short cell is relinquished if a complete short cell cannot be recovered owing to the omission of the multiplexed data due to the cell loss or owing to the cancellation of the multiplexed data due to the transmission error.

In other words, the first half of the short cell stored to be combined with its second half is relinquished if the expected second half cannot be obtained.

In contrast, if the first half of the short cell has not been stored to be combined with its second half extracted from the initial position of the multiplexed data, the extracted second half of the short cell is cancelled. Thus, the second and the following short cells in the multiplexed data are valid.

To determine the presence or absence of the cell loss or the accurate number of the lost cells, it is necessary to apply the AAL (AAL type 1, for example) having the order information in the standard ATM cells conveying the multiplexed data.

Using the function of the AAL of the standard ATM cells and having the standard ATM cell processor 9 notify the short cell disassembling portion B (10B-2) of the occurrence of the cell loss make it possible to prevent erroneous short cell combining (combining of the first half and the second half of different short cells) due to the cell loss undetectable from the multiplexing information.

The short cells the short cell disassembling portion B (10B-2) produces are delivered to the short cell processor/data transmitter 11.

EMBODIMENT 3

An embodiment 3 of the short cell multiplexer and short cell disassembler will now be described with reference to FIGS. 14–16.

In the present embodiment 3, since the multiplexed data structure is known by a short cell multiplexer C (4C) and a short cell disassembler C (10C) in advance, it is only necessary to combine short cells in accordance with the known multiplexed pattern.

Thus, the present embodiment is characterized in that it is unnecessary for the short cell multiplexer C (4C) to add the foregoing short cell information or multiplexing information by matching the multiplexed data structure and the header address of the standard ATM cell conveying the multiplexed data to those of the short cell disassembler C (10C) in advance. This offers the advantage that the data bytes in the payload of the standard ATM cell, which have been occupied by the short cell information or the multiplexing information, can be used for multiplexing the short cells.

In addition, the short cell multiplexer C (4C) can employ the header of the short cell multiplexed onto the initial position of multiplexed data as the header of the standard ATM cell conveying the multiplexed data without change, if the structure of the short cell header provided to the short cell by the SC-H provider 3-4 is the same as that of the standard ATM cell, and if the short cell multiplexer C (4C) has made the above-mentioned matching in advance, that is, the matching of the address of the short cell header and the multiplexed data structure with those of the short cell disassembler C (10C), when providing the short cell header. This presents the advantage that the five bytes occupied by the standard ATM header can be utilized for multiplexing the short cells.

The short cell multiplexer C (4C) is composed of a multiplexing combination determiner C (4C-1) and a short cell multiplexing portion C (4C-2), and carries out different processings according to the following cases.

(1) When the standard ATM cell generator 5 gives the header of the standard ATM cell conveying the multiplexed data.

(2) When the short header given by the SC-H provider 3-4 is used as the header of the standard ATM cell conveying the multiplexed data.

The processings will now be described with reference to FIGS. 15A and 15B.

Figure 15A:
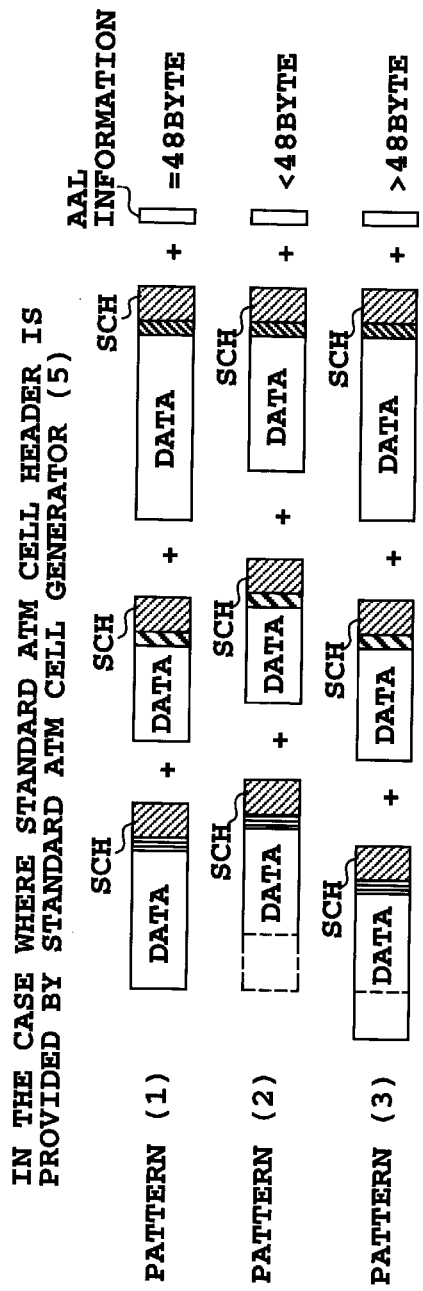
FIG. 15A is a diagram illustrating patterns depending on a multiplexed data length.

(1) When the standard ATM cell generator 5 gives the header of the standard ATM cell conveying the multiplexed data (see, FIG. 15A).

Figure 14:
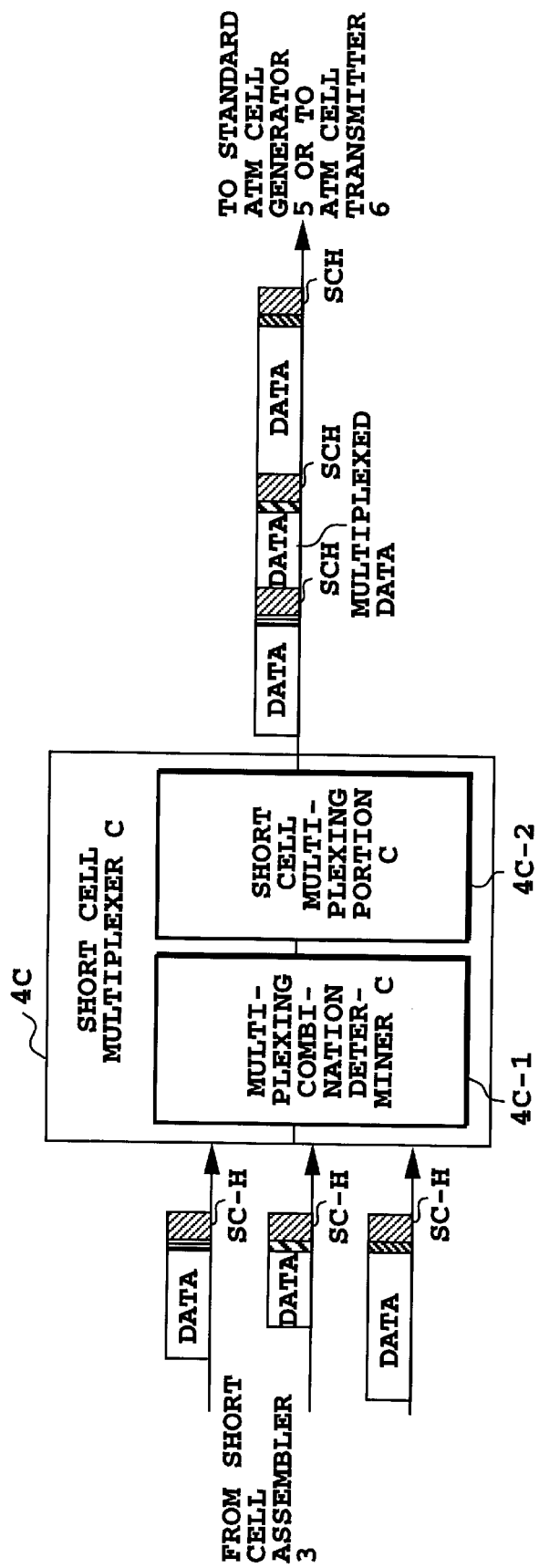
FIG. 14 is a block diagram showing a detailed configuration and operational example of still another embodiment of the short cell multiplexer.

When multiplexing a plurality of input short cells into the payload of the standard ATM cell, the multiplexing combination determiner C (4C-1) in FIG. 14 makes a decision of the combination and order of the multiplexing.

In making this decision, the multiplexing combination determiner C (4C-1) decides the multiplexing in such a way that the multiplexed data structure is obtained which agrees with the address of the standard ATM header provided by the standard ATM cell generator 5. (Alternatively, the standard ATM cell generator 5 provides the standard ATM header corresponding to the multiplexed data structure in accordance with the decision on multiplexing by the multiplexing combination determiner C (4C-1)).

The combinations of multiplexing thus determined falls into the following three multiplexed data length patterns in accordance with the multiplexed data length.

(Pattern 1) The multiplexed data length equals 48 bytes.

(Pattern 2) The multiplexed data length is less than 48 bytes.

(Pattern 3) The multiplexed data length exceeds 48 bytes.

Here, the multiplexed data length is defined as the sum total of the sum of the lengths of the short cells to be multiplexed and the AAL information length given by the standard ATM cell generator 5.

In the case of the pattern 3, since the data cannot be accommodated in a single standard ATM cell, the over- flowed data of the short cell at the final position (that is, data beyond 48 bytes) must be transferred by the next standard ATM cell. Thus, the overflowed data is separated as a new short cell (having no SC-H and SC-AAL), and placed in the next standard ATM cell as the first short cell to be multiplexed.

The short cell multiplexing portion C (4C-2) carries out the different processings in accordance with the multiplexed data length patterns as mentioned above.

In the case of the pattern 1 in which the multiplexed data length is 48 bytes, the short cell multiplexing portion C (4C-2) links the short cells in accordance with the combination and multiplexing order of the short cells decided by the multiplexing combination determiner C (4C-1).

In the case of the pattern 2 in which the multiplexed data length is less than 48 bytes, the short cell multiplexing portion C (4C-2) links the short cells in a manner similar to those of the multiplexed data length pattern 1, and adds the null information (NULL) to the final position of the multiplexed data so that the total data length becomes 48 bytes considering the AAL information length provided by the standard ATM cell generator 5.

In the case of the pattern 3 in which the multiplexed data length exceeds 48 bytes, the multiplexed data length is adjusted to 48 bytes by delivering the data exceeding 48 bytes to the next standard ATM cell as the first short cell to be multiplexed. Accordingly, the short cell multiplexing portion C (4C-2) links the short cells in a manner similar to those of the multiplexed data length pattern 1.

The multiplexed data with a length of 48 bytes assembled by the short cell multiplexing portion C (4C-2) is sent to the standard ATM cell generator 5.

Figure 15B:
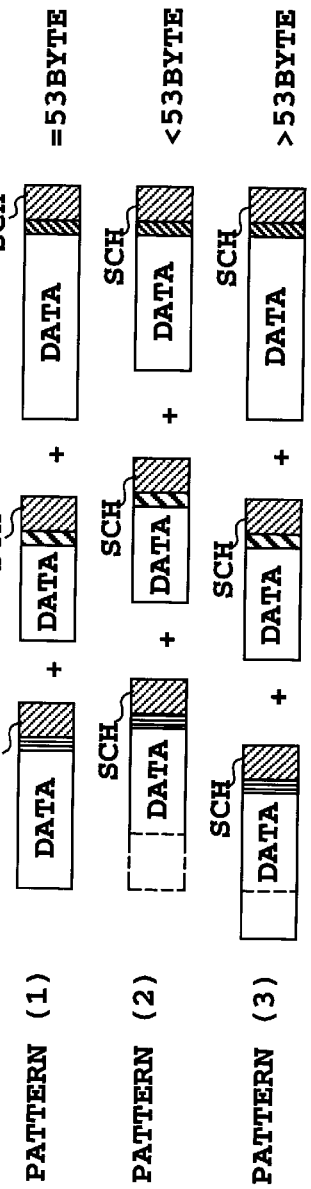
FIG. 15B is a diagram illustrating patterns depending on the multiplexed data length.

(2) When the short header given by the SC-H provider 3-4 is used as the header of the standard ATM cell conveying the multiplexed data (see, FIG. 15B).

When multiplexing a plurality of input short cells into the same form as the standard ATM cell, the multiplexing combination determiner C (4C-1) in FIG. 14 makes a decision of the combination and order of the multiplexing.

In making this decision, the multiplexing combination determiner C (4C-1) decides the multiplexing in such a way that the multiplexed data structure is obtained which agrees with the address of the short cell header which is provided by the SC-H provider 3-4 and has the same structure as the standard ATM header. (Alternatively, the SC-H provider 3-4 provides the short cell header of the same structure as the standard ATM header corresponding to the multiplexed data structure, prior to the decision on multiplexing by the multiplexing combination determiner C (4C-1)).

In the B-ISDN network 7, the SC-H of the first short cell in the multiplexed data functions as the header of the standard ATM, and its SC-AAL functions as the AAL of the standard ATM.

The combinations of multiplexing thus determined falls into the following three patterns in accordance with the multiplexed data length.

(Pattern 1) The multiplexed data length equals 53 bytes.

(Pattern 2) The multiplexed data length is less than 53 bytes.

(Pattern 3) The multiplexed data length exceeds 53 bytes.

Here, the multiplexed data length is defined as the sum of the lengths of the short cells to be multiplexed.

In the case of the pattern 3, since the data cannot be accommodated in a single standard ATM cell, the overflowed data of the short cell at the final position (that is, data beyond 53 bytes) must be transferred by the next standard ATM cell. Thus, the overflowed data is separated as a new short cell (having no SC-H and SC-AAL), and placed in the next standard ATM cell as the short cell to be multiplexed. (In this case, since it has no SC-H, it must be multiplexed in a position other than the initial position. Alternatively, it can be placed at the initial position as the first short cell by providing the same SC-H and SC-AAL as those of the original cell by copying them when making the new short cell from the overflowed data.) The short cell multiplexing portion C (4C-2) carries out the different processings in accordance with the multiplexed data length patterns as mentioned above.

In the case of the pattern 1 in which the multiplexed data length is 53 bytes, the short cell multiplexing portion C (4C-2) links the short cells in accordance with the combination and multiplexing order of the short cells decided by the multiplexing combination determiner C (4C-1).

In the case of the pattern 2 in which the multiplexed data length is less than 53 bytes, the short cell multiplexing portion C (4C-2) links the short cells in a manner similar to that of the multiplexed data length pattern 1, and then adds the null information (NULL) to the final position of the multiplexed data so that the total data length becomes 53 bytes.

In the case of the pattern 3 in which the multiplexed data length exceeds 53 bytes, the multiplexed data length is adjusted to 53 bytes by delivering the data exceeding 53 bytes to the next standard ATM cell as the short cell to be multiplexed. Accordingly, the short cell multiplexing portion C (4C-2) links the short cells in a manner similar to that of the multiplexed data length pattern 1.

The multiplexed data with a length of 53 bytes assembled by the short cell multiplexing portion C (4C-2) is sent to the ATM cell transmitter 6. (The processing by the standard ATM cell generator 5 is omitted).

The short cell disassembler C will now be described with reference to FIG. 16.

The short cell disassembler C (10C) carries out different processings according to the following cases taken by the short cell multiplexer C (4C) to assemble the multiplexed data.

(1) When the standard ATM cell generator 5 gives the header of the standard ATM cell conveying the multiplexed data.

(2) When the short header given by the SC-H provider 3-4 is used as the header of the standard ATM cell conveying the multiplexed data.

The case will now be described where standard ATM cell generator 5 gives the header of the standard ATM cell conveying the multiplexed data.

Figure 16:
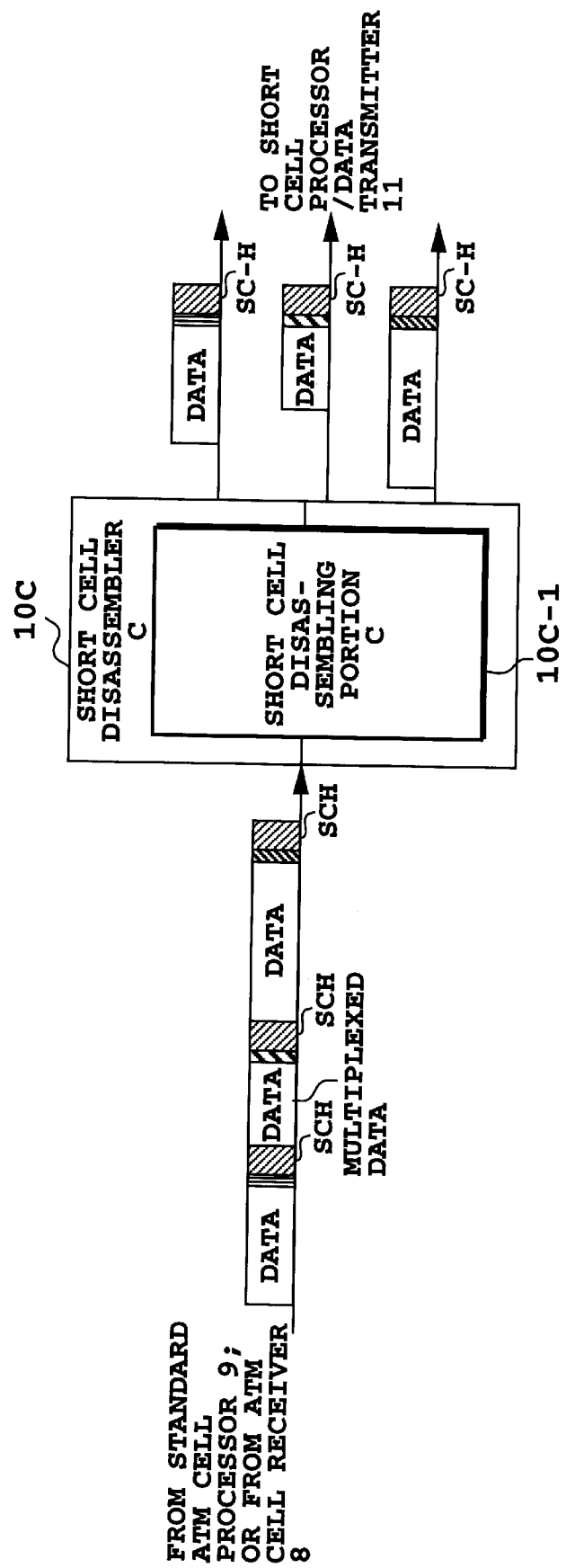
FIG. 16 is a block diagram showing a detailed configuration and operational example of still another embodiment of the short cell disassembler.

In FIG. 16, the short cell disassembler C (10C) is composed of a short cell disassembling portion C (10C-1). It disassembles the multiplexed data which is assembled by the short cell multiplexing portion C (4C-2) and fed from the standard ATM cell processor 9, and combines the disassembled data into short cells.

The short cell disassembling portion C (10C-1) makes a decision of the corresponding multiplexed data structure from the address of the standard ATM header processed by the standard ATM cell processor 9, and extracts the short cells from the multiplexed data.

If the previously known multiplexed data structure allows a short cell overlapping across a plurality of multiplexed data, the received short cell (the first half) is stored to be combined with the second half in the next multiplexed data when it is received to form a complete short cell.

To determine the presence or absence of the cell loss or the accurate number of the lost cells, it is necessary to apply the AAL (AAL type 1, for example) having the order information in the standard ATM cells.

The short cell is relinquished if a complete short cell cannot be recovered owing to the omission of the multiplexed data due to the cell loss or owing to the cancellation of the multiplexed data due to the transmission error.

In other words, the first half of the short cell stored to be combined with its second half is relinquished if the expected second half cannot be obtained.

In contrast, if the first half of the short cell has not been stored to be combined with its second half extracted from the initial position of the multiplexed data, the extracted second half of the short cell is cancelled. Thus, the second and the following short cells in the multiplexed data are made valid.

(2) When the short header given by the SC-H provider 3-4 is used as the header of the standard ATM cell conveying the multiplexed data.

In FIG. 16, the short cell disassembler C (10C) is composed of the short cell disassembling portion C (10C-1). It disassembles the multiplexed data which is assembled by the short cell multiplexing portion C (4C-2) and fed from the ATM cell receiver 8, and combines the disassembled data into short cells. (The processing in the standard ATM cell processor 9 is omitted.)

The short cell disassembling portion C (10C-1) makes a decision of the corresponding multiplexed data structure from the address of the short cell header, and extracts the short cells from the multiplexed data.

If the previously known multiplexed data structure allows a short cell overlapping across a plurality of multiplexed data, the received short cell (the first half) is stored to be combined with the second half in the next multiplexed data when it is received to form a complete short cell.

To determine the presence or absence of the cell loss or the accurate number of the lost cells, it is necessary to apply the AAL (AAL type 1, for example) having the order information in the standard ATM cells.

The short cell is relinquished if a complete short cell cannot be recovered owing to the omission of the multiplexed data due to the cell loss or owing to the cancellation of the multiplexed data due to the transmission error.

In other words, the first half of the short cell stored to be combined with its second half is relinquished if the expected second half cannot be obtained.

In contrast, if the first half of the short cell has not been stored to be combined with its second half extracted from the initial position of the multiplexed data, the extracted second half of the short cell is cancelled.

OTHER EMBODIMENTS

Figure 17B:
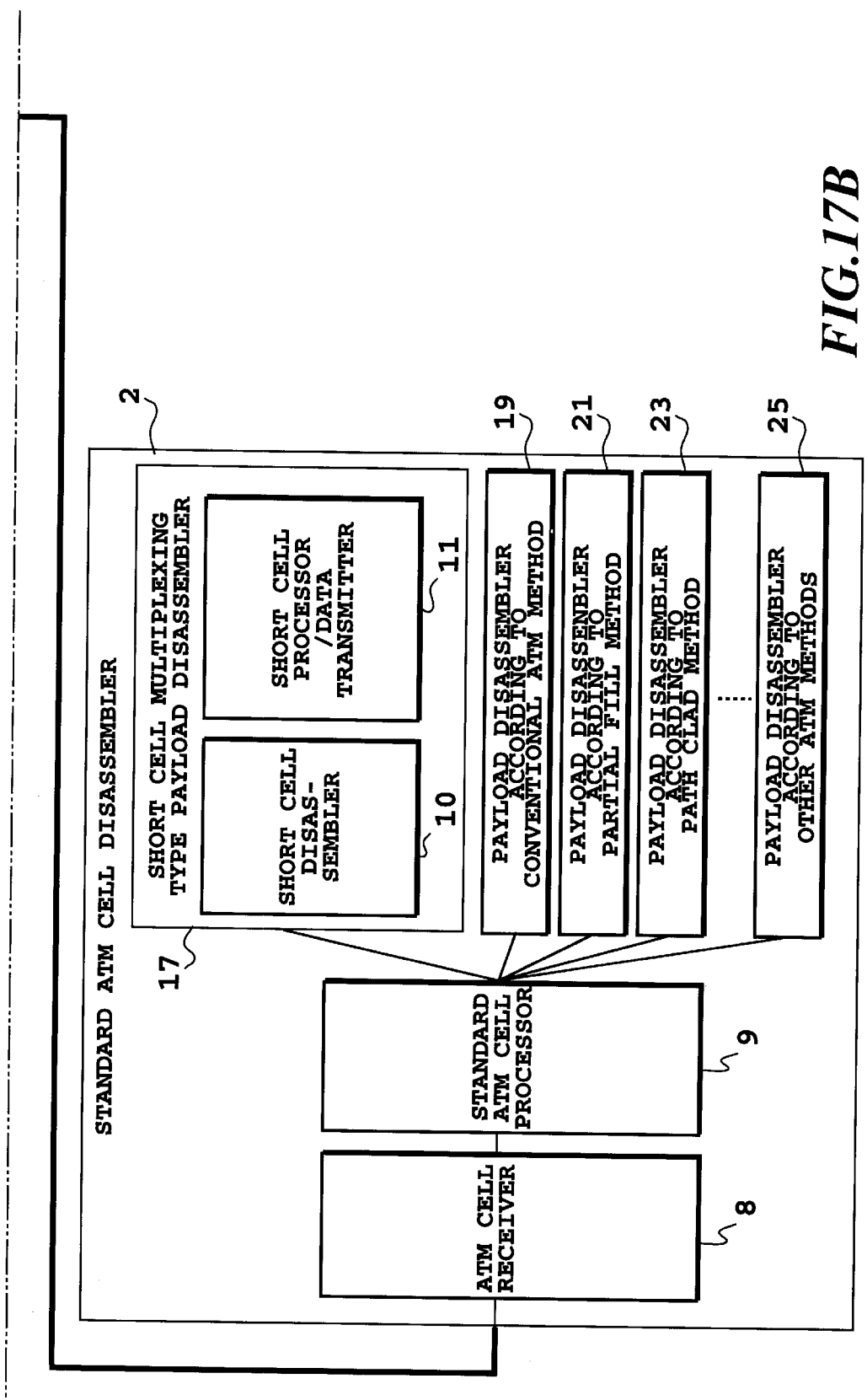
FIG. 17B is a block diagram showing the combined transmission of the short cell multiplexed transmission and other transmissions.

Referring to FIGS. 17A and 17B, other embodiments will now be described which carries out transmission by an integrated method of the foregoing short cell multiplexed ATM transmission method and other transmission methods.

In FIGS. 17A and 17B, the standard ATM cell assembler 1 can comprise, besides a short cell multiplexing payload assembler 16 including the data receiver/short cell assembler 3 and short cell multiplexer 4, payload assemblers 18, 20, 22 and 24 employing other ATM transmission methods.

The conventional ATM type payload assembler 18 assembles the payload (except for the AAL information) of the existing ATM cell according to the specifications on AAL type 1–type 5 defined by ITU-T international standard.

The partial fill type payload assembler 20 assembles the payload (except for the AAL information) of the ATM cell, in which only part of the payload is used for user data and the remaining portion is filled with the null information to reduce the delay involved in assembling the cell.

The path clad type payload assembler 22 assembles the payload (except for the AAL information) of the ATM cell by dividing the payload of an ATM cell into several subslots so that a plurality of user data are put into respective subslots of the payload of the single ATM cell. This method enables a mechanical fast processing by associating the time slots of the STM channel with the subslots of the ATM cell, for example.

The other ATM type payload assembler 24 assembles the payload (except for the AAL information) of an ATM cell other than the foregoing ATM cells.

The standard ATM cell disassembler 2 can comprise, besides a short cell multiplexing type payload disassembler 17 including the short cell disassembler 10 and the short cell processor 11, payload disassemblers 19, 21, 23 and 25 employing other ATM transmission methods.

The conventional type ATM payload disassembler 19 disassembles and processes the payload (except for the AAL information) assembled by the conventional ATM type payload assembler 18.

The partial fill type payload disassembler 21 disassembles and processes the payload (except for the AAL information) assembled by the partial fill type payload assembler 20.

The path clad type payload assembler 23 disassembles and processes the payload (except for the AAL information) assembled by the path clad type payload assembler 22.

The other ATM type payload disassembler 25 disassembles the payload (except for the AAL information) assembled by the other ATM type payload assembler 24.

The standard ATM cell generator 5 receives the payloads of the standard ATM with various internal structures formed by the payload assemblers 16, 18, 20, 22 and 24, and assembles the standard ATM cell by adding the needed AAL information and ATM header.

The standard ATM cell processor 9, receiving from the ATM cell receiver 8 the mixed standard ATM cells having various internal structures formed by the payload assemblers 16, 18, 20, 22 and 24, processes the ATM header of each received standard ATM cell, and carries out the AAL processing. The payloads thus obtained are delivered separately to the payload disassemblers 17, 19, 21, 23 and 25.

The standard ATM cell generator 5 and standard ATM cell processor 9 each have a branching means: The standard ATM cell generator 5 employs it for mixing the plurality of ATM transmission methods to carry out transmission over the common B-ISDN network 7; and the standard ATM cell processor 9 employs it for branching the standard ATM cells into corresponding payload disassemblers.

There are two branching methods as follows, and the two can be combined.

(1) Branching method 1 that employs the routing bits (VPI and VCI) of the ATM header.

The standard ATM cell processor 9 decides the payload disassemblers 17, 19, 21, 23 and 25 to which the branched cells are delivered by analyzing the routing bits (VPI and VCI) of the ATM header.

For this purpose, when providing the ATM header during ATM path setting, the standard ATM cell generator 5 communicates with the standard ATM cell processor 9 to establish correspondence between the routing bits of the provided ATM header and the types of the transmission methods. The correspondence can be omitted if it is set in advance as the office data or the like.

(2) Branching method 2 that possesses the transmission method information as part of the AAL information of the ATM payload.

The standard ATM cell processor 9 decides the payload disassemblers 17, 19, 21, 23 and 25 to which the branched cells are to be delivered by analyzing, during the AAL processing, the transmission method information included in the part of the AAL information.

For this purpose, the standard ATM cell generator 5 places the transmission method information indicating the transmission methods into the part of the AAL information when providing the AAL. The payload assemblers 16, 18, 20, 22 and 24 each assemble the payload with a length taking account of the length of the AAL information.

EMBODIMENT 4

The relationships between the AAL information and information for multiplexing the short cells will be considered again.

The AAL information is the information for the adaptation to the ATM. Furthermore, considering the short cell multiplexing in the embodiments of the present invention, all the information for adaptation needed to transmit a plurality of short cells by multiplexing them into a single ATM connection can be generally termed short cell multiplexing AAL information.

Figure 18A:
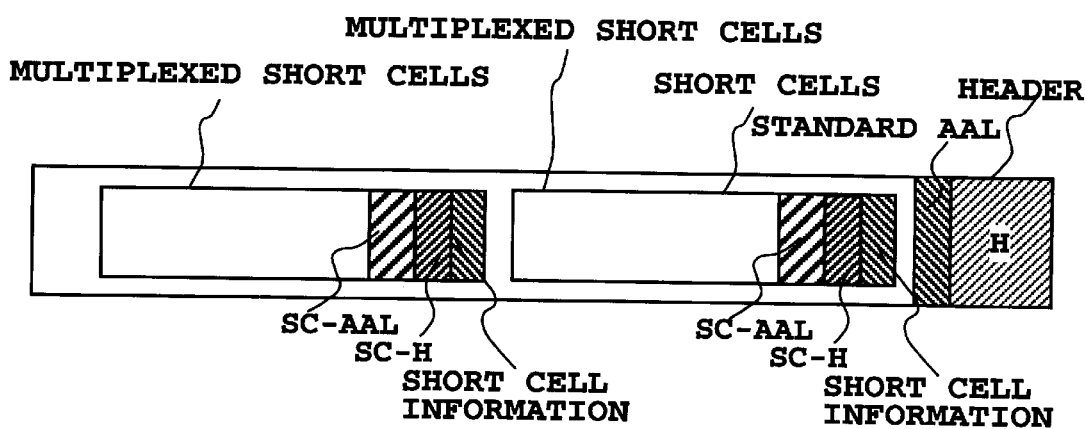
FIG. 18A is a diagram illustrating a format of the short cell multiplexing.
Figure 18B:
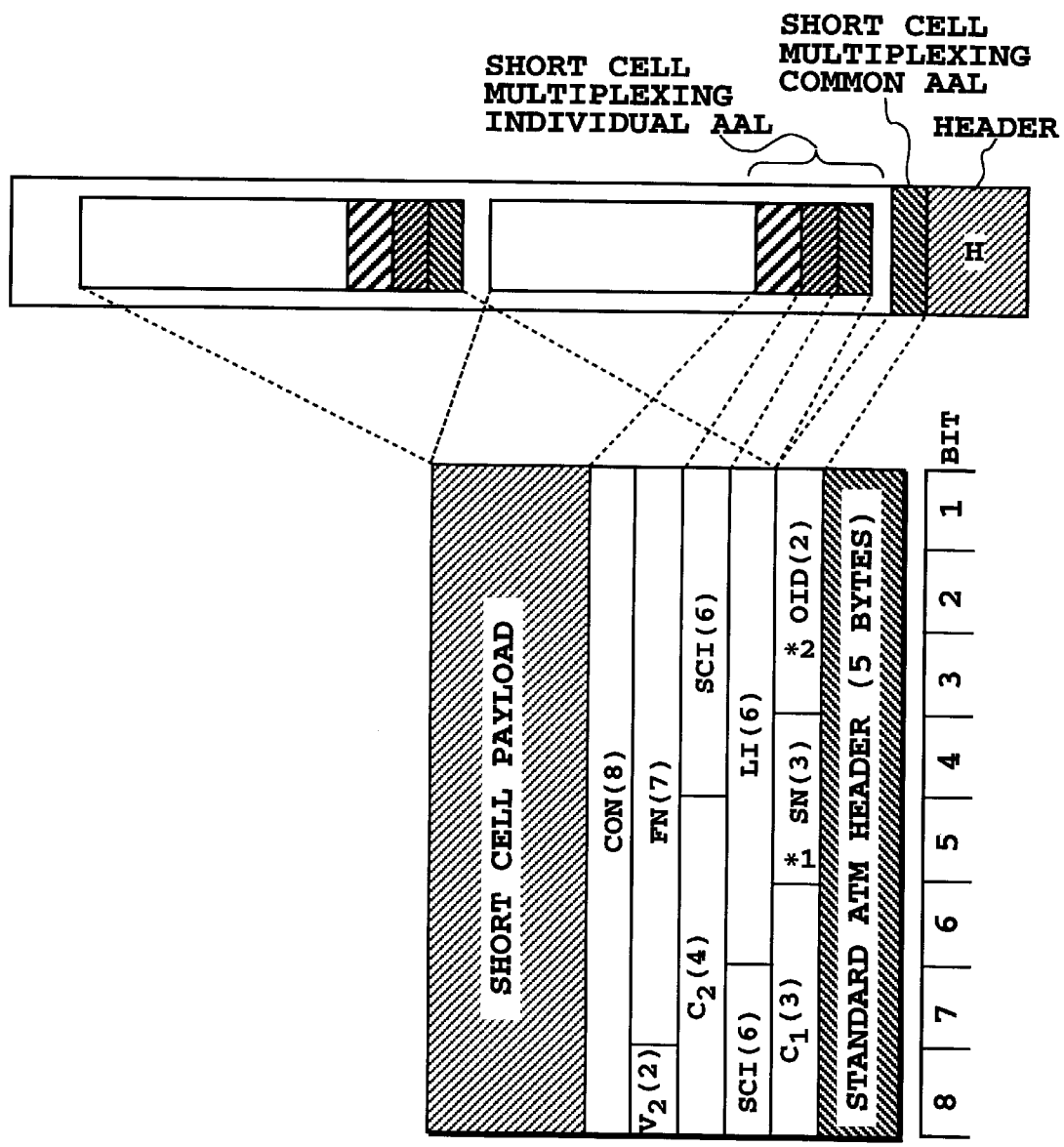
FIG. 18B is a diagram illustrating the format of the short cell multiplexing.

This will be described with reference to FIGS. 18 and 19. FIG. 18 corresponds to the foregoing embodiment 1 and FIG. 19 corresponds to the foregoing embodiment 2.

Figure 6:
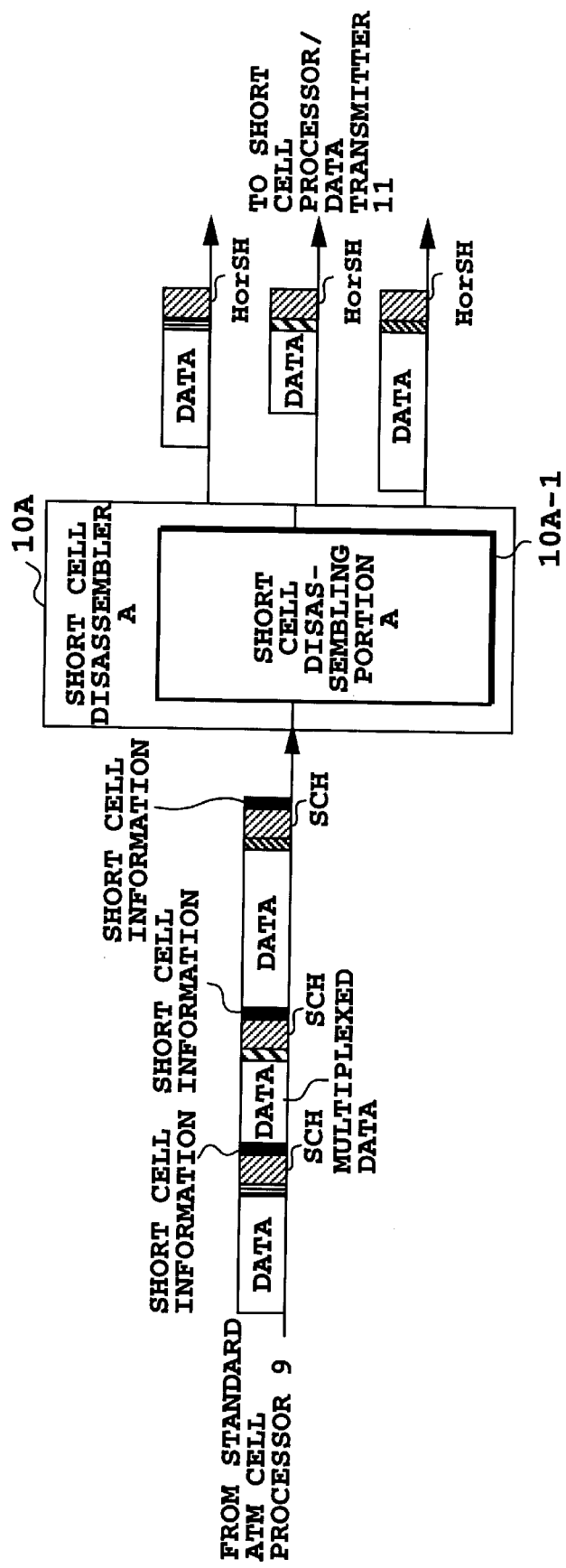
FIG. 6 is a block diagram showing a detailed configuration and operational example of a short cell disassembler.

As described in the embodiment 1 in connection with FIGS. 4–6, when the length information is provided for each short cell, the short cell header (SC-H) and/or the individual short cell information, combined with the SC-AAL, and the AAL in the standard ATM cell can be called the short cell multiplexing AAL. In this case, the AAL in the standard ATM cell is the short cell common AAL which can be distinguished from the short cell individual AAL provided for each short cell like the short cell information, SC-H and SC-AAL.

In FIG. 18 illustrating the foregoing relationships concretely, the symbols represent the following.

Short cell multiplexing common AAL
SN: Sequence Number
OID: Overlapping Identifier
C: Check bit
Short cell multiplexing individual AAL
(Short cell information)
   LI: Length Information
(SC-H)
   SCI: Short cell Connection Identifier
   PT: Payload Type
   C: Check bit
(SC-AAL)
   FN: Frame Number
   Vb: Voice activation bit
   CON: Confidentiality Information As described in the embodiment 2 in connection with FIGS. 7–13, when a format is used representing the short cells multiplexed into the standard ATM with a single piece of multiplexing information, the combination of each short cell header (SC-H) and the SC-AAL can be called the short cell multiplexing AAL. In addition, the AAL information added to each multiplexed data, which is assembled by multiplexing the short cells in the AAL layer (ATM Adaptation Layer) carrying out the short cell multiplexing, is called "short cell multiplexing common AAL", and the AAL information added to each short cell in the AAL layer (ATM Adaptation Layer) carrying out the short cell multiplexing is called "short cell multiplexing individual AAL".

Figure 19A:
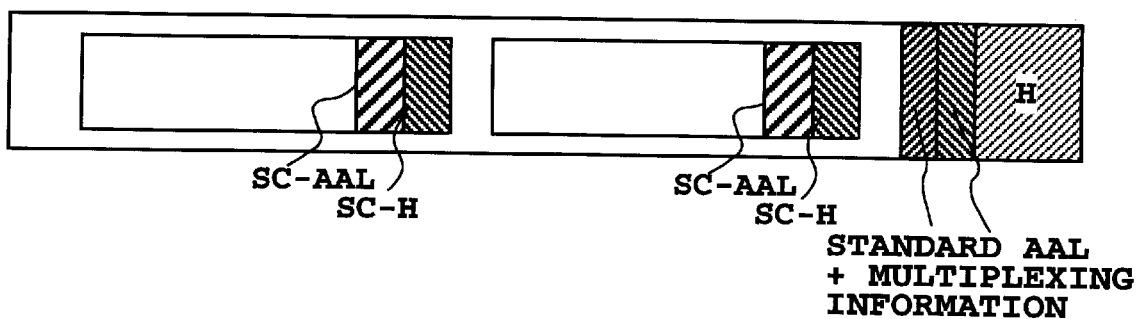
FIG. 19A is a diagram illustrating a format of the short cell multiplexing.
Figure 19B:
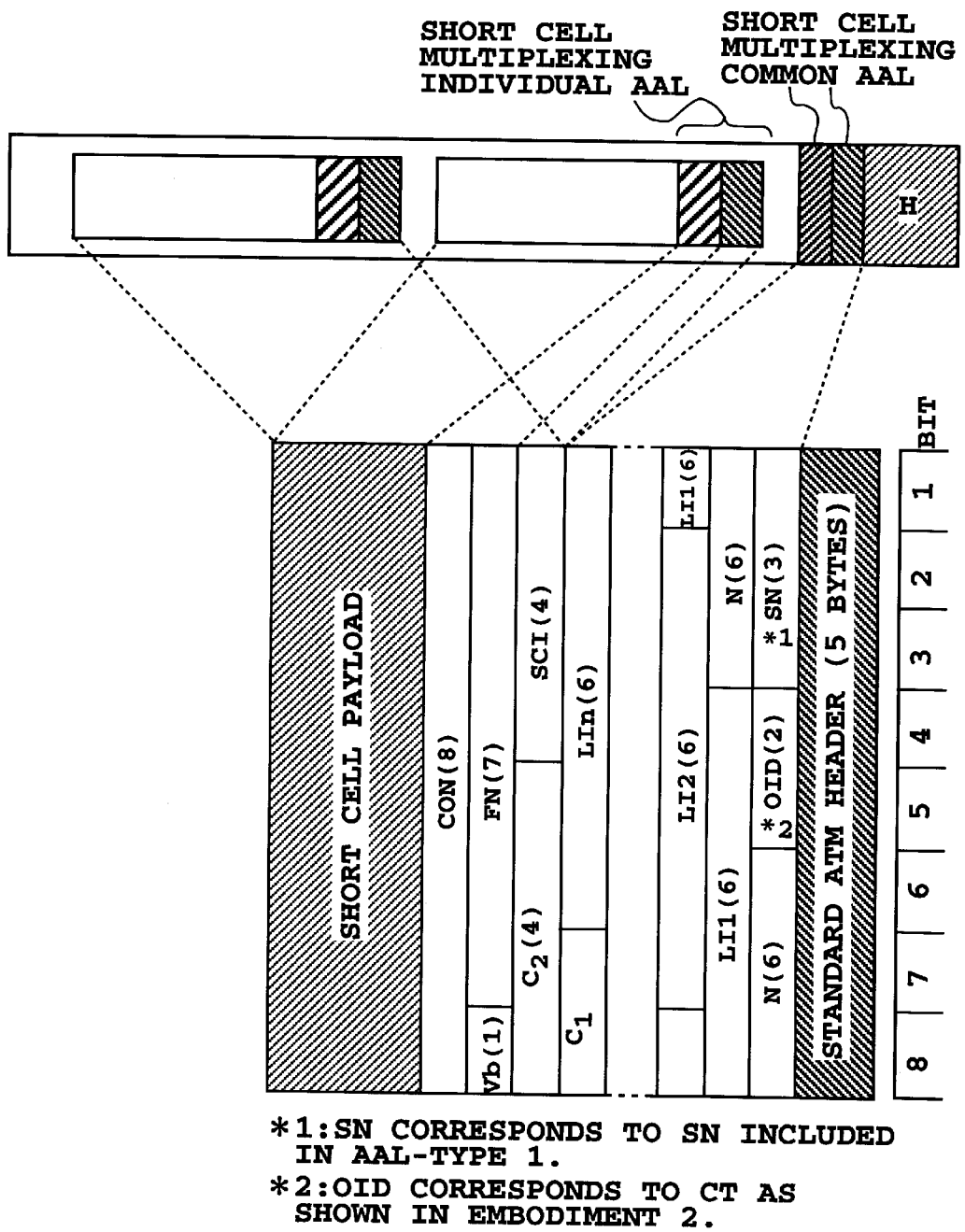
FIG. 19B is a diagram illustrating the format of the short cell multiplexing.

In FIG. 19 illustrating the foregoing relationships concretely, the symbols represent the following.

Short cell multiplexing common AAL
SN: Sequence Number
OID: Overlapping IDentifier (multiplexing information)
N: Number of short cells
LI1-LIn: Length Information
C: Check bit
Short cell multiplexing individual AAL
(SC-H)
  SCI: Short cell Connection Identifier
  PT: Payload Type
  C: Check bit
(SC-AAL)
  FN: Frame Number
  Vb: Voice activation bit
  CON: Confidentiality Information Taking the embodiment 3 described in connection with FIGS. 14–16, the AAL provided by the standard ATM cell generator 5 can be called the short cell multiplexing AAL information.

FIGS. 20A and 20B–22A and 22B illustrate this in connection with the short cell multiplexing processing. In these figures, "Layers" represent the processing layers, and the "Data Formats" represent the data formats generated by the multiplexing processing.

The "Application" in the "Layers" represents layers for carrying out input and output processings of the user data from various sources. SDU is the abbreviation for "Service Data Unit".

Next, CS refers to "Convergence Sublayer", a layer for completing the short cell. The CS is divided into two: SSCS (Service Specific CS) which carries out individual processings corresponding to the attributes of individual data constituting the short cells so as to provide or deprive the SC-AAL; and CPCS (Common Part CS) which provides the short cell connection identifier or the like (SC-H) for multiplexing the short cells to be transmitted, and deprives it from the SC-H by processing the SC-H. Here, PDU is the abbreviation for the "Protocol Data Unit".

Next to the short cell processings, a MAD (Multiplexed And Demultiplexed) layer for multiplexing the assembled short cells into the standard ATM cell. This layer is also divided into two: SSAR (Short cell Segmentation And Reassembly) for segmenting the short cells in accordance with the standard ATM cell or for reassembling the short cells from the standard ATM cell; and MAD (Multiplex And Demultiplex) for assembling or disassembling the standard ATM cell. The SSAR makes a division (segmentation) of the short cells as needed, so that they are adjusted to become 48 bytes when multiplexed in the MAD.

FIGS. 20A, 20B, 21A and 21B illustrate the case in which the length information is provided for each short cell as described in the embodiment 1 shown in FIGS. 4–6.

Figure 22B:
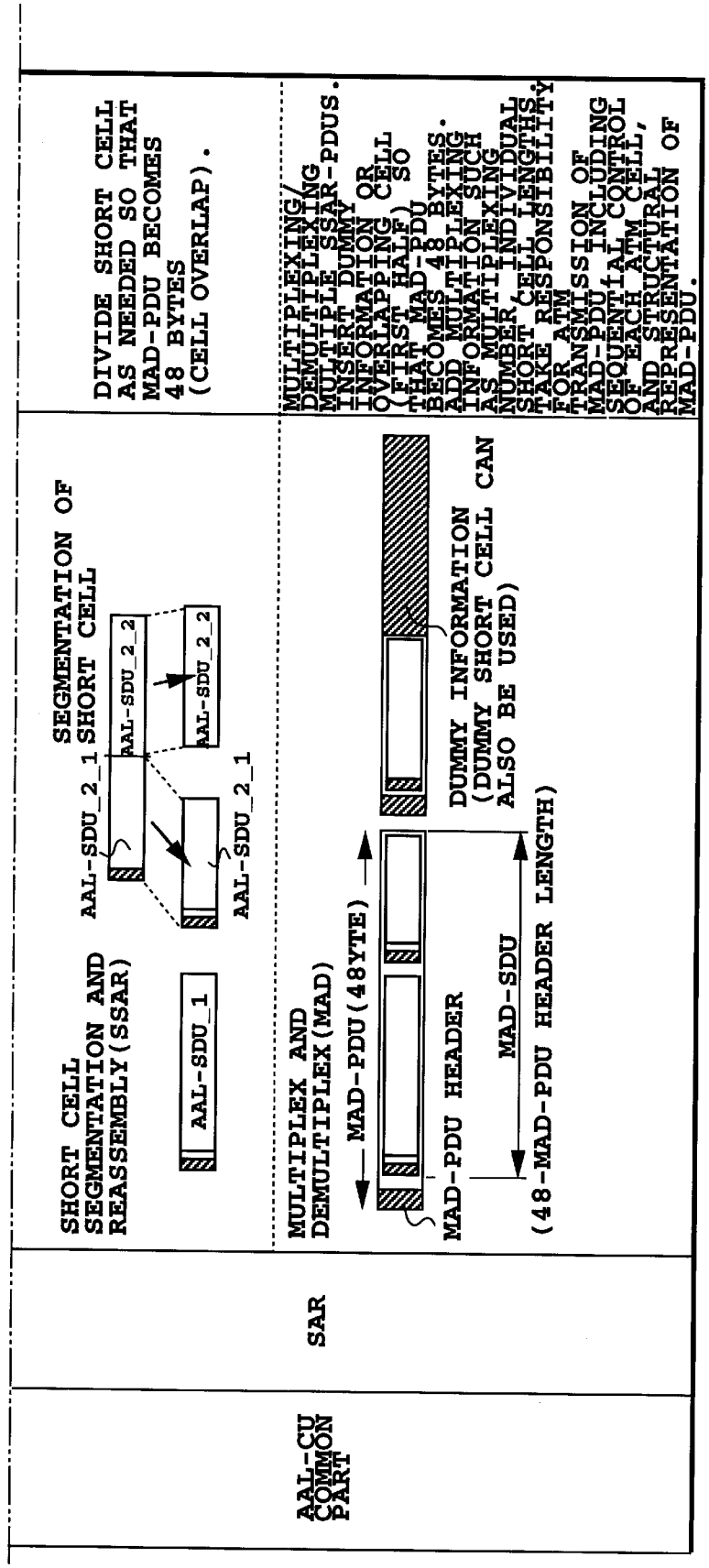
FIG. 22B is a diagram illustrating the short cell multiplexing processing.

FIGS. 22A and 22B illustrate the case in which a single piece of multiplexing information represents the short cells multiplexed into the standard ATM cell as described in the embodiment 2 shown in FIGS. 7–13.

Figure 20B:
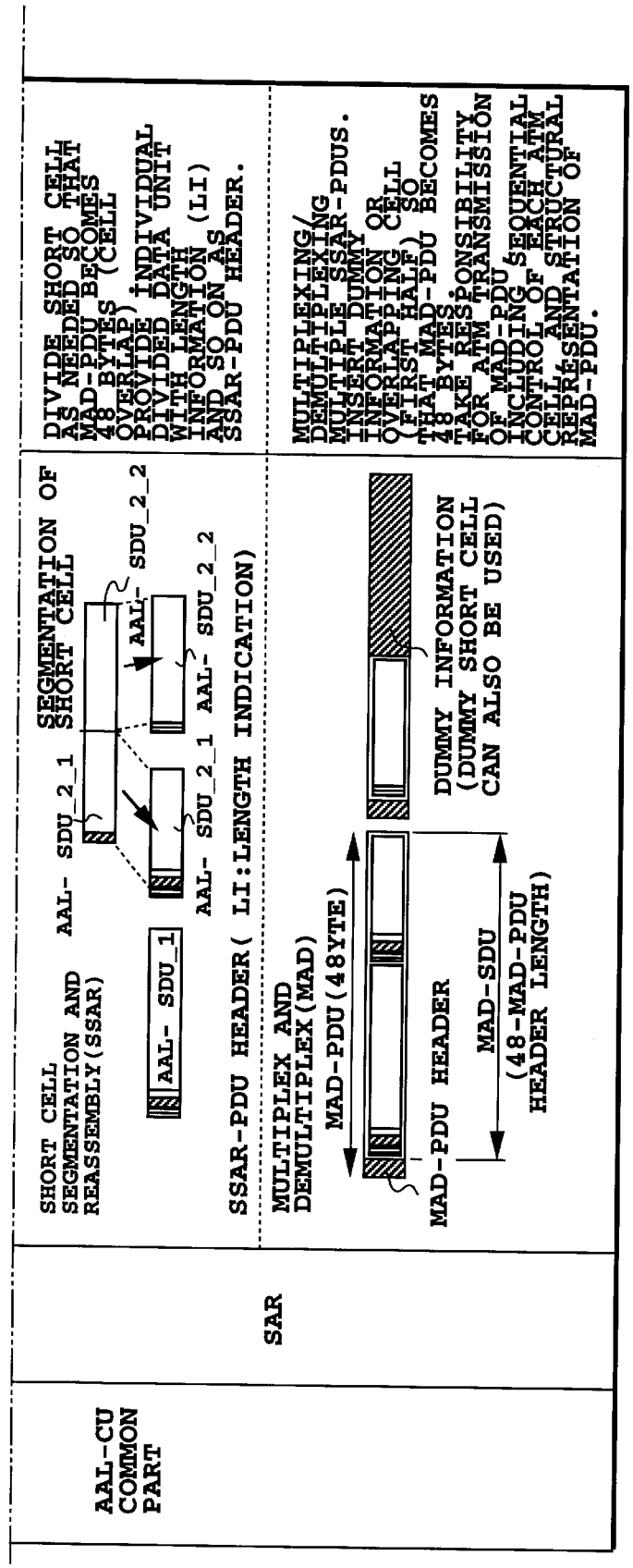
FIG. 20B is a diagram illustrating the short cell multiplexing processing.

Referring to FIGS. 20A and 20B, the process from the input of the user data to the assembly of the standard ATM cell will be described. The process from the input of the standard ATM cell to the disassembly of the user data is carried out reversely.

In FIGS. 20A and 20B, when various data with a variable length are input, individual processings corresponding to the attributes of individual data are carried out (SSCS). As the result of the individual processing, the SC-AAL is provided. Besides, the SC-H including the short cell connection identifier or the like (SC-H) is also provided (CPCS).

The SSAR segments the short cell (into short cell segments) as needed for multiplexing them onto the standard ATM cell (when the short cell is placed across the standard ATM cells), and provides the individual data units (SSAR-PDU) with the length information after the segmentation.

The MAD assembles the standard ATM cell by multiplexing the plurality of the SSAR-PDU. In addition, it inserts the null information or a dummy short cell into the remainder of the payload of the standard ATM cell. It further generates and provides the sequence number or overlapping information (MAD).

In this case, since the length information is provided for each SSAR-PDU after division, its indication never exceed 48 bytes.

Figure 21B:
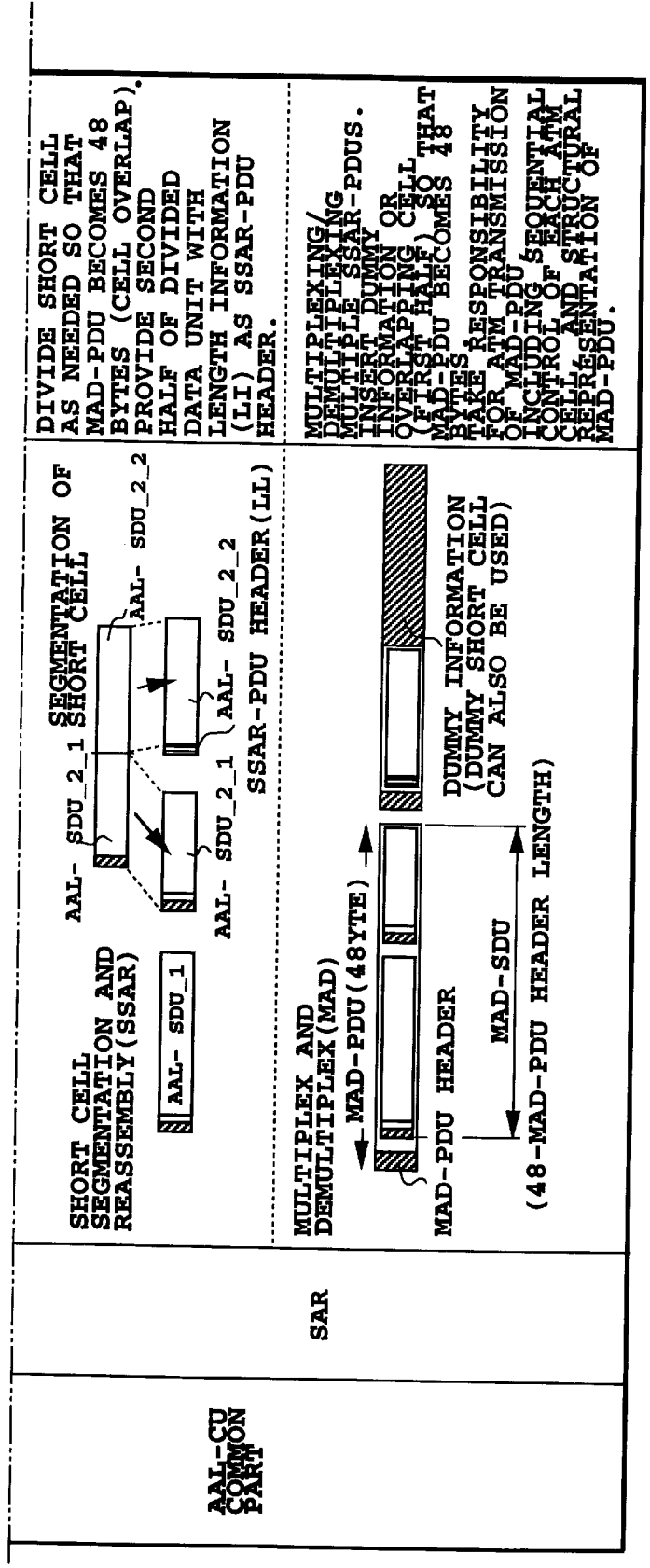
FIG. 21B is a diagram illustrating the short cell multiplexing processing.

FIGS. 21A and 21B differ from FIGS. 20A and 20B in a method for providing the length of the short cell. In FIGS. 20A and 20B, it is provided for each unit (SSAR-PDU) generated by dividing the short cells to multiplex them in accordance with the standard ATM cell (MAD layer). In contrast, in FIGS. 21A and 21B, the short cell length is provided for each short cell (CPCS), and if the short cell is divided for multiplexing it across the standard ATM cells, the divided second half is also provided with the length information (MAD).

In this case, since the length information is provided for each short cell, it can exceed 48 bytes.

In FIGS. 22A and 22B, to provide each standard ATM cell with the length information of the short cells, the number of the SSAR-PDUs multiplexed into the standard ATM cell and their individual length information and overlapping information are generated to be provided at the final stage of forming the standard ATM cell.

Considering the AAL of the standard ATM together with the information for the short cell multiplexing makes it possible to arrange the role assignment of the blocks of the system as shown in FIGS. 11–16 as in FIGS. 23–25.

The short cell information provider A (4A-2) in FIG. 4, together with the SC-AAL provider 3-3 and SC-H provider 3-4 shown in FIG. 2, handles the information for ATM adaptation of the short cell multiplexing, which provides the SC-AAL, SC-H and short cell information to be given to each short cell (see, FIGS. 23 and 24).

In FIG. 7, the multiplexing information generator B (4B-2) provides each multiplexed data with multiplexing information when multiplexing the short cells (FIG. 25)

The standard ATM cell generator 5 in FIGS. 1A and 1B common to all the embodiments handles the information for ATM adaptation of the short cell multiplexing, which is to be given to each ATM payload after multiplexing. It is easy to alter the structure so that the standard ATM cell generator 5 can freely provide, as the AAL information, not only information defined by the Type 1–Type 5 which are now subjected to standardization in ITU-T, but also the information for the ATM adaptation (such as the SN or OID) satisfying diverse requirements.

Considering the foregoing arrangement, the system portion for generating and providing the short cell multiplexing AAL can be made as follows from the viewpoints of effective allocation of the short cell multiplexing AAL and simplifying the system configuration.

EMBODIMENT 4-1

The application will now be described of the foregoing idea to the case where the short cell information is provided for each short cell as in the embodiment 1 shown in FIGS. 4–6. In this case, it is possible in FIG. 4 to replace the short cell status information (ST) provided by the short cell information provider A (4A-2) by the overlapping identifier (OID) provided for each ATM payload by the standard ATM cell generator 5.

Figure 26B:
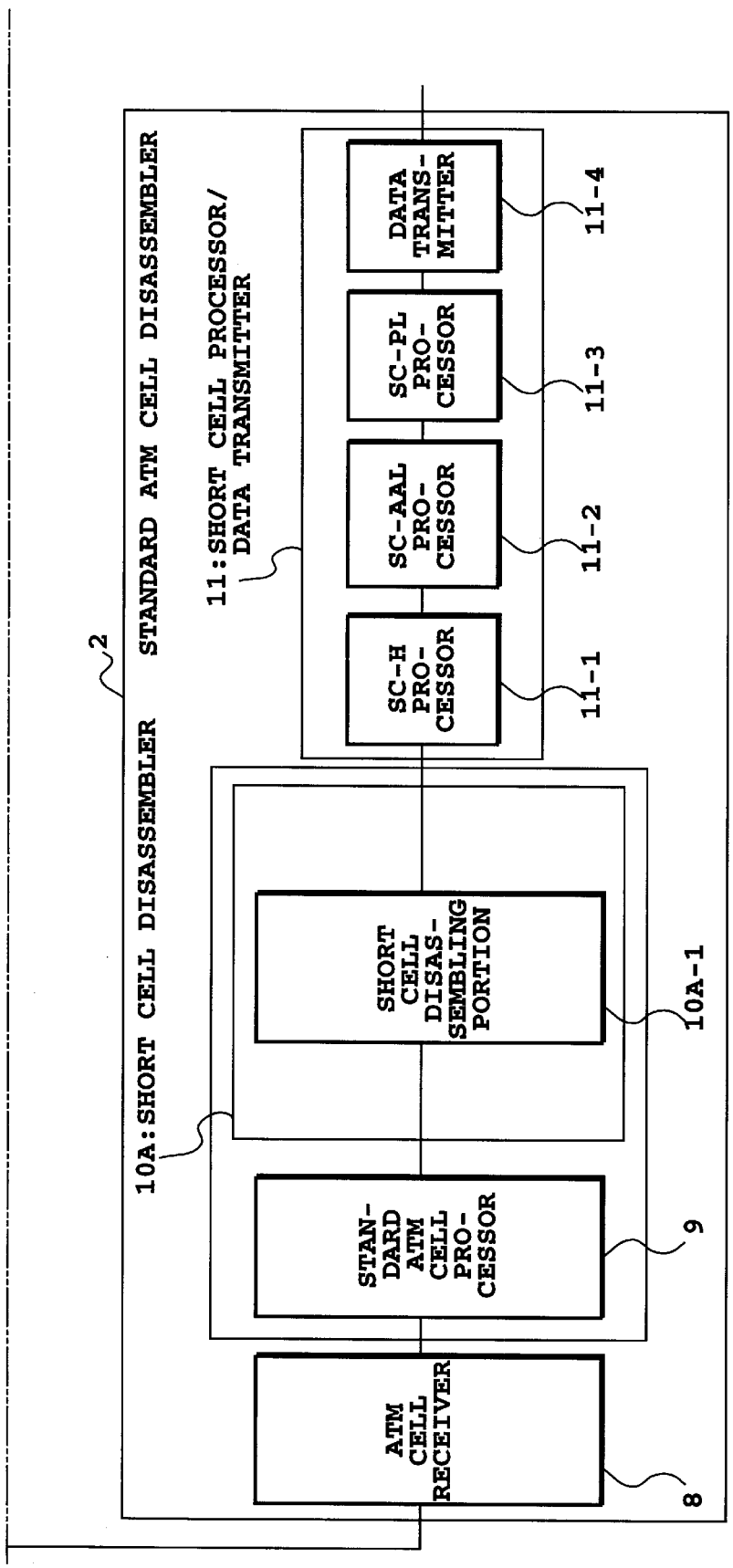
FIG. 26B is a block diagram illustrating the system configuration for implementing the short cell multiplexing processing.

This obviates the need for giving the short cell status information (ST) which is provided for each short cell. FIG. 18 shows an example of the information structure of the short cell multiplexing AAL using the OID instead of the short cell status information (ST), and FIGS. 26A and 26B show the system configuration for implementing this. The following description is made when the processings as shown in FIGS. 21A and 21B are carried out by the system assignment as shown in FIG. 24. The SC-H provider 3-4 provides each short cell with the short cell connection identifier (SCI), the short cell information provider A (4A-2) provides each short cell with the length information (LI) and the check bits (parity) (C2 and C3), and the standard ATM cell generator 5 provides each ATM payload with the ATM cell sequence number (SN), cell overlapping identifier (OID), and parity (Cl).

This is achieved by a simplified configuration formed by integrating the SC-H provider 3-4 and short cell information provider A (4A-2) as shown in FIG. 26A, and by providing each short cell with the information. In this arrangement, the multiplexing combination determiner A (4A-1) is placed after the short cell information provider A (4A-2). If the short cell is divided by the multiplexing combination determiner A (4A-1) because the ATM payload has only insufficient space, the separated second half is also provided with the length information, and is multiplexed by the short cell multiplexing portion A (4A-3).

Receiving the ATM cell having the information structure of the short cell multiplexing AAL, the standard ATM cell disassembler 2 disassembles the short cell in the following procedure, which will now be described with reference to FIGS. 26A and 26B. The standard ATM cell processor 9 obtains from the AAL the ATM cell sequence number (SN), cell overlapping identifier (OID) and parity (C), and checks the information error using the parity bits (C). Subsequently, it detects for each cell whether any cell loss occurs or not with the ATM cell sequence number (SN). The detection of the cell loss provides important decision information for extracting the overlapped short cell. The cell overlapping identifier (OID) has a similar function as that of the composite type information (CT) described in connection with the short cell disassembler B (10B) in FIG. 9. Therefore, the standard ATM cell processor 9 which processes the cell overlapping identifier (OID) cooperates with the short cell disassembling portion A (10A).

The description about the OID will be omitted here because it is the same as that about the CT in FIG. 9. Using the OID enables the cell loss to be detected as when using the CT, without using the sequence number (SN).

Figure 39:
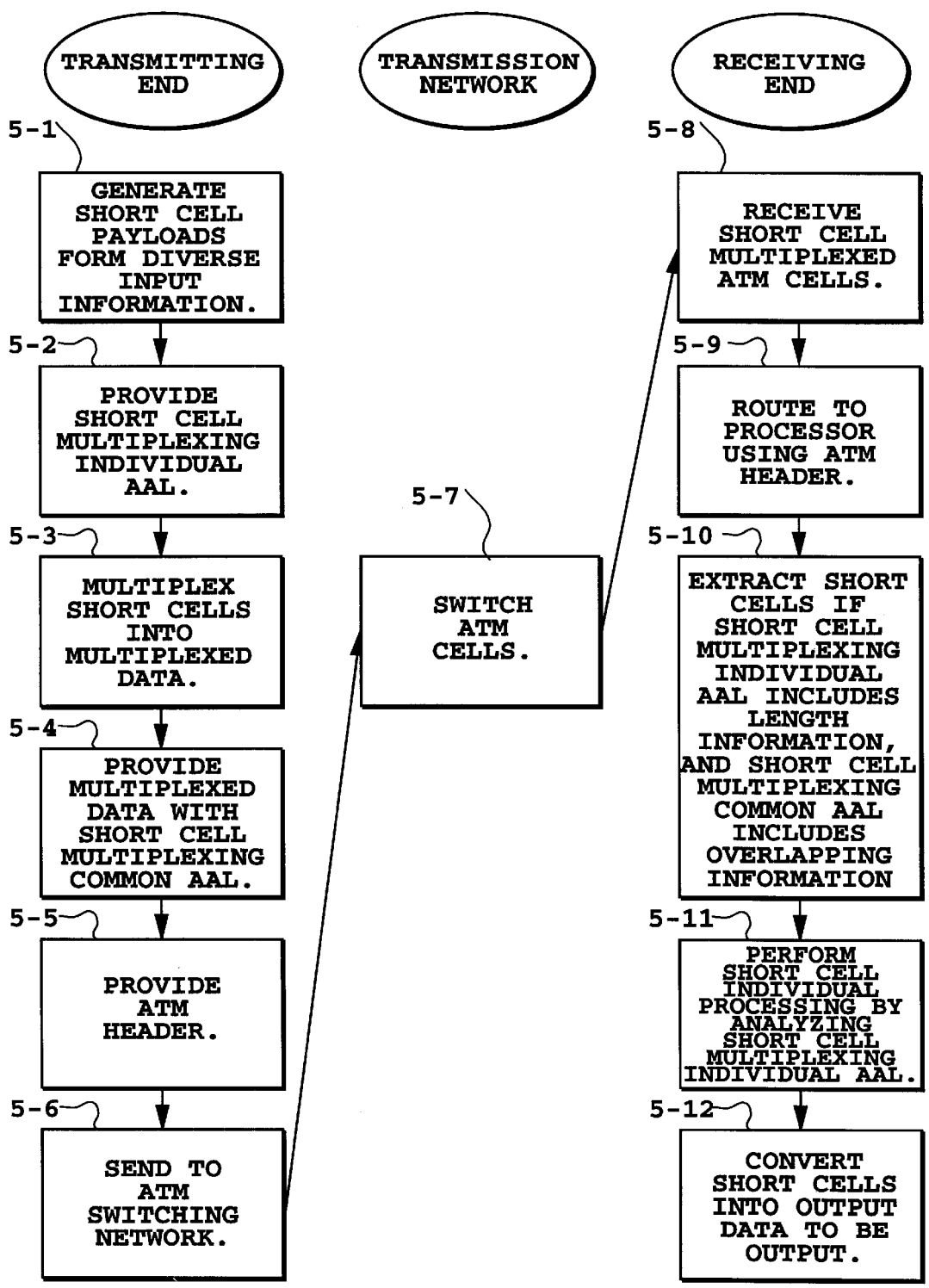
FIG. 39 is a flowchart illustrating a particular combination of the short cell multiplexing common AAL and the short cell multiplexing individual AAL in the short cell multiplexed ATM transmission method.

Next, the extraction of the short cells from the standard ATM payload can be achieved by the short cell disassembler A (10A) which looks into the LI of the short cell information provided for each short cell as in FIG. 6, and the extracted short cell are delivered to the short cell processor/data transmitter 11. In the embodiment 4-1, the length information and the overlapping information are included in the multiplexing individual AAL and the multiplexing common AAL, respectively, as shown in the flowcharts of FIGS. 35, 36 and 39.

EMBODIMENT 4-2

The application will now be described of the foregoing idea to the case where the multiplexing information is provided for each standard cell as in the embodiment 2 shown in FIGS. 7–13. In this case, as shown in FIG. 19, the short cell information is collected and placed as the multiplexing information of the standard AAL. The processing of FIG. 25 will now be described with reference to FIG. 24.

Figure 27B:
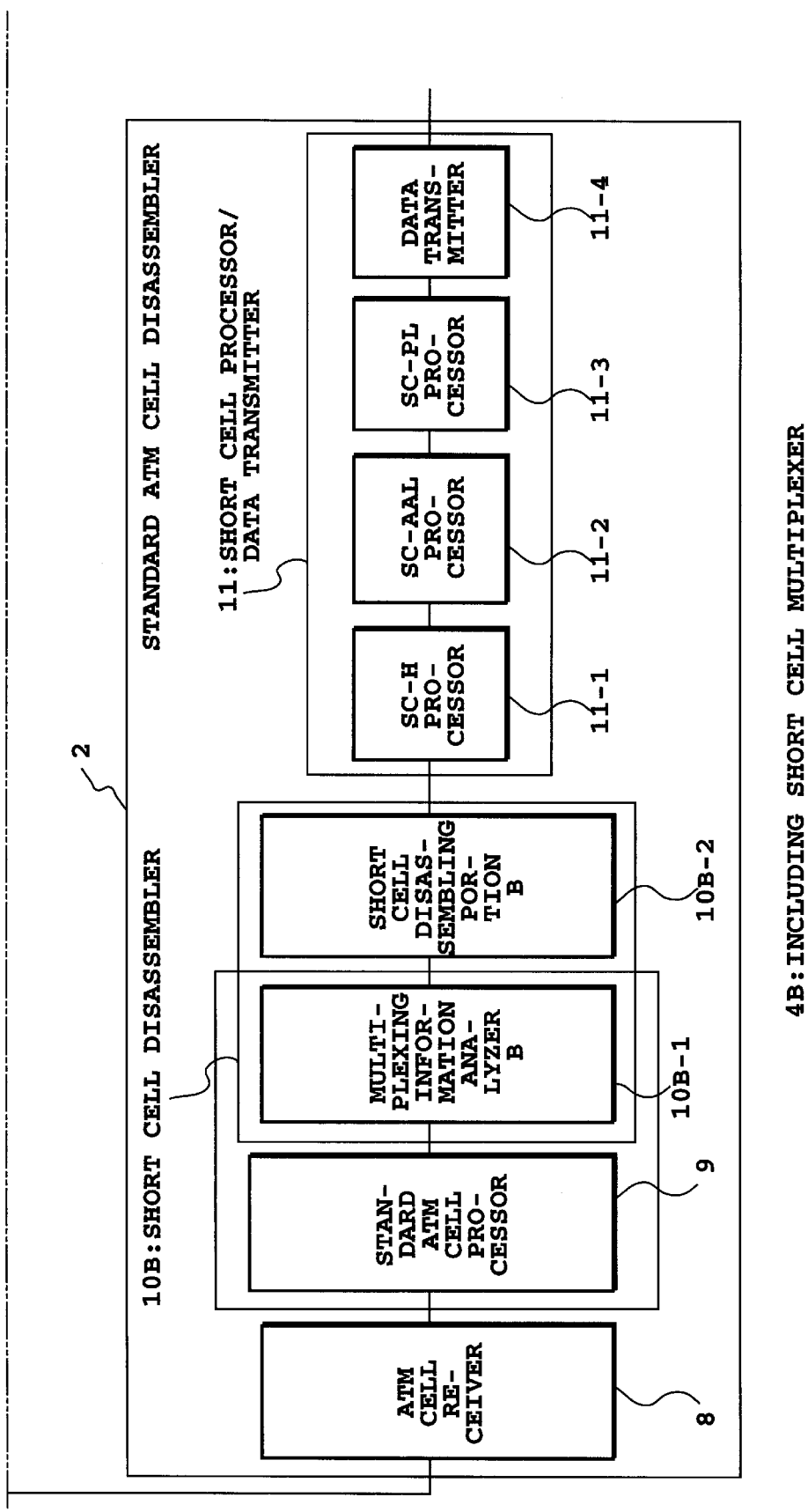
FIG. 27B is a block diagram illustrating the system configuration for implementing the short cell multiplexing processing.

As shown in FIGS. 27A and 27B, the multiplexing information generator B (4B-2) and the standard ATM cell generator 5 are integrated. The multiplexing information the multiplexing information generator B (4B-2) forms for each multiplexed data can be partially or entirely included into the AAL which is provided for each ATM payload by the standard ATM cell generator 5. In this case, the short cell length information of each short cell is prepared by the multiplexing information generator B (4B-2) after the multiplexing combination determiner B (4B-1) decides the combination of the short cells, and is provided for the multiplexed data by the short cell multiplexing portion B (4B-3).

In the course of this, the ATM sequence number (SN), cell overlapping identifier (OID) and parity (C1) are also provided for each ATM payload by the multiplexing information generator B (4B-2) or the standard ATM cell generator 5.

The disassembling procedure in the standard ATM cell disassembler 2 is basically the same as that of the foregoing embodiment 1. In this case, since the information for extracting the short cells is included in the multiplexing information or the standard AAL, the multiplexing information analyzer B (10B-1) and standard ATM cell processor 9 are integrated to extract the information.

Then, the short cell disassembling portion B (10B-2) disassembles the multiplexed data into the short cells, delivers them to the short cell processor/data transmitter 11.

EMBODIMENT 5

If there is some constraint on the short cell length handled by the CPCS, SSCS divides the user data into a plurality of data with a length within the allowed short cell length, and provides each divided data with such information that will enable them to be reassembled at the receiving end.

In the foregoing case, the SC-PL assembler and the SC-AAL provider in the data receiver/short cell assembler carry out the following processings.

The SC-PL assembler and the SC-AAL provider cooperate.

When there is constraint on the short cell payload length, the SC-PL assembler divides the user data of the input data obtained by the data receiving portion into a plurality of data with a length within the short cell payload length.

The SC-AAL provider carries out one of the following processings from (1) to (3) or a combination thereof.

(1) It provides a divided user data sequence number as the SC-AAL so as to detect the order or omission of the divided user data. Methods for providing it when dividing the user data into three parts, for example, are: a) providing individual divided user data with 1, 2 and 3; b) providing them with 1/3, 2/3 and 3/3; and c) providing with 1, 2, 3, 4, . . . , N in the arriving order of the divided user data at a certain interval without considering the individual user data.

This processing (1) can be omitted if the divided user data can be controlled to arrive at the short cell processor/data transmitter at regular time intervals by controlling the short cell multiplexer and ATM cell transmitter or the like.

(2) It provides the final divided user data or the initial divided user data with d) final identifier or e) initial identifier, as the SC-AAL.

As the final identifier, identification bits indicating that the divided user data is the last one are given. The number of division can be added.

As the initial identifier, identification bits indicating that the divided user data is the first one is given. The number of division can also be added.

3) It provides the error detecting/correcting information for f) the final divided user data or g) the initial divided user data. The error detecting/correcting information has been computed with the whole user data before division.

The type of the SC-AAL information (SC-AAL type) which is set here is notified when the short cell header is determined by the SC-H provider 3-4 or the SC-H processor 11-1 in the standard ATM cell disassembler 2, thus to be related to the processings in the SC-AAL processor 11-2.

The SC-AAL processor and SC-PL processor in the short cell processor/data transmitter carry out the following processings in correspondence to the processings of the foregoing SC-PL assembler and the SC-AAL provider.

The SC-AAL processor and the SC-PL processor cooperate.

The SC-PL processor reassembles the divided user data by the SC-PL assembler to recover the original user data. For this purpose, the SC-AAL processor analyze the information provided by the SC-AAL provider.

The processing of the SC-AAL processor is decided by the SC-H processor (11-1) which searches for the correspondence of the SC-AAL from the short cell header using the address translation table 2.

The SC-AAL processor carries out one of the following processings (1)–(3) or a combination thereof, in correspondence to the processings in the SC-AAL provider.

(1) The SC-AAL processor reads the SC-AAL information, and confirms from the divided user data sequence number the validity of the order and the presence or absence of the omission of the divided user data, and thus the arrival of the entire divided user data. With regard to a), returning of the sequence number to one ensures that the divided user data up to that time are the divided units. With regard to b), the sequence number includes the number of divisions. With regard to c), since the division units cannot be recognized, the following (2) or (3) are used together.

(2) The SC-AAL processor reads the SC-AAL information, and with regard to d), it decides the final divided unit from the final identifier, and identifies that the final one together with the divided data stored up to that time constitutes the whole divided user data. If the divided number information is added, confirmation is made whether the number information agrees with the total number of the divided user data. With regard to e), the SC-AAL processor decides from the initial identifier that the data is the initial divided unit, and identifies that the divided user data stored up to that time constitute the whole divided user data. If the divided number information is added to the initial identifier, the entire user data can be obtained by counting the number of received divided user data up to the divided number.

(3) The SC-AAL processor reads the SC-AAL information, and with regard to f), it carries out the error detecting/correcting computation sequentially for the divided user data which have been received and stored, and decides the final divided user data when the computed value coincides with the error detecting/correcting information that would be placed in a specific position of the received divided user data. With regard to g), it stores the error detecting/correcting information placed in a specific position of the initial divided user data, carries out the error detecting/correcting computation for the divided user data received sequentially, and decides the final divided user data when the computed value coincides with the stored value.

Using the error detecting/correcting computation information in common to f) and g) makes it possible to confirm the validity of the entire user data, and to correct the error data.

The SC-PL processor recovers the original user data by combining the entire divided user data decided by the SC-AAL processor.

EMBODIMENT 6

One of the methods for identifying the length of the variable short cell in the present invention is to use the short cell status information ST and the short cell length information LI which are provided for each short cell as described in the embodiment 1 in connection with FIG. 5. In the embodiment 2, the length is identified using the multiplexed cell number information, short cell length LI and the composite type information as shown in FIGS. 12 and 13, and they are collectively provided for each standard ATM cell as the multiplexing information.

Summarizing the methods for representing the short cell length, they can be roughly divided into three.

In the following description, the length "before division" refers to the length of the short cell in its entirety before division in the case where the short cell is divided into two or more parts to be loaded on a plurality of ATM cells because of the cell overlapping. On the other hand, the length "after division" refers to the length of the short cell after division in the case where the short cell is divided into two or more parts to be loaded on a plurality of ATM cells because of the cell overlap.

It corresponds to the length "before division" when there is no cell overlap.

Method 1: A method which represents the length of the short cells before the division for the cell overlap independently of the standard ATM cells, into which the short cells are multiplexed (see, FIGS. 21A and 21B and FIGS. 22A and 22B).

This method corresponds to the providing method described in connection with FIGS. 21A and 21B. In FIGS. 21A and 21B, the length information is also provided for the latter half after division which overlaps to the next standard ATM cell. However, it is also possible not to provided it with the length information. In this case, the length of the successive short cell can be calculated, after completing processing of the standard ATM cell, by detecting the length of the remainder of the incomplete short cell with a predetermined length, thereby recognizing that the short cell is divided. In this case the ST or CT (represented as OID above) can be omitted. A similar method can be applied to FIGS. 22A and 22B.

Method 2: A method which represents the length of respective short cells after division which are multiplexed within the 48-byte payload of the standard ATM cell by means of the ST or CT (which is also denoted as OID above) (see, FIGS. 20A and 20B and FIGS. 22A and 22B).

For example, with a short cell of 100 bytes, the LI does not indicate 100 bytes, but the LI of the first standard ATM cell indicates LI=47 (due to the multiplexing information length and the standard AAL length), that of the second standard ATM cell indicates LI=47, and that of the third standard ATM cell indicates LI=6.

Method 3: A method which identifies the short cell length from the patterns when the short cell length has some patterns.

In FIG. 10, the PI bits are provided for identifying the patterns of the short cells multiplexed into the standard ATM cell. The method 3 represents the short cell length using such patterns. In connection with this, the length information LI provided for each short cell as shown in FIGS. 18, 19 and others can also be used as a method for indicating the patterns of the short cell length.

This method can shorten the length information if the short cell length is discrete and its number is limited even though it is variable. For example, if there are five types of short cells with the length of 5 bytes, 10 bytes, 15 bytes, 20 bytes and 25 bytes, 3-bit LI is sufficient for identifying them by relating the 5 bytes to a first, the 10 bytes to a second, . . . etc. because eight patterns can be identified by the 3-bit LI. Accordingly, the LI can be made shorter than when it represents the actual length of the short cell in the binary notation.

Thus, the LI can be represented with the patterns of the short cell length. This method is applicable only when the transmitting end and the receiving end know the patterns of the short cell length in advance.

EMBODIMENT 7

The concrete structure of the short cell AAL will be described with reference to FIGS. 18 and 19. Structure 1 of the short cell AAL.

The short cell AAL can be provided with the attributes or processing information associated with the payload.

If the processing information associated with the payload is placed in the short cell AAL, the short cell AAL processor can decide the attributes or necessary processing of the payload without reading and analyzing the payload. As a result, fast and accurate processing of the payload is possible. If the processing information is placed in the payload, it is necessary to make a decision by analyzing the information after obtaining the payload by disassembling.

To explain more specifically, the diversity combining handover processing will be described when the CDMA is employed as a radio system in the mobile communications. In this case, it is necessary for the handover trunk in a switching office to select and combine higher quality information from incoming information packets (corresponding to the short cells of the present invention) sent from a plurality of base stations by comparing the reliability information added to each packet.

A frame number FN and reliability information CON as shown in the short cell AAL in FIG. 18 can be used for the selecting and combining control in the handover trunk. The frame number FN can be used to identify the information packets of the incoming information sent from the base stations. The reliability information CON is generated by the base stations depending on the quality of the radio packets (which is decided from the receiving level, CRC check or the like). The information is placed into the short cell AAL.

The short cell AAL processor in the handover trunk can decide the quality of the information using the frame number FN and the reliability information CON in the short cell AAL. Thus, the fast and accurate processing of the payload becomes possible without reading and analyzing the payload. Structure 2 of the short cell AAL.

In the voice communications, the mute compression of the voice data can be carried out (a technique for compressing/removing the voice transmitted data in mute sections in the voice information during conversation). In this case, speech spurt/mute information about the voice is needed for deciding switching positions of the speech spurt/mute, thereby switching the voice data processings.

This information can be provided in the short cell AAL as the Vb (Voice activation bit) as illustrated in the short cell AAL of FIG. 18. The speech spurt/mute can be decided using the Vb.

For example, a voice data processor (CODEC) can make a fast decision of the switching of the speech spurt/mute by looking up the Vb in the short cell AAL without reading and analyzing the payload, thereby handling the payload accurately.

EMBODIMENT 8

The short cell (of a variable length) input to the standard ATM cell assembler 1 as shown in FIGS. 1A and 1B can accommodate multiplexed sub-short cells in its payload, and wait for them.

Figure 29:
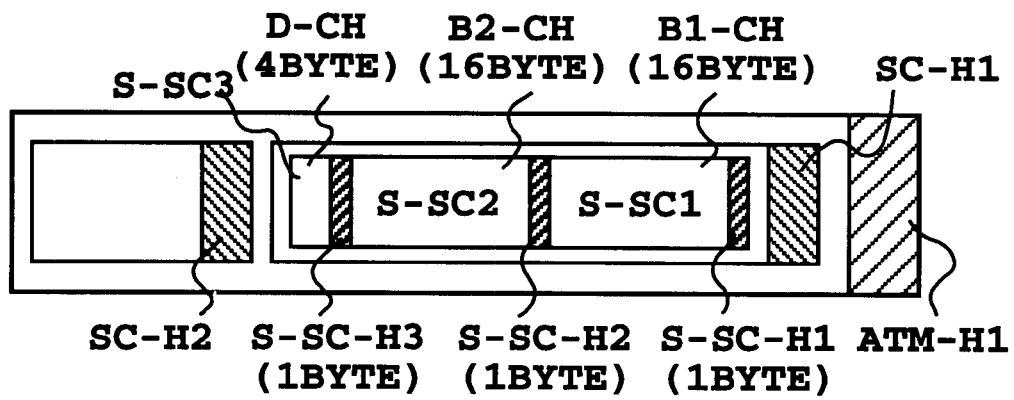
FIG. 29 is a diagram illustrating a double-layer short cell multiplexing.

As a method for multiplexing such sub-short cells into the short cell, the method for multiplexing the plurality of short cells into the ATM cell as described above can be applied. A system configuration for the sub-short cell multiplexing is shown in FIG. 29.

Figure 28B:
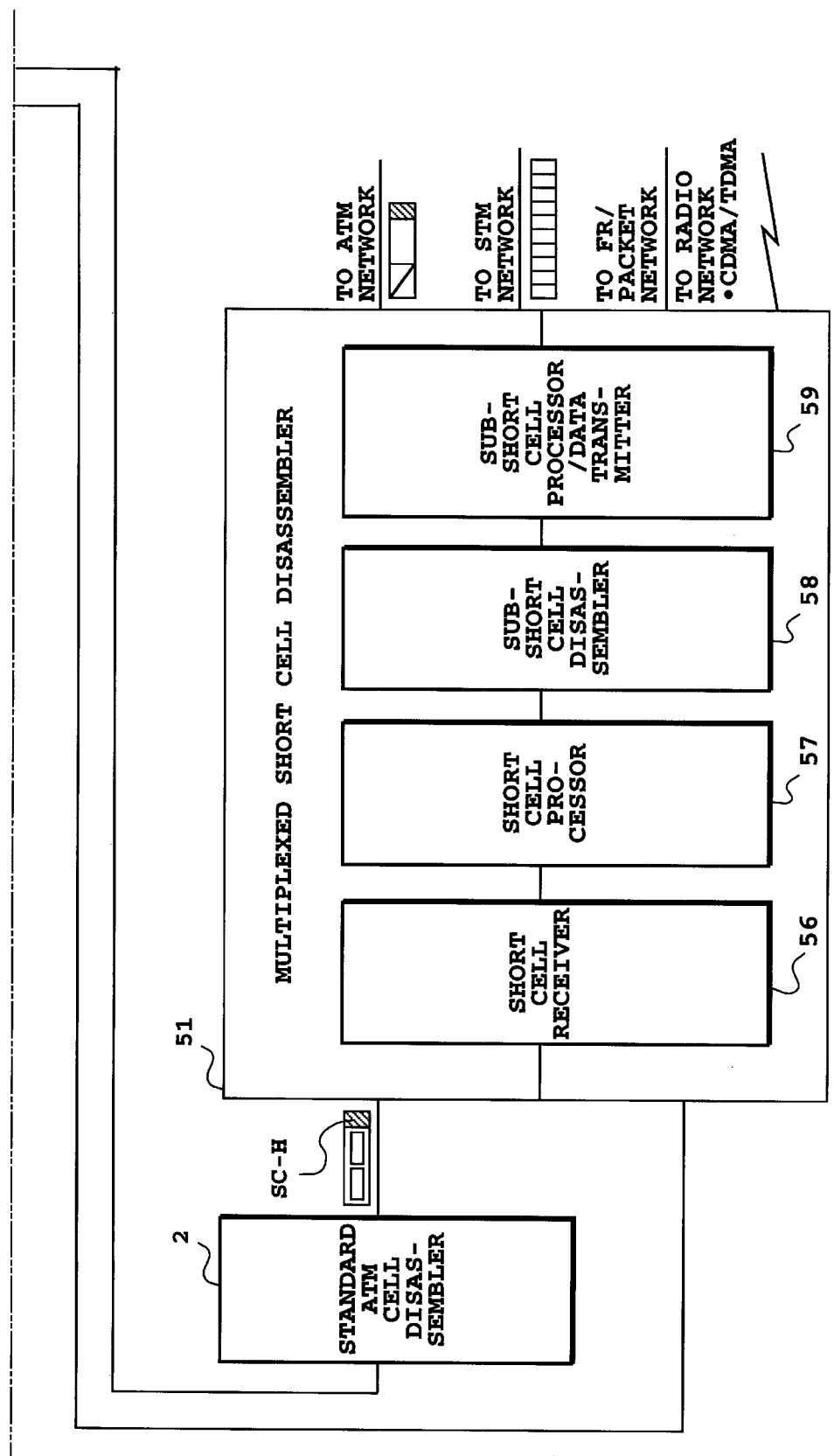
FIG. 28B is a block diagram illustrating the system configuration for implementing the sub-short cell multiplexing.

In FIGS. 28A and 28B, a data receiver/sub-short cell assembler 52 receives diverse input information and forms the sub-short cells. The detailed configuration and operation of the data receiver/sub-short cell assembler 52 are the same as those of the data receiver/short cell assembler 3 as shown in FIGS. 1A and 1B.

A sub-short cell multiplexer 53 has a function of multiplexing the sub-short cells into the payload of one or more short cells. The detailed configuration and operation of the sub-short cell multiplexer 53 are the same as those of the short cell multiplexer 4 as shown in FIGS. 1A and 1B.

A short cell generator 54 has a function for generating the short cell by receiving the multiplexed data as the payload of the short cell, and by adding the short cell AAL and short cell header. The detailed configuration and operation of the short cell generator 54 are the same as those of the standard ATM cell generator 5 as shown in FIGS. 1A and 1B.

A short cell transmitter 55 has a function of outputting the generated short cell to a short cell transmission network 60, the standard ATM cell assembler 1, and so on. The detailed configuration and operation of the short cell transmitter 55 are the same as those of the ATM cell transmitter 6 as shown in FIGS. 1A and 1B.

As described above, the blocks in a multiplex short cell assembler 50 as shown in FIGS. 28A and 28B are basically the same as those of the standard ATM cell assembler 1 as shown in FIGS. 1A and 1B. However, although the assembled standard ATM cells have a fixed length in FIGS. 1A and 1B because the short cells are multiplexed into the standard ATM cells, the short cells assembled by the multiplexed short cell assembler 50 as shown in FIG. 28 can be either a fixed or variable length.

If the short cell assembled by the multiplexed short cell assembler 50 as shown in FIGS. 28A and 28B has a fixed length, it is also necessary in FIGS. 28A and 28B to carry out the overlapping control to the next cell, or the null information addition control (partial fill) which is required because the standard ATM cell has a fixed 48-byte length.

If the short cell assembled by the multiplexed short cell assembler 50 as shown in FIGS. 28A and 28B has a variable length, the length obtained by multiplexing the sub-short cells can be made the payload length of the short cell, or the overlapping control can be performed to the next short cell of a suitable length. The variable length short cell, however, must be provided with additional information so that the receiving portion can decide its length.

The short cell thus assembled which includes the multiplexed sub-short cells is delivered to a short cell receiver 56 through the short cell transmission network 60 and a standard ATM cell disassembler 2. The short cell receiver 56 has a function of receiving from the short cell transmission network 60 and standard ATM cell disassembler 2. The detailed configuration and operation of the short cell receiver 56 are the same as those of the ATM cell receiver 8 as shown in FIGS. 1A and 1B.

A short cell processor 57 has a function of obtaining the payload by disassembling and processing the received short cell. The detailed configuration and operation of the short cell processor 57 are the same as those of the standard ATM cell processor 9 as shown in FIGS. 1A and 1B.

A sub-short cell disassembler 58 has a function of disassembling the obtained payload into sub-short cells. The detailed configuration and operation of the sub-short cell disassembler 58 are the same as those of the short cell disassembler 10 as shown in FIGS. 1A and 1B.

A sub-short cell processor/data transmitter 59 carries out specific processing for each sub-short cell, thereby achieving conversion and output in accordance with the diverse data formats of output channels. The detailed configuration and operation thereof are the same as those of the short cell processor/data transmitter 11.

As described above, the blocks in a multiplex short cell disassembler 51 are basically the same as those of the standard ATM cell disassembler 2. The incoming short cells can be either a fixed or variable length.

If the short cell has a fixed length, it is also necessary to carry out the overlapping control to the next cell, or the null information addition control (partial fill) which is required because the standard ATM cell has a fixed 48-byte length.

If the short cell has a variable length, the short cell length is decided from the information added to the short cell for determining its length by the multiplexed short cell assembler 50 so as to process the short cell.

The payload of the sub-short cell can be provided with further multiplexed sub-short cells. Thus, it is possible to implement multilayer short cell multiplexing in the ATM cell.

As a concrete example of a double layer short cell multiplexing, multiplexing will now be described of respective channels (B1-CH, B2-CH and D-CH) of the 2B+D ISDN into the short cell, as the sub-short cells.

FIG. 29 illustrates the multiplexing in which the data of the three channels of the ISDN are segmented into sub-short cells at every 2 ms time frame interval to be multiplexed into short cells which in turn are multiplexed into the ATM cell.

In FIG. 29, the data on channels B1-CH, B2-CH and D-CH are each segmented into sub-short cells at 2 ms intervals, multiplexed in that order, and provided with short cell headers. The sub-short cell multiplexer 53 in FIGS. 28A and 28B carries out similar processing as that of short cell multiplexer C (4C) in FIG. 14.

The provision of the sub-short cell header by the data receiver/sub-short cell assembler 52 can be omitted if the combination and multiplexing structure of the sub-short cells to be multiplexed into the short cell are fixed.

The data length of the short cells can exceed 48 bytes which are input to the ATM cell supplied to the data receiver/short cell assembler 3 of the standard ATM cell assembler 1 shown in FIGS. 1A and 1B. In addition, it is possible to input thereto the standard ATM cells including various types of payloads which can be transmitted by the standard ATM cells, or the ATM cells employing the Type 1–Types 5 AAL.

Likewise, the data length of the short cells can exceed 48 bytes which are output in the form of the ATM cell from the short cell processor/data transmitter 11 of the standard ATM cell disassembler 2 shown in FIGS. 1A and 1B. In addition, it is possible to output not only the partial fill ATM cells, but also the standard ATM cells including various types of payloads which can be transmitted by the standard ATM cells, or the ATM cells employing the Type 1–Types 5 AAL. For example, in the standard ATM cell, the Type 5 can transmit up to 64 Kbyte variable length data. Although the short cell multiplexer in the embodiments 1 and 2 carries out the overlapping control to enable the standard ATM cell generator to employ the adaptation for implementing the fixed bit rate communication such as Type 1, the overlapping control can be omitted if the standard ATM cell generator employs the adaptation for implementing the variable bit rate communication like Type 5, and the variable length multiplexed data can be delivered to the standard ATM cell generator.

According to the present invention, low bit rate data, which are received from the ATM network (partial or private short cell), STM network, radio, packet network, or FR (frame relay) network, can be transmitted by ATM with a minimum delay time, and high payload efficiency.

What is claimed is:

1. An ATM cell assembler comprising:
    a data receiver/short cell assembler (3) for receiving various types of input information, and for forming short cells for each type of the information;
    a short cell multiplexer (4) for multiplexing short cells as one or more payloads of one or more ATM cells;
    an ATM cell generator (5) for receiving the multiplexed short cells as the payloads, and for forming the ATFM cells by adding AAL data and headers; and
    an ATM cell transmitter (6) for outputting said ATM cells to an ATM switching network,
    wherein the short cell multiplexer (4) comprises:
        a multiplexing combination determiner A (4A-1) for deciding a combination of multiplexing parties of a plurality of input short cells with free lengths;
        a short cell information provider A (4A-2) for putting before each short cell, short cell information including length information of the short cell; and
        a short cell multiplexing portion A (4A-3) for linking the short cells before which the short cell information has been put in accordance with a decision of said multiplexing combination determiner A (4A-1), the short cell multiplexer (4) multiplexes short cells such that between short cell information and a short cell corresponding to the short cell information, there are no other short cells.

2. The ATM cell assembler as claimed in claim 1, wherein said multiplexing combination determiner A (4A-1) decides a combination of multiplexing parties such that short cells with the same attribute among a plurality of input short cells with free lengths are combined.

3. The ATM cell assembler as claimed in claim 1, wherein said multiplexing combination determiner A (4A-1) decides a combination of multiplexing parties of a plurality of input short cells with free lengths in accordance with the lengths of the short cells.

4. Ant ATM cell assembler comprising:
   a data receiver/short cell assembler (3) for receiving various types of input information, and for forming short cells for each type of the information;
   a short cell multiplexer (4) for multiplexing short cells as one or more payloads of one or more ATM cells;
   an ATM cell generator (5) for receiving the multiplexed short cells as the payloads, and for forming ATM cells by adding AAL data and headers; and
   an ATM cell transmitter (6) for outputting said ATM cells to an ATM switching network,
   wherein the short cell multiplexer (4) comprises:
      a multiplexing combination determiner B (4B-1) for deciding a combination of multiplexing parties of a plurality of input short cells with free lengths;
      a multiplexing information generator B (4B-2) for generating multiplexing information including information on lengths and a number of short cells to be multiplexed; and
      a short cell multiplexing portion B (4B-3) for linking the short cells and the multiplexing information in accordance with a decision of said multiplexing combination determiner B (4B-1).

5. The ATM cell assembler (1) as claimed in claim 4, wherein said multiplexing combination determiner B (4B-1) decides a combination of multiplexing parties such that short cells with the same attribute among a plurality of input short cells with free lengths are combined.

6. The ATM cell assembler (1) as claimed in claim 4, wherein said multiplexing combination determiner B (4B-1) decides a combination of multiplexing parties of a plurality of input short cells with free lengths in accordance with the lengths of the short cells.

7. The ATM cell assembler (1) as claimed in claim 4, wherein said multiplexing information includes a multiplex pattern identifier (PI) representing a multiplexed data structure to make correspondence between the multiplex pattern identifier and the multiplexed data structure, and wherein said short cell multiplexer (4) provides multiplexing information corresponding to a multiplexed data structure.

8. The ATM cell assembler (1) as claimed in claim 4, wherein said multiplexing information includes:
   multiplexed cell number information (N) indicating a number of identical length short cells multiplexed onto a payload of an ATM cell; and
   short cell length information (L) indicating a length of multiplexed short cells, and
   wherein said short cell multiplexer (4) provides multiplexing information corresponding to a multiplexed data structure.

9. The ATM cell assembler (1) as claimed in claim 4, wherein said multiplexing information includes:
   multiplexed cell number information (N) indicating a number of short cells multiplexed onto a payload of an ATM cell, and short cell length information (LI1-LIN) indicating a length of each of the multiplexed short cells, and
   wherein said short cell multiplexer (4) provides multiplexing information corresponding to a multiplexed data structure.

10. An ATM cell assembler comprising:
    a data receiver/short cell assembler (3) for receiving various types of input information, and for forming short cells for each type of the information;
    a short cell multiplexer (4) for multiplexing short cells as one or more payloads of one or more ATM cells;
    an ATM cell generator (5) for receiving the multiplexed short cells as the payloads, and for forming the ATM cells by adding AAL data and headers; and
    an ATM cell transmitter (6) for outputting said ATM cells to an ATM switching network,
    wherein the short cell multiplexer (4) comprises:
       a multiplexing combination determiner C (4C-1) for deciding a combination of multiplexing parties of a plurality of input short cells with free lengths;
       a short cell multiplexing portion C (4C-2) for linking the short cells in accordance with a decision of said multiplexing combination determiner C (4C-1); and
       means for transmitting a multiplexed data structure of the short cells separately from an ATM cell onto which the short cells have been multiplexed to an ATM cell disassembler.

11. An ATM cell assembler comprising:
    a data receiver/short cell assembler (3) for receiving various types of input information, and for forming short cells for each type of the information;
    a short cell multiplexer (4) for multiplexing short cells as one or more payloads of one or more ATM cells;
    an ATM cell generator (5) for receiving the multiplexed short cells as the payloads, and for forming the ATM cells by adding AAL data and headers; and
    an ATM cell transmitter (6) for outputting said ATM cells to an ATM switching network,
    wherein the short cell multiplexer (4) comprises:
       a multiplexing combination determiner C (4C-1) for deciding a combination of multiplexing parties of a plurality of input short cells with free lengths such that short cells with the same attribute among the plurality of input short cells are combined; and
       a short cell multiplexing portion C (4C-2) for linking the short cells in accordance with a decision of said multiplexing combination determiner C (4C-1).

12. An ATM cell assembler comprising:
    a data receiver/short cell assembler (3) for receiving various types of input information, and for forming short cells for each type of the information;
    a short cell multiplexer (4) for multiplexing short cells as one or more payloads of one or more ATM cells;
    an ATM cell generator (5) for receiving the multiplexed short cells as the ATM payloads, and for forming ATM cells by adding AAL data and headers; and
    an ATM cell transmitter (6) for outputting said ATM cells to an ATM switching network,
    wherein the short cell multiplexer (4) comprises:

a multiplexing combination determiner C (4C-1) for deciding a combination of multiplexing parties of a plurality of input short cells with free lengths in accordance with the lengths of the short cells; and a short cell multiplexing portion C (4C-2) for linking the short cells in accordance with a decision of said multiplexing combination determiner C (4C-1).

13. An ATM cell disassembler comprising:

an ATM cell receiver (8) for receiving ATM cells sent from an ATM switching network (7);

an ATM cell processor (9) for obtaining payloads by carrying out disassembly/processing of the received ATM cells;

a short cell disassembler (10) for disassembling obtained payloads into short cells; and a short cell processor/data transmitter (11) for carrying out a predetermined processing of each of the short cells to convert them into various types of output information, and for outputting the output information to respective channels, wherein said payloads include short cells and short cell information, and before each short cell, short cell information including length information of the short cell is put, in said payloads, between short cell information and a short cell corresponding to the short cell information, there are no other short cells, and said short cell disassembler (10) extracts short cell information, sequentially beginning from an initial position of each of said payloads, and disassembles said payloads into short cells by analyzing the short cell information.

14. An ATM cell disassembler comprising:

an ATM cell receiver (8) for receiving ATM cells sent from an ATM switching network (7);

an ATM cell processor (9) for obtaining payloads by carrying out disassembly/processing of the received ATM cells;

a short cell disassembler (10) for disassembling obtained payloads into short cells; and a short cell processor/data transmitter (11) for carrying out a predetermined processing of each of the short cells to convert them into various types of output information, and for outputting the output information to respective channels, wherein said short cell disassembler (10) comprises:

a multiplexing information analyzer B (10B-1) for extracting from a payload, multiplexing information including information on lengths and a number of multiplexed short cells and for analyzing the multiplexing information; and a short cell disassembler B (10B-2) for disassembling the payload into short cells in accordance with analyzed results given by said multiplexing information analyzer B (10B-1).

15. The ATM cell disassembler (2) as claimed in claim 14, wherein said multiplexing information includes a multiplex pattern identifier (PI) representing a multiplexed data structure to make correspondence between the multiplex pattern identifier and the multiplexed data structure, and wherein said short cell disassembler (10) disassembles a payload into short cells in accordance with the multiplexed data structure corresponding to the multiplex pattern identifier in said multiplexing information.

16. The ATM cell disassembler (2) as claimed in claim 14, wherein said multiplexing information includes:

multiplexed cell number information (N) indicating a number of identical length short cells multiplexed onto a payload of the ATM cell; and short cell length information (L) indicating a length of the multiplexed short cells, and wherein said short cell disassembler (10) disassembles a payload into short cells in accordance with the multiplexed cell number information and the short cell length information in said multiplexing information.

17. The ATM cell disassembler (2) as claimed in claim 14, wherein said multiplexing information includes:

multiplexed cell number information (N) indicating a number of short cells multiplexed onto a payload of an ATM cell, and short cell length information (LI1-LIN) indicating a length of each of the multiplexed short cells, and wherein said short cell disassembler (10) disassembles a payload into short cells in accordance with the multiplexed cell number information and the short cell length information in said multiplexing information.

18. An ATM cell disassembler comprising:

an ATM cell receiver (8) for receiving ATM cells sent from an ATM switching network (7);

an ATM cell processor (9) for obtaining payloads by carrying out disassembly/processing of the received ATM cells;

a short cell disassembler (10) for disassembling obtained payloads into short cells; and a short cell processor/data transmitter (11) for carrying out a predetermined processing of each of the short cells to convert them into various types of output information, and for outputting the output information to respective channels, wherein said short cell disassembler (10) comprises means for receiving a multiplexed data structure of short cells separately from an ATM cell onto which the short cells have been multiplexed from an ATM cell assembler, and disassembles a payload into short cells in accordance with the received multiplexed data structure.

19. A short cell multiplexing ATM transmission method comprising the steps of:

forming short cells from various types of input data;

putting before each of the short cells, a short cell multiplexing individual AAL;

linking the short cells before which the short cell multiplexing individual AALs have been put, to form multiplexed data;

providing the multiplexed data with ATM headers to form ATM cells;

transmitting the ATM cells;

receiving the ATM cells disassembling;

disassembling the ATM cells into short cells by using the short cell multiplexing individual AALs included in the ATM cells; and converting the short cells obtained by the disassembling step into output data, wherein said step of linking the short cells forms the multiplexed data such that between a short cell multiplexing individual AAL and a short cell corresponding to the short cell multiplexing individual AAL, there are no other short cells.

20. An ATM cell assembler comprising:

means for forming short cells from various types of input data;

means for putting before each of the short cells, a short cell multiplexing individual AAL;

means for linking the short cells before which the short cell multiplexing individual AALs have been put, to form multiplexed data; and means for providing the multiplexed data with ATM headers to form ATM cells, wherein said means for linking the short cells forms the multiplexed data such that between a short cell multiplexing individual AAL and a short cell corresponding to the short cell multiplexing individual AAL, there are no other short cells.

21. An ATM cell disassembler comprising:

means for receiving ATM cells in which short cells are multiplexed and which include short cell multiplexing individual AALs each of which are put before each of the short cells;

means for disassembling the ATM cells into the short cells by using the short cell multiplexing individual AALs included in the ATM cells; and means for converting the short cells into output data, wherein in said ATM cells, between a short cell multiplexing individual AAL and a short cell corresponding to the short cell multiplexing individual AAL, there are no other short cells.

22. The short cell multiplexing ATM transmission method as claimed in claim 19, wherein said short cell multiplexing individual AALs comprise length information of short cells and comprise, when a short cell is multiplexed onto ATM cells in an overlapped manner, overlapping information.

23. A short cell multiplexing ATM transmission method comprising the steps of:

forming short cells from various types of input data;

linking the short cells to form multiplexed data;

providing the multiplexed data with short cell multiplexing common AALs;

providing the multiplexed data which have been provided with the short cell multiplexing common AALs, with ATM headers to form ATM cells;

transmitting the ATM cells;

receiving the ATM cells;

disassembling the ATM cells into short cells by using the short cell multiplexing common AALs included in the ATM cells; and converting the short cells obtained by the disassembling step into output data, wherein said step of linking the short cells forms, when a short cell is divided and partial short cells are stored in two or more ATM cells, the multiplexed data such that two consecutive partial short cells are stored in the tail of an ATM cell and in the head of the next ATM cell, said step of disassembling the ATM cell links, when a short cell is divided and partial short cells are stored in two or more ATM cells, a partial short cell stored in the tail of an ATM cell and a partial short cell stored in the head of the next ATM cell to obtain a short cell, and said short cell multiplexing common AALs comprise length information of short cells and comprise, when a short cell is multiplexed onto ATM cells in an overlapped manner, overlapping information.

24. A short cell multiplexing ATM transmission method comprising the steps of:

forming short cells from various types of input data;

putting before each of the short cells, a short cell multiplexing individual AAL;

linking the short cells before which the short cell multiplexing individual AALs have been put, to form multiplexed data;

providing the multiplexed data with short cell multiplexing common AALs;

providing the multiplexed data which have been provided with the short cell multiplexing common AALs, with ATM headers to form ATM cells;

transmitting the ATM cells;

receiving the ATM cells;

disassembling the ATM cells into short cells by using at least one of the short cell multiplexing common AALs and the short cell multiplexing individual AALs included in the ATM cells; and converting the short cells obtained by the disassembling step into output data, wherein said short cell multiplexing common AALs comprise, when a short cell is multiplexed onto ATM cells in an overlapped manner, overlapping information, and said short cell multiplexing individual AALs comprise length information of short cells, and said step of linking the short cells forms the multiplexed data such that between a short cell multiplexing individual AAL and a short cell corresponding to the short cell multiplexing individual AAL, there are no other short cells.

25. The ATM cell assembler as claimed in claim 20, wherein said short cell multiplexing individual AALs comprise length information of short cells.

26. The ATM cell assembler as claimed in claim 25, wherein when a short cell is divided and partial short cells are stored in two or more ATM cells, said length information of short cells comprises a length of the short cell before the division.

27. The ATM cell assembler as claimed in claim 25, wherein when a short cell is divided and partial short cells are stored in two or more ATM cells, said length information of short cells comprises lengths of short cells after the division.

28. An ATM cell assembler comprising:

means for forming short cells from various types of input data;

means for linking the short cells to form multiplexed data;

means for providing the multiplexed data with short cell multiplexing common AALs; and means for providing the multiplexed data which have been provided with the short cell multiplexing common AALs, with ATM headers to form ATM cells, wherein said means for linking the short cells forms, when a short cell is divided and partial short cells are stored in two or more ATFM cells, the multiplexed data such that two consecutive partial short cells are stored in the tail of an ATM cell and in the head of the next ATM cell, and said short cell multiplexing common AALs comprise, when a short cell is multiplexed onto ATM cells in an overlapped manner, overlapping information.

29. The ATM cell assembler as claimed in claim 20, wherein said short cell multiplexing individual AALs comprise, when a short cell is multiplexed onto ATM cells in an overlapped manner, overlapping information.

30. The ATM cell assembler as claimed in claim 25, wherein said short cell multiplexing individual AALs comprise information indicating quality of contents of data included in short cells.

31. The ATM cell disassembler as claimed in claim 21, wherein said short cell multiplexing individual AALs comprise length information of short cells.

32. The ATM cell disassembler as claimed in claim 28, wherein when a short cell is divided and partial short cells are stored in two or more ATM cells, said length information of short cells comprises a length of the short cell before the division.

33. The ATM cell disassembler as claimed in claim 28, wherein when a short cell is divided and partial short cells are stored in two or more ATM cells, said length information of short cells comprises lengths of short cells after the division.

34. An ATM cell disassembler comprising:
means for receiving ATM cells in which short cells are multiplexed and which include short cell multiplexing common AALs;
means for disassembling the ATM cells into the short cells by using the short cell multiplexing common AALs included in the ATM cells; and
means for converting the short cells into output data,
wherein said means for disassembling the ATM cell links, when a short cell is divided and partial short cells are stored in two or more ATM cells, a partial short cell stored in the tail of an ATM cell and a partial short cell stored in the head of the next ATM cell to obtain a short cell, and
said short cell multiplexing common AALs comprise, when a short cell is multiplexed onto ATM cells in an overlapped manner, overlapping information.

35. The ATM cell disassembler as claimed in claim 21, wherein said short cell multiplexing individual AALs comprise, when a short cell is multiplexed onto ATM cells in an overlapped manner, overlapping information.

36. An ATM cell disassembler comprising:
means for receiving ATM cells in which short cells are multiplexed and which include short cell multiplexing individual AALs each of which are put before each of the short cells;
means for disassembling the ATM cells into the short cells; and
means for converting the short cells into output data,
wherein said short cell multiplexing individual AALs comprise information indicating quality of contents of data included in short cells, and
said ATM cell disassembler further comprises means for deciding the quality of the contents of the data included in the short cells by using the information.

37. An ATM cell assembler comprising:
a data receiver/short cell assembler (3) for receiving various types of input information, and for forming short cells for each type of the information;
a short cell multiplexer (4) for multiplexing short cells as one or more payloads of one or more ATM cells;
an ATM cell generator (5) for receiving the multiplexed short cells as the payloads, and for forming the ATM cells by adding AAL data and headers; and
an ATM cell transmitter (6) for outputting said ATM cells to an ATM switching network,
wherein said short cell multiplexer (4) multiplexes, when a short cell is divided and partial short cells are stored in two or more ATM cells, short cells after putting before the head partial short cell, a length of the short cell before the division.

38. An ATM cell disassembler comprising:
an ATM cell receiver (8) for receiving ATM cells sent from an ATM switching network (7);
an ATM cell processor (9) for obtaining payloads by carrying out disassembly/processing of the received ATM cells;
a short cell disassembler (10) for disassembling obtained payloads into short cells; and
a short cell processor/data transmitter (11) for carrying out a predetermined processing of each of the short cells to convert them into various types of output information, and for outputting the output information to respective channels,
wherein said short cell disassembler (10) disassembles, when a short cell is divided and partial short cells are stored in two or more ATM cells, obtained payloads into short cells by using a length of the short cell before the division which is put before the head partial short cell.

39. A short cell multiplexing ATM transmission method comprising the steps of:
forming short cells from various types of input data;
linking the short cells to form multiplexed data:
providing the multiplexed data with ATM headers to form ATM cells;
transmitting the ATM cells;
receiving the ATM cells;
disassembling the ATM cells into short cells; and
converting the short cells obtained by the disassembling step into output data,
wherein said step of linking the short cells forms, when a short cell is divided and partial short cells are stored in two or more ATM cells, the multiplexed data after putting before the head partial short cell, a length of the short cell before the division, and
said step of disassembling the ATM cells disassembles, when a short cell is divided and partial short cells are stored in two or more ATM cells, the ATM cells into short cells by using a length of the short cell before the division which is put before the head partial short cell.

40. An ATM cell assembler comprising:
means for forming short cells from various types of input data;
means for linking the short cells to form multiplexed data;
means for providing the multiplexed data with ATM headers to form ATM cells,
wherein said means for linking the short cells forms, when a short cell is divided and partial short cells are stored in two or more ATM cells, the multiplexed data after putting before the head partial short cell, a length of the short cell before the division.

41. An ATM cell disassembler comprising:
means for receiving ATM cells in which short cells are multiplexed;
means for disassembling the ATM cells into the short cells; and
means for converting the short cells into output data,
wherein said means for disassembling the ATM cells disassembles, when a short cell is divided and partial short cells are stored in two or more ATM cells, the ATM cells into short cells by using a length of the short cell before the division which is put before the head partial short cell.

42. An ATM cell assembler comprising:

a data receiver/short cell assembler (3) for receiving various types of input information, and for forming short cells for each type of the information;

a short cell multiplexer (4) for multiplexing short cells as one or more payloads of one or more ATM cells, an ATM cell generator (5) for receiving the multiplexed short cells as the payloads, and for forming the ATM cells by adding AAL data and headers; and an ATM cell transmitter (6) for outputting said ATM cells to an ATM switching network, wherein said short cell multiplexer (4) multiplexes, when a short cell is divided and partial short cells are stored in two or more ATM cells, short cells such that two consecutive partial short cells are stored in the tail of an ATM cell and in the head of the next ATM cell.

43. An ATM cell disassembler comprising:

an ATM cell receiver (8) for receiving ATM cells sent from an ATM switching network (7);

an ATM cell processor (9) for obtaining payloads by carrying out disassembly/processing of the received ATM cells;

a short cell disassembler (10) for disassembling obtained payloads into short cells; and a short cell-processor/data transmitter (11) for carrying out a predetermined processing of each of the short cells to convert them into various types of output information, and for outputting the output information to respective channels, wherein said short cell disassembler (10) links, when a short cell is divided and partial short cells are stored in two or more ATM cells, a partial short cell stored in the tail of an ATM cell and a partial short cell stored in the head of the next ATM cell to obtain a short cell.

44. A short cell multiplexing ATM transmission method comprising the steps of:

forming short cells from various types of input data;

linking the short cells to form multiplexed data;

providing the multiplexed data with ATM headers to form ATM cells;

transmitting the ATM cells;

receiving the ATM cells;

disassembling the ATM cells into short cells; and converting the short cells obtained by the disassembling step into output data, wherein said step of linking the short cells forms, when a short cell is divided and partial short cells are stored in two or more ATM cells, the multiplexed data such that two consecutive partial short cells are stored in the tail of an ATM cell and in the head of the next ATM cell, and said step of disassembling the ATM cell links, when a short cell is divided and partial short cells are stored in two or more ATM cells, a partial short cell stored in the tail of an ATM cell and a partial short cell stored in the head of the next ATM cell to obtain a short cell.

45. An ATM cell assembler comprising:

means for forming short cells from various types of input data;

means for linking the short cells to form multiplexed data;

means for providing the multiplexed data with ATM headers to form ATM cells, wherein said means for linking the short cells forms, when a short cell is divided and partial short cells are stored in two or more ATM cells, the multiplexed data such that two consecutive partial short cells are stored in the tail of an ATM cell and in the head of the next ATM cell.

46. An ATM cell disassembler comprising:

means for receiving ATM cells in which short cells are multiplexed;

means for disassembling the ATM cells into the short cells; and means for converting the short cells into output data, wherein means for disassembling the ATM cell links, when a short cell is divided and partial short cells are stored in two or more ATM cells, a partial short cell stored in the tail of an ATM cell and a partial short cell stored in the head of the next ATM cell to obtain a short cell.

* * * * *